US008917282B2

(12) United States Patent
DiVerdi et al.

(10) Patent No.: US 8,917,282 B2
(45) Date of Patent: Dec. 23, 2014

(54) SEPARATING WATER FROM PIGMENT IN PROCEDURAL PAINTING ALGORITHMS

(75) Inventors: Stephen J. DiVerdi, Oakland, CA (US); Aravind Krishnaswamy, San Jose, CA (US); Radomir Mech, Mountian View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 276 days.

(21) Appl. No.: 13/219,453

(22) Filed: Aug. 26, 2011

(65) Prior Publication Data
US 2013/0127898 A1 May 23, 2013

Related U.S. Application Data

(60) Provisional application No. 61/466,786, filed on Mar. 23, 2011.

(51) Int. Cl.
*G09G 5/00* (2006.01)
*G06T 11/20* (2006.01)

(52) U.S. Cl.
CPC .................................. *G06T 11/203* (2013.01)
USPC .......................................... 345/600; 345/589

(58) Field of Classification Search
CPC ..... G06T 15/04; G06T 11/001; G06T 15/005; G09G 5/02; G09G 5/06; G09T 11/001
USPC ................................................. 345/582, 600
See application file for complete search history.

(56) References Cited

U.S. PATENT DOCUMENTS

| | | | |
|---|---|---|---|
| 5,432,896 A * | 7/1995 | Hwong et al. | 345/592 |
| 6,198,489 B1 | 3/2001 | Salesin et al. | |
| 6,512,999 B1 | 1/2003 | Dimas et al. | |
| 6,762,769 B2 | 7/2004 | Guo et al. | |
| 6,919,903 B2 | 7/2005 | Freeman | |
| 6,937,275 B2 | 8/2005 | Heiles | |
| 6,964,025 B2 | 11/2005 | Angiulo et al. | |
| 6,987,535 B1 | 1/2006 | Matsugu et al. | |
| 7,012,624 B2 | 3/2006 | Zhu et al. | |

(Continued)

OTHER PUBLICATIONS

Laerhoven et al. "Real-time Watercolor Painting on a Distributed Paper Model", Proceedings of the Computer Graphics International (CGI'04) 1530-1052/04 © 2004 IEEE.*

(Continued)

*Primary Examiner* — David Zarka
*Assistant Examiner* — Tapas Mazumder
(74) *Attorney, Agent, or Firm* — Wolfe-SBMC

(57) ABSTRACT

Techniques for improving the performance of vector-based, fluid motion simulation techniques. The techniques may be implemented in procedural painting algorithms that employ a vector-based, fluid motion simulation technique to help achieve dynamic, serendipitous behaviors of painting at good interactive rates even on relatively low-powered devices. Instead of employing polygons in a procedural painting algorithm that are combinations of pigment and water, a technique may be employed in which the polygons are separated into pigment polygons and water polygons. The water polygons are not rendered; only the pigment polygons are rendered. To improve the performance of the wetness determination at vertices of the pigment polygons, a technique may be used that first rasterizes all of the water polygons into a buffer, which may be referred to as a wetness layer or wetmap; the wetness at a vertex is then determined by sampling this buffer or layer at the vertex's position.

21 Claims, 27 Drawing Sheets

(56) References Cited

U.S. PATENT DOCUMENTS

| | | | |
|---|---|---|---|
| 7,069,506 B2 | 6/2006 | Rosenholtz et al. | |
| 7,136,072 B2 | 11/2006 | Ritter | |
| 7,239,314 B2 | 7/2007 | Johnston | |
| 7,257,261 B2 | 8/2007 | Suh | |
| 7,283,140 B2 | 10/2007 | Zhou et al. | |
| 7,418,673 B2 | 8/2008 | Oh | |
| 7,430,500 B2 | 9/2008 | Lei et al. | |
| 7,577,313 B1 | 8/2009 | Georgiev | |
| 7,596,751 B2 | 9/2009 | Rowson et al. | |
| 7,921,003 B2 | 4/2011 | Miller et al. | |
| 8,219,370 B1 | 7/2012 | DiVerdi et al. | |
| 8,249,365 B1 | 8/2012 | Winnemoeller et al. | |
| 8,280,703 B1 | 10/2012 | Mech | |
| 8,335,675 B1 | 12/2012 | DiVerdi et al. | |
| 8,676,552 B2 | 3/2014 | Mech et al. | |
| 2004/0218797 A1 | 11/2004 | Ladak et al. | |
| 2006/0267958 A1 | 11/2006 | Kolmykov-Zotov et al. | |
| 2012/0208160 A1 | 8/2012 | Kaylor et al. | |
| 2012/0234722 A1* | 9/2012 | Becvar et al. | 206/575 |
| 2013/0127890 A1 | 5/2013 | DiVerdi | |
| 2013/0132053 A1* | 5/2013 | Mech et al. | 703/9 |

OTHER PUBLICATIONS

Baxter et al. "A viscous paint model for interactive applications," Comp. Anim. Virtual Worlds 2004; 15: 433-441.*

Whyte, O., Sivic, J., and Zisserman, A. 2009. Get out of my picture! internet-based inpainting. In BMVC (British Machine Vision Conference), pp. 1-11.

U.S. Appl. No. 12/868,519, filed Aug. 25, 2010, Elya Shechtman, et al.

U.S. Appl. No. 12/857,294, filed Aug. 16, 2010, Dan Goldman, et al.

P. Bhat, B. Curless, M. Cohen, and C. L. Zitnick. Fourier analysis of the 2d screened poisson equation for gradient domain problems. In ECCV, 2008, pp. 1-14.

U.S. Appl. No. 12/394,280, filed Feb. 27, 2009, Dan Goldman, et al.

Yonatan Wexler, Eli Shechtman, Michal Irani. Space-Time Completion of Video. IEEE Transactions on Pattern Analysis and Machine Intelligence, vol. 29, No. 3, Mar. 2007, pp. 1-14.

Agarwala, A., Dontcheva, M., Agrawala, M., Drucker, S., Colburn, A., Curless, B., Salesin, D., and Cohen, M. 2004. Interactive digital photomontage. In ACM SIGGRAPH, vol. 23, pp. 294-302.

Arias, P., Facciolo, G., Caselles, V., and Sapiro, G. 2011. A variational framework for exemplar-based image inpainting. IJCV 93 (July), pp. 319-347.

U.S. Appl. No. 12/315,038, filed Nov. 26, 2008, Dan Goldman, et al.

Burt, P. J., and Adelson, E. H. 1983. A multiresolution spline with application to image mosaics. ACM Trans. Graphics 2 (October), pp. 217-236.

Efros, A. A., and Leung, T. K. 1999. Texture synthesis by non-parametric sampling. IEEE Computer Society, Los Alamitos, CA, USA, pp. 1-6.

Fang, H., and Hart, J. C. 2007. Detail preserving shape deformation in image editing. In ACM SIGGRAPH, vol. 26, pp. 1-5.

Hays, J., and Efros, A. A. 2007. Scene completion using millions of photographs. In ACM SIGGRAPH, vol. 26, 4:1-4: pp. 1-7.

Kwatra, V., Essa, I., Bobick, A., and Kwatra, N. 2005. Texture optimization for example-based synthesis. In ACM SIGGRAPH, vol. 24, pp. 795-802.

Kwatra, V., Schödl, A., Essa, I., Turk, G., and Bobick, A. 2003. Graphcut textures: image and video synthesis using graph cuts. In ACM SIGGRAPH, vol. 22, pp. 277-286.

Perez, P., Gangnet, M., and Blake, A. 2003. Poisson image editing. In ACM SIGGRAPH, vol. 22, pp. 313-318.

Rother, C., Bordeaux, L., Hamadi, Y., and Blake, A. 2006. AutoCollage. In ACM SIGGRAPH, vol. 25, pp. 847-852.

Simakov, D. Caspi, Y., Shechtman, E., and Irani, M. 2008. Summarizing visual data using bidirectional similarity. In CVPR, pp. 1-8.

Szeliski, R., and Shum, H.-Y. 1997. Creating full view panoramic image mosaics and environment maps. In ACM SIGGRAPH, pp. 251-258.

Tappen, M., Freeman, W., and Adelson, E. 2005. Recovering intrinsic images from a single image. IEEE Trans. PAMI 27, 9 (Sep.), pp. 1459-1472.

Wei, L. Y., and Levoy, M. 2000. Fast texture synthesis using tree-structured vector quantization. In ACM SIGGRAPH, pp. 479-488.

U.S. Appl. No. 12/868,540, filed Aug. 25, 2010, Elya Shechtman, et al.

U.S. Appl. No. 13/565,552, filed Aug. 2, 2012, Elya Shechtman, et al.

Kajiya, J. T. and Kay, T. L. 1989. Rendering fur with three dimensional textures. SIGGRAPH Comput. Graph. 23, 3 (Jul. 1989), pp. 271-280.

Marschner, S. R., Jensen, H. W., Cammarano, M., Worley, S., and Hanrahan, P. 2003. Light scattering from human hair fibers. In ACM SIGGRAPH 2003 Papers (San Diego, California, Jul. 27-31, 2003). SIGGRAPH '03. ACM, New York, NY, pp. 780-791.

Barnes, C., Shechtman, E., Finkelstein, A., and Goldman, D. B. 2009. PatchMatch: a randomized correspondence algorithm for structural image editing. In ACM SIGGRAPH 2009 Papers (New Orleans, Louisiana, Aug. 3-7, 2009). H. Hoppe, Ed. SIGGRAPH '09. ACM, New York, NY, pp. 1-11.

Chen, H. and Zhu, S. 2006. A Generative Sketch Model for Human Hair Analysis and Synthesis. IEEE Trans. Pattern Anal. Mach. Intell. 28, 7 (Jul. 2006), pp. 1025-1040.

H. Chen and S. C. Zhu, "A generative model of human hair for hair sketching", CVPR (IEEE Conference on Computer Vision and Pattern Recognition), pp. 74-81, 2005.

David J. Heeger and James R. Bergen. Pyramid-based texture analysis/synthesis. In SIGGRAPH 95, pp. 229-238, 1995.

U.S. Appl. No. 12/858,552, filed Aug. 18, 2010.

U.S. Appl. No. 12/858,558, filed Aug. 18, 2010.

U.S. Appl. No. 12/858,546, filed Aug. 18 2010, Winnemoeller et al.

U.S. Appl. No. 12/857,382, filed Aug. 16 2010, Mech et al.

Sims, K. Artificial Evolution for Computer Graphics. Computer Graphics 25, 4 (Aug. 1991), pp. 319-328.

J. Marks, B. Andalman, P.A. Beardsley, and H. Pfister et al. Design Galleries: A General Approach to Setting Parameters for Computer Graphics and Animation. In ACM Computer Graphics (SIGGRAPH '97 Proceedings), pp. 389-400, Aug. 1997.

Igarashi, T. and J.F. Hughes, A Suggestive Interface for 3D Drawing, in Proceedings of the ACM Symposium on User Interface Software and Technology, UIST 01. 2001, ACM: Orlando, Florida. pp. 1-9.

L. Shapira, A. Shamir, and D. Cohen-Or. Image appearance exploration by model based navigation. In Computer Graphics Forum, Eurographics, 2009. (Mar. 30 to Apr. 3, 2009) pp. 1-10.

Jonathan Duran, Deco tool and Spray Brush for creating complex, geometric patterns in Flash http://www.adobe.com/devnet/flash/articles/deco_intro.html Feb. 2, 2009, pp. 1-19.

Barla P., Breslav S., Thollot J., Sillion F., Markosian L.; Stroke Pattern Analysis and Synthesis. Computer Graphics Forum, 25 (3), pp. 663-671, 2006.

Muller M., Heidelberger B., Teschner M., Gross M.: Meshless deformations based on shape matching. ACM Transactions on Computer Graphics, 24, 3 (2005), pp. 471-478.

Mech R., Prusinkiewicz P.; Visual models of plants interacting with their environment. In Proceedings of ACM SIGGRPH 1996, pp. 397-410.

Prusinkiewicz P., James M., Mech R.; Synthetic topiary. In Proceedings of ACM SIGGRAPH 1994, pp. 351-358.

Wong M. T., Zongker D. E., Salesin D. H.; Computer-generated floral ornament. In Proceedings of SIGGRAPH 1998, pp. 423-434.

Parish Y. I. H., Muller P.; Procedural modeling of cities. In Proceedings of ACM SIGGRAPH 2001, pp. 301-308.

Wonka P., Wmmer M., Sillion F., Ribarsky W.; Instant architecture. ACM Trans. Graph.,22 (2003), 3, pp. 669-677.

Muller R, Wonka P., Haegler S., Ulmer A., Gool L.V.: Procedural modeling of buildings. ACM Trans. Graph., 25(2006) 3, pp. 614-623.

Deussen O. and Lintermann, B.: Interactive Modeling of Plants. IEEE Computer Graphics and Applications, 19 (1999), 1, pp. 56-65.

Esch G., Wonka P., Muller P., Zhang E.: Interactive procedural street modeling, SIGGRAPH 2007 Sketches.

Ijiri T., Owada S., Igarashi T.: The sketch L-System: global control of tree modeling using free-form strokes. In Proceedings of 6th International Symposium SmartGraphics 2006, pp. 138-146.

(56) References Cited

OTHER PUBLICATIONS

Heeger. D. J., Bergen, J. R: Pyramid-based texture analysis and synthesis. In Proceedings of SIGGRAPH 1995, pp. 229-238.
Efros A. A., Leung T.K.: Texture synthesis by nonparametric sampling. In IEEE Int. Conf. on Computer Vision (1999), pp. 1033-1038.
Wei L. Y., Levoy M.: Fast Texture Synthesis using Tree-structured Vector Quantization. In Proceedings of SIGGRAPH 2000, pp. 479-488.
Turk G.: Texture Synthesis on Surfaces. In Proceedings of SIG-GRAPH 2001, pp. 347-354.
Ashikhmin, M.: Synthesizing Natural Textures. In Proceedings of the Symposium on Interactive 3D Graphics 2001, pp. 217-226.
Hertzmann, A., Jacobs, C.E. Oliver, N., Curless, B., Salesin, D.H.: Image Analogies. In Proceedings of SIGGRAPH 2001, pp. 327-340.
Kwatra, V., Schodl, A., Essa, I., Turk, G., Bobick, A.: Graphcut textures: Image and video synthesis using graph cuts. ACM Trans. Graph. 22 (2003), 2, pp. 277-286.
Deussen O., Hiller S., Van Overveld C., Strothotte T.: Floating points: A method for computing stipple drawings. Computer Graphics Forum 19, pp. 1-3 (2000).
Winkenbach G., Salesin D. H.: Computer generated pen-and-ink illustration. In Proceedings of SIGGRAPH 1994, pp. 91-100.
Salisbury M. P., Anderson S. E., Barzel R., Salesin D.H.: Interactive pen-and-ink illustration, In Proceedings of SIGGRAPH 1994, p. 101.
Hertzmann A., Oliver N., Curless B., Seitz S.M.: Curve analogies. In Rendering Techniques 2002: 13th Eurographics Workshop on Rendering, pp. 233-246.
Jodoin P. M., Epstein E., Granger-Piche M., Ostromoukhov V.: Hatching by example: a statistical approach. In Proceedings of NPAR 2002, pp. 29-36.
Lloyd S. P.: Least Squares quantization in pcm. IEEE Trans. on Information Theory 28, 2 (1982), pp. 129-137.
U.S. Appl. No. 12/039,164, filed Feb. 28, 2008, Radomir Mech.
Prusinkiewicz, Przemyslaw; Lindenmayer, Aristid (1990). The Algorithmic Beauty of Plants. Springer-Verlag. Chapter 4, pp. 101-107. ISBN 978-0387972978.
U.S. Appl. No. 12/858,558, filed Aug. 18, 2010, Holger Winnemoeller.
Ijiri, T., Owada, S., and Igarashi, T. 2006. The sketch L-system: Global control of tree modeling using free-form strokes. In Smart Graphics, pp. 138-146.
U.S. Appl. No. 13/565,552 filed Aug. 2, 2012, Elya Shechtman.
Chen, X., Neubert, B., Xu, Y.-Q., Deussen, O., and Kang, S. B. 2008. Sketch-based tree modeling using markov random field. ACM Trans. on Graphics 27, 5, pp. 1-9.
U.S. Appl. No. 13/219,457, filed Aug. 26, 2011, Adobe Systems Incorporated, all pages.
U.S. Appl. No. 13/029,036, filed Feb. 16, 2011, Adobe Systems Incorporated, all pages.
U.S. Appl. No. 13/219,848, filed Aug. 26, 2011, Adobe Systems Incorporated, all pages.
O. Deusen et al., "The Elements of Nature: Interactive and Realistic Techniques," ACM SIGGRAPH 2004 Course Note #31, Aug. 2004, 64 pages.
Ando, R., & Tsuruno, R. (2010). Vector fluid: A vector graphics depiction of surface flow. In NPAR '10: Proceedings of the 8th International Symposium on Non-photorealistic Animation and Rendering (pp. 129-135). New York, NY, USA: ACM, 7 pages.
Ando, R., & Tsuruno, R., Vector graphics depicting marbling flow. In Computers & Graphics, vol. 35, Issue 1, Feb. 2011, pp. 148-159.
Siu Hang Chu, "Making Digital Painting Organic," PhD thesis, Hong Kong University of Science and Technology, Aug. 2007, 126 pages.
Tom Van Laerhoven, "An Extensible Simulation Framework Supporting Physically-based Interactive Painting," PhD thesis, University of Limburg, Jun. 21, 2006, 171 pages.
Corel, "Corel Painter 11 Features," from the WayBackmachine, May, 26, 2011, 3 pages.
Corel, "Corel Painter 11 Overview," from the WayBackMachine, May 26, 2010, 3 pages.
Chris McVeigh, "ArtRage Studio Pro 3 review", PCWorld, Feb. 12, 2010, 4 pages.
Ambient Design, "Artrage 3," http://www.ambientdesign.com/, from web.archive.org, May 25, 2010, ArtRage home page, 1 page.
Marketwire.com release, "Auryn Releases "Auryn Ink" Watercolor App; Named One of the Seven Most Innovative iPad Apps of 2010 by fast Company," Jan. 4, 2011, 2 pages.
giggleapps.com review, "Auryn Ink Review," Feb. 10, 2011, 4 pages.
iTunes Preview, "Auryn Inc. Auryn ink," Jul. 20, 2011, downloaded at http://itunes.apple.com/us/app/auryn-Auryn\%20Ink/id407668628, 2 pages.
"Non-Final Office Action", U.S. Appl. No. 13/029,036, (Sep. 16, 2013), 13 pages.
"Non-Final Office Action", U.S. Appl. No. 13/219,457, (Oct. 15, 2013), 24 pages.
Bhat, Pravin "Fourier Analysis of the 2D Screened Poisson Equation for Gradient Domain Problems", *ECCV* (2008), 14 pages.
"Final Office Action", U.S. Appl. No. 13/219,457, Mar. 24, 2014, 26 pages, Aug. 5, 2014.
"Notice of Allowance", U.S. Appl. No. 13/029,036, Dec. 31, 2013, 6 pages.
Curtis, et al.,' "Computer Generated Watercolor", Proceedings of the 24th annual conference on Computer graphics and interactive techniques, Aug. 1997, 10 pages.
"Non-Final Office Action", U.S. Appl. No. 13/219,457, Jul. 16, 2014, 23 pages.
"Notice of Allowance", U.S. Appl. No. 13/219,457, Sep. 17, 2014, 6 pages.
Baxter, et al.,' "DAB: Interactive Haptic Painting with 3D Virtual Brushes", In Proceeding of ACM SIGGRAPH (2001), Aug. 12, 2001, 8 Pages.
"Supplemental Notice of Allowance", U.S. Appl. No. 13/219,457, Oct. 24, 2014, 2 pages.

\* cited by examiner

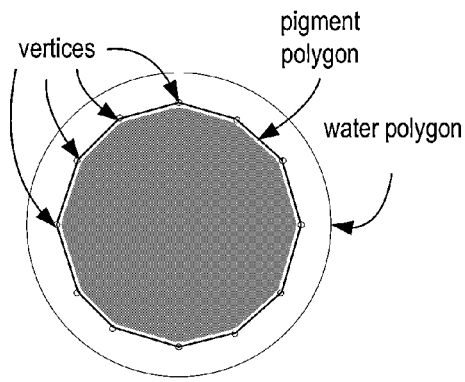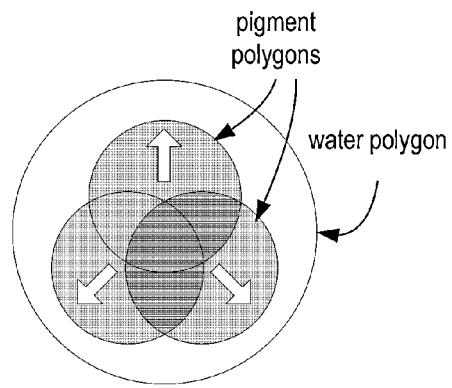
FIG. 30A  FIG. 30B
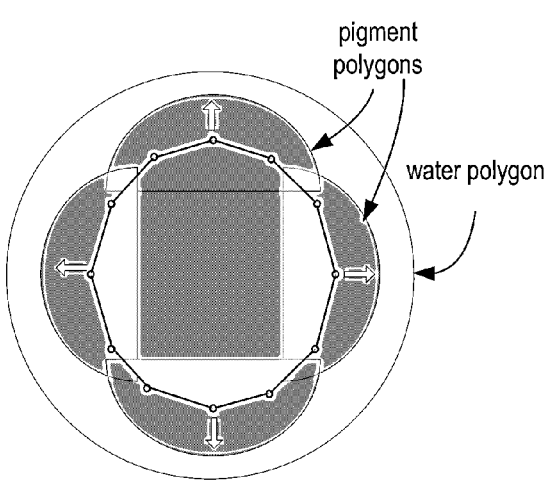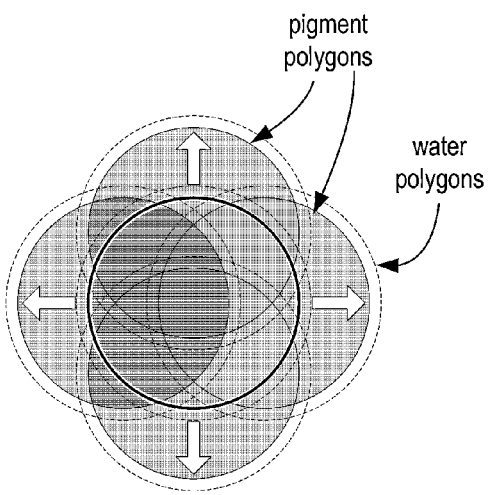
FIG. 30C  FIG. 30D
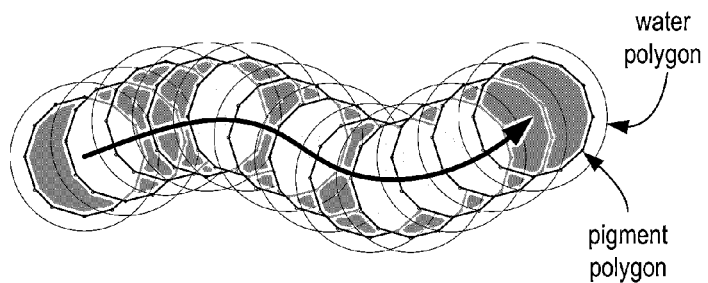
FIG. 31

SEPARATING WATER FROM PIGMENT IN PROCEDURAL PAINTING ALGORITHMS

PRIORITY INFORMATION

This application claims benefit of priority of U.S. Provisional Application Ser. No. 61/466,786 entitled "Vector-Based Interactive Painting Techniques" filed Mar. 23, 2011, the content of which is incorporated by reference herein in its entirety.

BACKGROUND

Description of the Related Art

Watercolor painting exhibits a number of characteristic behaviors that natural media painters find appealing and wish to reproduce in the digital painting domain. These behaviors form the core components of the watercolor painting experience and yield its expressiveness and serendipity. In this context, expressive refers to the complex shape and texture of strokes from relatively simple input, while serendipity describes the random and not explicitly controlled portions of stroke appearance. First, watercolor is "animated" in the sense that the paint moves after it's been applied to the canvas, and the painter can watch this behavior as part of the process. Second, part of the animation is that as strokes dry, the varying rate of water evaporation results in a concentration of pigment around the edges of strokes, which is known as "edge darkening", as shown in FIG. 29A. Third, as the edges darken, they also become sharper and more fractured, an effect that is called "edge roughening", as shown in FIG. 29B. Fourth, if a stroke is applied on top of or adjacent to a wet portion of the canvas, the pigment will flow faster and more diffusely into that wet region creating smoother pigment gradients and biasing the stroke shape, known as "feathering", as shown in FIG. 29C. Finally, because of pigment granularity and pigment permeability, concentration of pigment will vary across the stroke creating distinct "stroke texture", as shown in FIG. 29D.

Conventionally, the simulation of fluid motion (e.g., watercolor painting) in computer graphics has been handled using raster-based techniques. That is, fluids and gasses have been simulated on a grid of cells or pixels, and fluid motion is computed between pixels on the grid. These conventional techniques involve processing each pixel on the grid, where neighboring pixels are examined and one or more fluid dynamics equations are computed at the pixel. In high-resolution applications in particular, such as high-resolution painting applications, a large number of pixels may have to be processed at each of multiple iterations. Even if the fluid motion effect being simulated is relatively simple and thus the computation at each pixel is relatively straightforward, this still involves considerable computation, and thus time, due to the large number of pixels being individually processed. If more complicated fluid motion effects are being simulated, the computations at each pixel become more complicated, and thus the processing may take much longer.

SUMMARY

Various embodiments of techniques for improving the performance of vector-based, fluid motion simulation techniques are described. The techniques may be implemented, alone or in combination with one or more of the other techniques, in procedural painting algorithms that employ a vector-based, fluid motion simulation technique to help achieve the dynamic and serendipitous behaviors of watercolor painting at good interactive rates even on relatively low-powered devices, while achieving sufficient resolution to be used in a wide range of artistic applications.

In at least some embodiments, instead of employing polygons in a procedural painting algorithm that are combinations of pigment and water, a technique may be employed in which the polygons are separated into pigment polygons and water polygons. The water polygons are not rendered; only the pigment polygons are rendered. To improve the performance of the wetness determination at vertices of the pigment polygons, a technique may be used that first rasterizes all of the water polygons into a buffer, which may be referred to as a wetness layer or wetmap; the wetness at a vertex is then determined by sampling this buffer or layer at the vertex's position. In at least some embodiments, when rasterizing the water polygons into the wetness layer, lifespan values of the water polygons are added to values at points in corresponding regions of the wetness layer; the values at the points in the wetness layer indicated wetness at the respective points. At each iteration of the procedural painting algorithm, the values in the wetness layer may be aged; that is, the values may be decremented. In addition, newly applied water polygons may be rasterized and added to the wetness layer.

The water polygons may be static (do not grow), and water or wetness may be represented as static (non-growing) regions in the wetness buffer. By separating the water polygons from the pigment polygons, water polygons and pigment polygons may be given different, independent lifespans, which for example allows pigment to move for some period of time while that portion of the canvas stays wet for a longer period. As the water may be static (not grow) and may be rasterized into a wetness layer once, the values in the wetness layer may be used to indicate the remaining life of the water at each point or pixel.

BRIEF DESCRIPTION OF THE DRAWINGS

FIGS. 30A through 30D show examples of polygon groups that include separate water polygons and pigment polygons, according to at least some embodiments.

FIG. 31 illustrates the application of instances of the example group from FIG. 30A to a canvas, according to at least some embodiments.

Figure 1A:
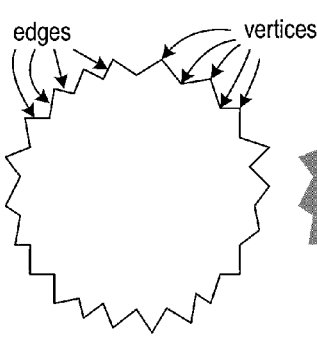
FIG. 1A illustrates the border of an example polygon, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of techniques for improving the performance of vector-based, fluid motion simulation techniques are described. An example artistic painting application that employs embodiments of an example vector-based, fluid motion simulation technique in which embodiments of the techniques described herein may be implemented is described in U.S. patent application Ser. No. 13/029,036, titled "Methods and Apparatus for Simulation Of Fluid Motion Using Procedural Shape Growth," which is incorporated by reference herein in its entirety. Both patent application Ser. No. 13/029,036 and the section of this document titled Vector-based, fluid motion simulation technique describe embodiments of a watercolor-inspired procedural painting algorithm that may operate by representing volumes of "paint", the combination of pigment and water, as N-sided polygons. Using the vector-based, fluid motion simulation technique, painting may be accomplished during a mouse stroke by placing groups of polygons on a canvas at intervals along the input path. Each group is an arrangement of one or more paint polygons. Once the polygons have been added to the canvas, the polygons are animated according to a simple set of behavior rules. For each vertex in a polygon, the vertex is first tested to see if it is in a "wet" portion of the canvas. Wetness is defined as overlapping with some other paint polygon; to determine this, the vertex is tested for intersection with each other paint polygon on the canvas. If the vertex is wet, then its position is updated according to a combination of a per-polygon bias direction, a per-vertex normal direction, and a per-step random vector. At each step when a polygon's vertices are updated according to this method, the polygon's "age" number is incremented, until it reaches a pre-set threshold and the polygon is determined to be, dry, not alive, or "dead", meaning that the polygon is not updated anymore and does not contribute to the wetness of other live vertices.

Embodiments of one or more of the techniques as described in the section titled Techniques for improving the performance of procedural painting algorithms may be employed in procedural painting algorithms, for example as described in patent application Ser. No. 13/029,036 and as described in the section of this document titled Vector-based, fluid motion simulation technique, to help achieve the dynamic and serendipitous behaviors of watercolor painting at interactive rates even on relatively low-powered devices such as an Apple® iPad® or similar devices, and with sufficient resolution to be used for print production work and other demanding artistic applications due to the vector-based fluid motion simulation technique employed by the procedural painting algorithm. This combination of attributes is not realized in conventional painting applications. Embodiments of the techniques described herein may, for example, be applied in an artistic painting application as described in patent application Ser. No. 13/029,036 and in the section of this document titled Vector-based, fluid motion simulation technique to increase the performance of the artistic painting application so that the application may be used interactively for complex documents on lower-end hardware such as the Apple® iPad® or similar devices while providing a good interactive experience for the user.

Vector-Based, Fluid Motion Simulation Technique

Embodiments of a vector-based, fluid motion simulation technique are described in which embodiments of one or more of the techniques for improving the performance of procedural painting algorithms as described herein may be implemented. In the vector-based, fluid motion simulation technique, fluid location may be defined by groups of one or more polygons deposited on a digital canvas. Two or more polygons may overlap. The polygons may generally be, but are not necessarily, semitransparent. A set of polygons may be, but are not necessarily, of uniform color. To simulate fluid motion, instead of computing the fluid flow between cells or pixels of a grid as in conventional raster-based techniques, embodiments instead compute the movement of vertices that specify the edges of each deposited polygon. By moving the vertices, a polygon may grow, and fluid motion effects may be simulated, including but not limited to directional flow and blending effects. Each polygon may have a certain lifespan and a certain time in which it is considered wet. The movement of polygon vertices may be controlled or influenced by various attributes, including but not limited to whether the vertex is over another polygon that is still wet and an initial vector that may depend on the location of a particular polygon within an area of the initial deposition.

Embodiments of the vector-based, fluid motion simulation technique may require less processing power than conventional, raster-based techniques that compute flow and other effects at each cell or pixel, and thus may render frames faster than conventional, raster-based fluid motion simulators. In addition, raster-based techniques tend to exhibit pixelation when zoomed in. Since the fluid motion simulation technique is vector-based, objects drawn with the technique may exhibit smooth edges when zoomed into. In at least some embodiments, locally smoothed Bezier curves may be used for the edges between the vertices of the polygons to help achieve a smooth effect.

An example application for embodiments of the vector-based, fluid motion simulation technique is in watercolor painting simulation. However, the technique may be used for simulating the deposition, fluid motion, and blending of other substances (e.g. fluids, gasses, vapors, etc.) such as oil or acrylic paints, flowing water, smoke, clouds, fire, lava, and in general any other substance or phenomenon that exhibits similar dynamics.

In at least some embodiments, a fluid may be represented as a set of overlapping, semitransparent polygons of uniform color. The polygons may be deposited singly or in groups.

Together, the deposited polygons capture the representation of the fluid across space. In watercolor simulation, for example, as a brush is moved across a canvas, watercolor paint (pigment plus water) may be deposited in groups of five partially overlapping polygons (see, e.g., FIGS. 6 and 8). Five polygons in a group is an example; more or fewer polygons may be deposited in a group (see, e.g., FIGS. 5, 7, 9, 10, and 11). Two or more polygons in a group may overlap, and groups may be deposited so that polygons in adjacent groups at least partially overlap. Fluid motion may be simulated by moving the vertices of the polygons representing the deposited fluid. In at least some embodiments, the movement of the vertices may be randomized. However, the movement of a vertex may be influenced by one or more factors determined by attributes of the respective polygon and/or group. For example, in watercolor simulation, each group or each polygon may have a certain lifespan and a certain time in which it is considered wet. Thus, factors that may influence the movement of vertices may include whether a given vertex in one (overlapping) polygon is over another (overlapped) polygon that is still wet. Other factors that may influence the movement of a vertex may include an initial velocity and an initial, global direction vector. Attributes such as lifespan, initial opacity, initial velocity, and initial vector may be associated with each polygon; different polygons in a group may have different attributes. Alternatively, one or more attributes may be associated with a group and inherited by or applied to the polygons in the group, and thus may influence at least the initial motion of all vertices of all polygons in the group.

Figure 28:
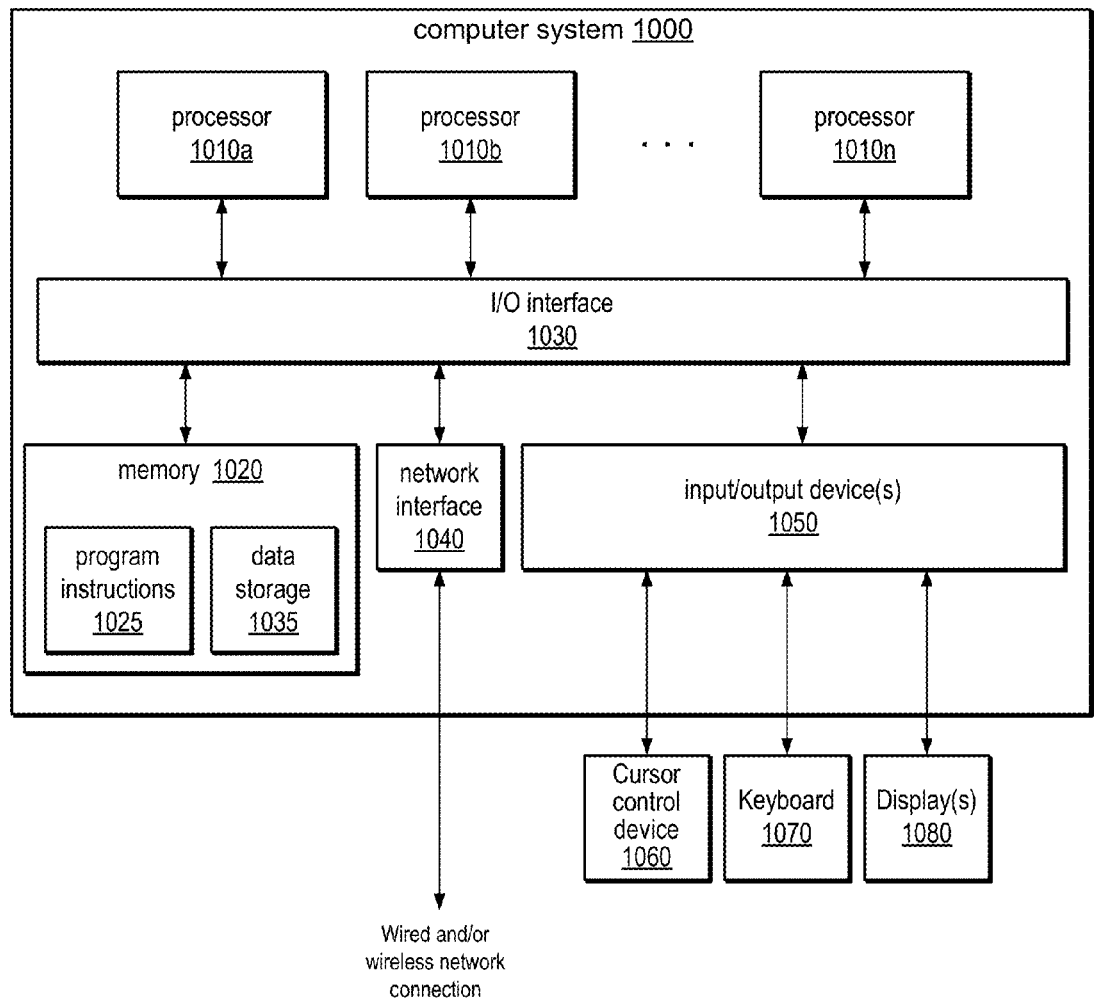
FIG. 28 illustrates an example computer system that may be used in embodiments.
Figure 29A:
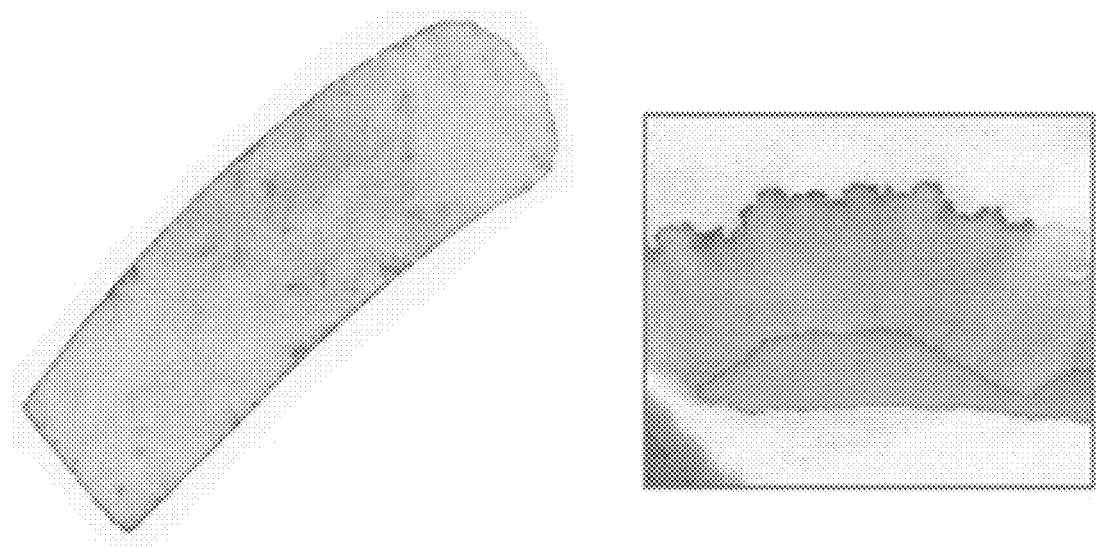
FIGS. 29A through 29D show examples of various watercolor effects.
Figure 29B:
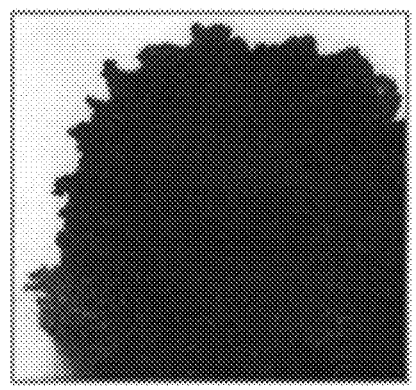
Figure 29C:
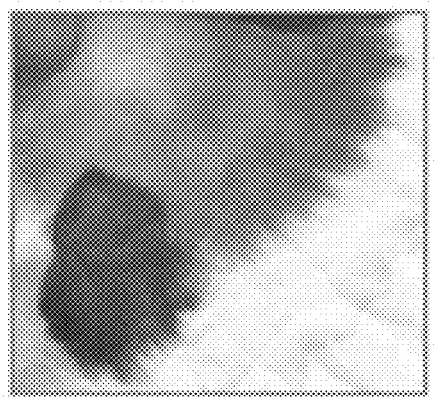
Figure 29C:
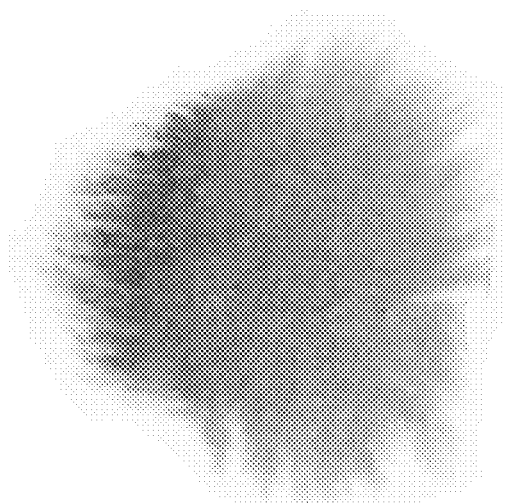
Figure 29D:

Embodiments of the vector-based, fluid motion simulation technique may be implemented on various types of devices, including, but not limited to, a personal computer system, desktop computer, laptop, notebook, or netbook computer, mainframe computer system, handheld computer, workstation, and network computer. FIG. 28 illustrates an example computer system that may implement various embodiments. By employing a vector-based technique that simulates fluid motion by computing the movement of vertices that specify the edges of each deposited polygon, embodiments may require less processing power than conventional, raster-based techniques that compute flow and other effects at each cell or pixel, and thus may render frames faster than conventional fluid motion simulators. Thus, embodiments may be implemented on devices with relatively low processing power, such as tablet devices and PDAs, to render results of fluid deposition, motion, and blending faster than conventional techniques, making such applications practical. In general, embodiments may be implemented on any type of computing or electronic device to simulate fluid motion.

Embodiments of the vector-based, fluid motion simulation technique may be implemented in any artistic, graphical design, or image processing application, or more generally in any application in which fluid motion may be simulated for artistic or other purposes. Embodiments of the vector-based, fluid motion simulation technique may, for example, be implemented as a stand-alone application, as a module of an application, as a plug-in for applications including but not limited to artistic, graphical design, and image processing applications, and/or as a library function or functions that may be called by other applications such as artistic, graphical design, and image processing applications. Specific examples of applications or technologies in which embodiments may be implemented include, but are not limited to, Adobe® Photoshop® technology, Adobe® Flash® technology, and Adobe® After Effects® technology. "Adobe", "Photoshop", "Flash", and "After Effects" are either registered trademarks or trademarks of Adobe Systems Incorporated in the United States and/or other countries.

Figure 27:
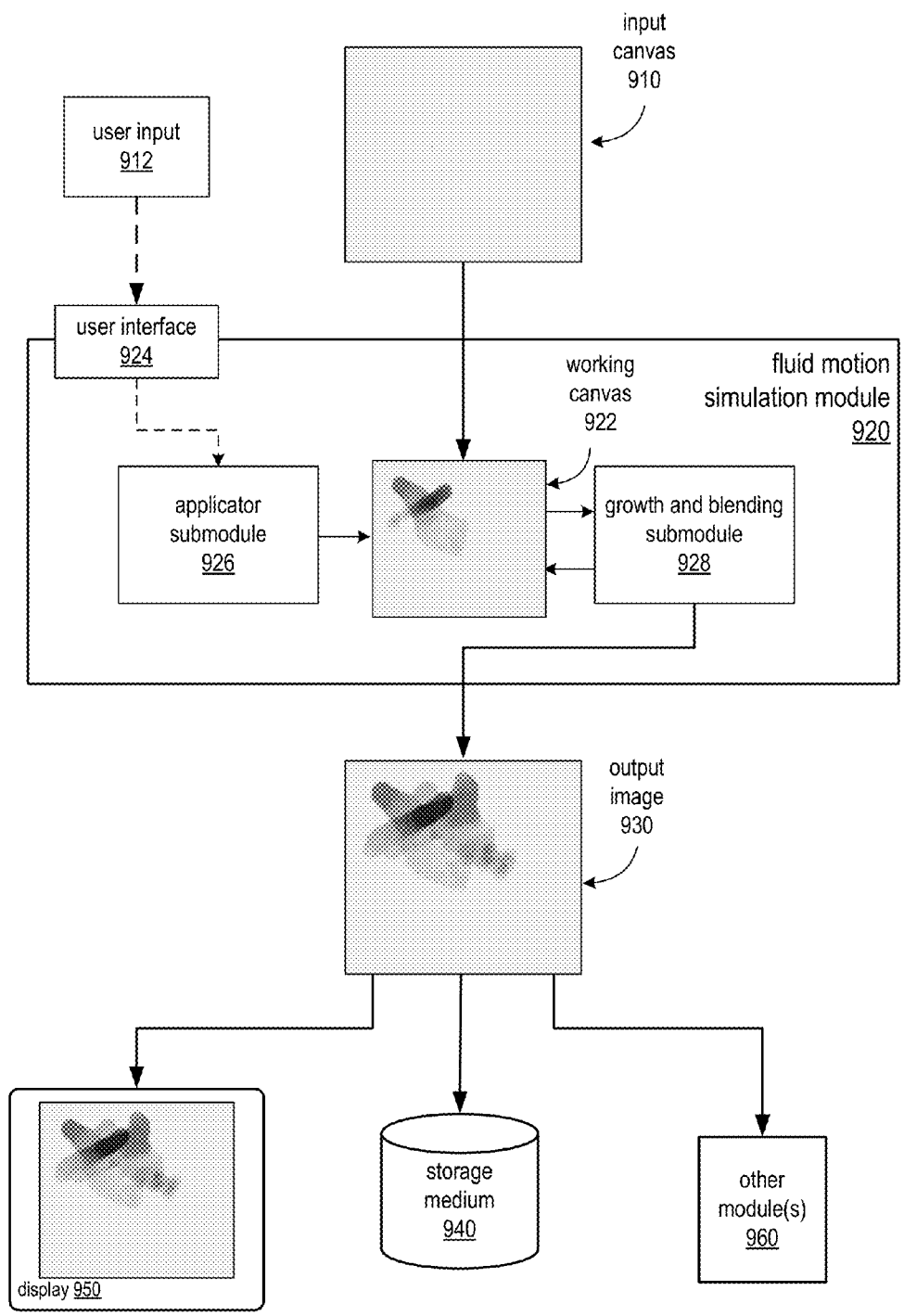
FIG. 27 illustrates a module that may implement a vector-based fluid motion simulation technique, according to at least some embodiments.

Embodiments of the vector-based, fluid motion simulation technique may be performed by a fluid motion simulation module implemented by program instructions stored in a computer-readable storage medium and executable by one or more processors (e.g., one or more CPUs and/or GPUs). In some embodiments, at least some components of a fluid motion simulation module may be implemented on or in one or more graphics processing units (GPUs). An example fluid motion simulation module that may implement embodiments of the vector-based, fluid motion simulation technique as described herein is illustrated in FIG. 27. An example computer system on which embodiments of the vector-based, fluid motion simulation technique may be implemented is illustrated in FIG. 28.

Polygons

Embodiments of the vector-based, fluid motion simulation technique may employ polygons with various attributes; the polygons may be applied to a digital canvas in various arrangements via various techniques to achieve a wide range of fluid motion effects. The polygons may generally be, but are not necessarily, semitransparent. The border(s) of a polygon, defined by a set of vertices, may be expanded from an initial position when applied to the digital canvas to simulate the spread and blending of a deposited fluid. A polygon may have one or more global attributes, such as initial direction (as a global vector), velocity, and lifespan, that may affect the growth of the border. A polygon may have other attributes such as color and a position. In at least some embodiments, each vertex on the border of a polygon may have one or more local attributes, such as local direction (as a local vector) and velocity, that locally affect the movement of the individual vertex. In at least some embodiments, a randomization technique may be applied to the movement at each vertex to simulate the non-uniform expansion along the edges of a deposited fluid, for example in a watercolor simulation.

Figure 1B:
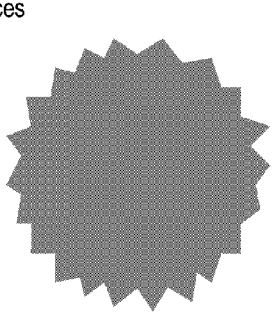
FIG. 1B shows an example of shading that may be displayed on a canvas when the example polygon of FIG. 1A is initially applied, according to at least some embodiments.

FIG. 1A illustrates the border of an example polygon, according to at least some embodiments. Example vertices that define the polygon are shown, as well as example edges that connect the vertices. A polygon with irregular, jagged edges as shown in FIG. 1A may be defined as an initial shape. However, the polygon shown in FIG. 1A may also be representative of a smooth-edged polygon after one or more iterations of growing the border. In at least some embodiments, the edges of a polygon may be Bezier curves to facilitate smoothness, for example when zooming in. FIG. 1B shows an example of shading that may be displayed on a canvas for the example polygon of FIG. 1A.

Figure 1C:
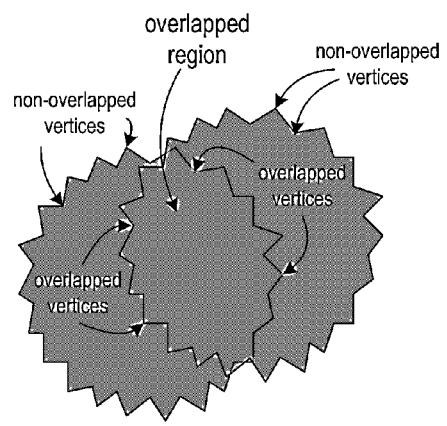
FIG. 1C shows an example in which two of the example polygon from FIGS. 1A and 1B are applied so as to partially overlap, according to at least some embodiments.

Polygons may be individually applied to the digital canvas, or may be applied in groups that include two or more polygons. In this document, a group may be defined as a collection of one or more polygons that may be applied as a unit to a canvas. Two or more polygons applied to a digital canvas, for example in a brush stroke, may overlap. Generally, to achieve various fluid motion effects, polygons are applied so that two or more polygons do overlap. Overlapping may occur when one polygon is first applied, and a second polygon is then applied that overlaps the first polygon. In addition, two or more polygons in a group of polygons applied to the canvas as a unit may overlap. Two or more polygons that do not overlap when initially applied to the canvas may also grow until the polygons do overlap. FIG. 1C shows an example in which two of the example polygon from FIGS. 1A and 1B are applied so as to partially overlap. The borders are shown in this example for clarity. Note the overlapping region.

A second polygon (or overlapping polygon) that overlaps a first polygon (or overlapped polygon) may be affected by the first polygon. For example, the color of an overlapping, semitransparent polygon may be blended with the color of an overlapped polygon according to an opacity level of the overlapping polygon, as shown in the overlapping region of FIG. 1C. In at least some embodiments, opacity may be stored and indicated as a real number within a range [0.0, 1.0], with 0.0 indicating fully transparent and 1.0 indicating fully opaque. Note that other methods may be used to store and/or indicate opacity, for example integers in the range [0, n] where 0 is fully transparent and n is fully opaque. The opacity of a polygon may be decreased as the polygon grows, so that polygons tend to become more transparent as they grow. As a polygon becomes more transparent (or less opaque), more of the color underneath the polygon is blended with the overlapping polygon. As another example, the wetness of an overlapped polygon may affect the growth of an overlapping polygon. Each polygon may have a wetness attribute. The wetness attribute may be related to the lifespan of the polygon; as long as the polygon is alive, the polygon is considered to be wet. If a second polygon is applied that at least partially overlaps a first polygon that is still wet, the velocity of vertices on the border of the second polygon that are within the first polygon may be increased to account for the wetness of the first polygon. Note that one or more attributes of an overlapped polygon may also be affected by an overlapping polygon. For example, the wetness of the overlapping, live polygon may affect the velocity of at least some of the vertices of an overlapped polygon that is still alive according to its lifespan, and therefore still wet. FIG. 1C shows examples of overlapped vertices and non-overlapped vertices for the two overlapped polygons. As long as the overlapped vertices of a wet polygon are within another, still wet polygon, the overlapped vertices may tend to grow faster than non-overlapped vertices. These behaviors of overlapped, semitransparent polygons tend to blend two overlapped polygons with a realistic fluid flow effect (see, e.g., FIG. 19).

Figure 2A:
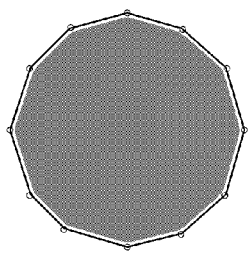
FIGS. 2A through 2D show various examples of polygons that may be used, according to at least some embodiments.
Figure 2B:
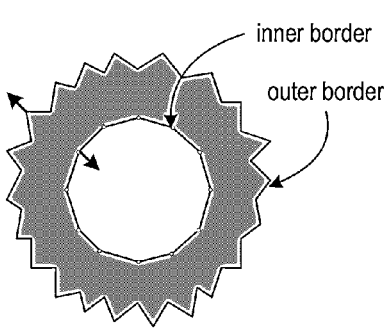
Figure 2C:
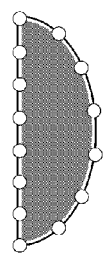
Figure 2D:
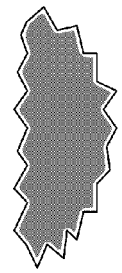

Polygons of various sizes, symmetrical or asymmetrical shapes, regular or irregular shapes, and number of vertices on the border(s) may be specified and applied. FIGS. 2A through 2D show various examples of polygons that may be used, according to at least some embodiments. FIG. 2A illustrates an example polygon that has a relatively smooth border, in contrast to the example polygon in FIG. 1A that has a jagged border. FIG. 2B illustrates an example polygon that has two borders, an inner border and an outer border, that may be supported in some embodiments. Both the inner border and the outer border include a plurality of vertices, and the vertices on both borders may be grown independently as described herein. The black arrow from an example vertex on the inner border represents a local vector of the inner border, and the black arrow from an example vertex on the outer border represents a local vector of the outer border. Note that, in this example, the outer border tends to expand outward, while the inner border tends to expand inward to fill the "hole." FIGS. 2C and 2D illustrate example polygons. In contrast to the substantially circular example polygons of FIGS. 1A, 2A, and 2B, the example polygons of FIGS. 2C and 2D have irregular shapes. FIG. 2C shows a half-moon shaped polygon. Note that the border of the polygon may be defined by multiple vertices, as illustrated by the small circles along the border of this polygon. FIG. 2D shows another half-moon shaped polygon with jagged edges. A polygon with jagged edges as shown in FIG. 2D may be defined as an initial shape. However, the polygon shown in FIG. 2D may also be representative of a polygon after one or more iterations of growing the border, for example the border of the example polygon of FIG. 2C. In addition to various sizes, shapes and number of vertices, polygons with various global attribute settings, such as initial direction, velocity, color, opacity, and lifespan, may be specified and applied.

Figure 3:
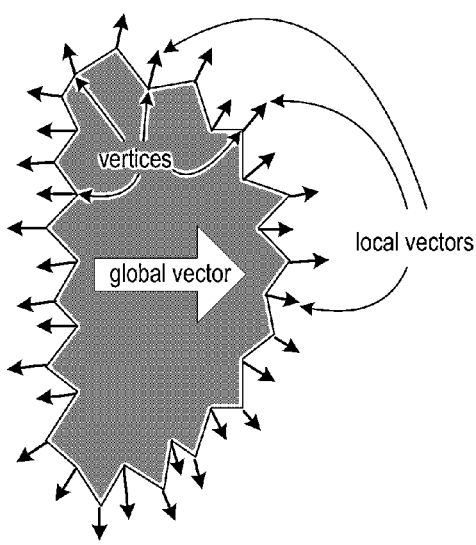
FIG. 3 illustrates global and local attributes of an example polygon, according to at least some embodiments.

FIG. 3 illustrates global and local attributes of an example polygon, according to at least some embodiments. The border of the polygon is defined by a set of vertices. The vertices may be independently grown from their initial positions when applied to a digital canvas to simulate the spread of a fluid. The polygon may have one or more global attributes, such as a global vector and a lifespan, that may affect the growth of the border. The white arrow in FIG. 3 illustrates an example global vector for the polygon. In at least some embodiments, each vertex on the border of a polygon may have one or more local attributes, such as a local vector, that locally affect the movement of the individual vertex. The black arrows extending from the vertices of the polygon in FIG. 3 illustrate example local vectors. In at least some embodiments, a randomization technique may be applied to the movement at each vertex to simulate the non-uniform expansion along the edges of a deposited fluid, for example in a watercolor simulation.

Note that while FIG. 3 shows an example polygon that includes a global vector that indicates direction (which may influence at least the initial direction of movement of the vertices) and length (which may be taken to represent an initial velocity that may influence at least the initial velocity at which the vertices move), a polygon may have a null or zero global vector. In a polygon with a null global vector, the direction and velocity of the movement of the vertices may be determined primarily by the attributes of the vertices, for example by the local vectors of the vertices. For example, a substantially circular polygon, such as the polygons illustrated in FIGS. 1A-1B, 2A, and 2B may have a null global vector so that the vertices tend to expand outward in a more or less uniform fashion according to the vertices' respective local vectors and velocities. The effect of a polygon's global vector on the movement of the vertices will be further discussed below.

Figure 4:
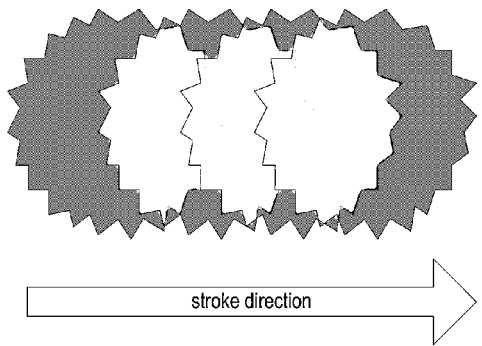
FIG. 4 illustrates the application of four instances of the example polygon from FIGS. 1A and 1B to a canvas, according to some embodiments.

Polygons may be applied to a canvas via manual input techniques (e.g., one or more polygons may be applied to a canvas using brush strokes) or via automated techniques (e.g., one or more polygons may be programmatically applied to borders of an object in an input image). Two or more polygons applied to a canvas via one of these techniques may overlap. The polygons may generally be, but are not necessarily, semitransparent. A set of polygons applied by one of these techniques may be, but are not necessarily, of uniform color. FIG. 4 illustrates the application of four instances of the example polygon from FIGS. 1A and 1B to a canvas, according to some embodiments. The border of the polygons is shown for clarity. The white arrow indicates the direction of the stroke. Thus, the leftmost polygon was the first applied, and the rightmost polygon was the last applied. Note that each polygon overlaps, or is overlapped by, at least one other polygon.

Groups

As previously mentioned, polygons may be individually applied to the digital canvas, or may be applied in groups that include two or more polygons. A group may be defined as a collection of one or more polygons that may be applied as a unit to a canvas. In a group including two or more polygons, the individual polygons may be of different sizes and shapes, may have a different number of vertices on the border, and may have different global attribute settings, for example different initial directions and/or velocities. Grouping two or more polygons and applying the polygons in groups as a unit may help to achieve various fluid motion effects that are not easy or not possible to achieve by applying a single polygon.

Figure 5:
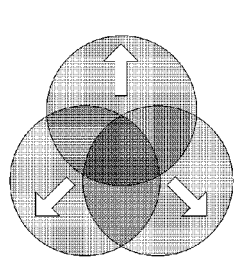
FIG. 5 illustrates an example group that includes three partially overlapping, semitransparent polygons, according to at least some embodiments.

FIGS. 5 through 11 illustrate several example groups that each include two or more polygons, according to some embodiments. Note that, while FIGS. 5-7 and 10 show the polygons as circles for illustrative purposes, in practice the borders of each polygon may be represented by vertices connected by edges. The white arrows on the polygons in FIGS. 5 through 10 illustrate example global vectors of the polygons. Note that the global vectors of the various polygons may be different so that the respective polygons have different initial directions and/or different initial velocities FIG. 5 illustrates an example group that includes three partially overlapping, semitransparent polygons, according to at least some embodiments. Note the region in the center where all three polygons overlap, and that the global vectors are initialized so that the vertices of the three polygons tend to grow outward from the center of the group. However, note that the velocities of the vertices in overlapped portions may be influenced (e.g., sped up) due to the fact that the vertices are in "wet" portions of overlapped or overlapping polygons. This may tend to pull the portions of the border that are in overlapped regions into the other polygons so that the overlapping polygons tend to merge and blend (see, e.g., FIG. 19).

Figure 6:
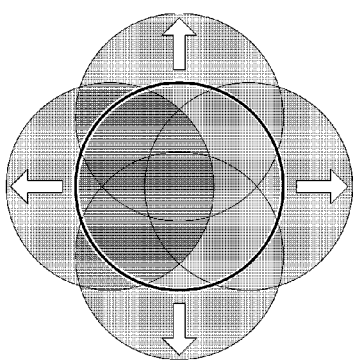
FIG. 6 illustrates an example group that includes five overlapping polygons, according to at least some embodiments.

FIG. 6 illustrates an example group that includes five overlapping polygons, according to at least some embodiments. A center polygon is represented by the bolded circle; the center polygon is surrounded by four outer, partially overlapping polygons. The four outer polygons each has a global vector with direction and velocity; the center polygon has a null or zero global vector.

Figure 7:
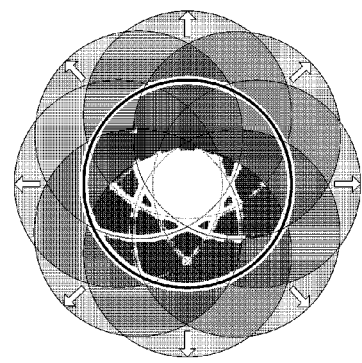
FIG. 7 illustrates an example group that includes nine overlapping polygons, according to at least some embodiments.

FIG. 7 illustrates an example group that includes nine overlapping polygons, according to at least some embodiments. A center polygon is represented by the bolded circle; the center polygon is surrounded by eight partially overlapping polygons. Each of the eight outer polygons has a global vector with direction and velocity; the center polygon has a null or zero global vector.

Figure 8:
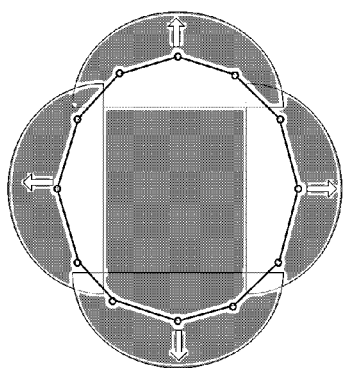
FIG. 8 illustrates an example group that includes the example polygon of FIG. 2A in the center, surrounded by four polygons similar to the example polygon of FIG. 2C.
Figure 9:
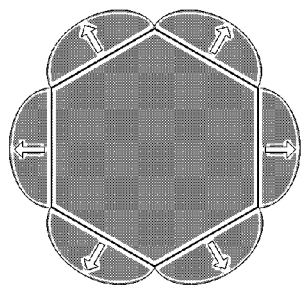
FIG. 9 illustrates an example group that includes a six-sided polygon in the center, surrounded by six polygons similar to the example polygon of FIG. 2C.

While FIGS. 5 through 7 illustrate example groups that include polygons of substantially the same size and shape, a group may include polygons of different sizes and/or shapes, as illustrated in FIGS. 8 through 11. FIG. 8 illustrates an example group that includes the example polygon of FIG. 2A in the center, surrounded by four polygons similar to the example polygon of FIG. 2C. Each of the four outer polygons partially overlaps the center polygon. The four outer polygons all have global vectors with direction and velocity; the center polygon has a null or zero global vector. FIG. 9 illustrates an example group that includes a substantially hexagonal polygon in the center, surrounded by six irregular polygons similar to the example polygon of FIG. 2C. The six outer polygons do not initially overlap the center polygon. The six outer polygons all have global vectors with direction and velocity, as shown by the white arrows; the center polygon has a null or zero global vector. Note that the center polygon may have additional vertices between the six shown vertices to provide a more natural fluid motion effect.

Figure 10:
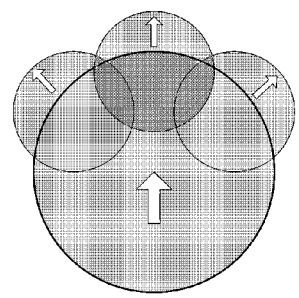
FIG. 10 illustrates an example group that includes a relatively large polygon with three partially overlapping smaller polygons arranged along one side of the larger polygon.
Figure 11:
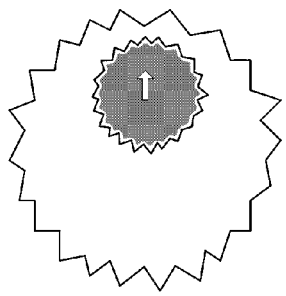
FIG. 11 illustrates an example group in which a larger polygon completely overlaps or encloses a smaller polygon.

While FIGS. 5 through 9 illustrate example groups in which the polygons appear to be arranged in a regular pattern, polygons may be arranged in irregular patterns in a group, as illustrated in FIGS. 10 and 11. FIG. 10 illustrates an example group that includes a relatively large polygon with three partially overlapping smaller polygons arranged along one side of the larger polygon. Note that, in this example, all four polygons have global vectors with direction and velocity, as shown by the white arrows.

While FIGS. 5 through 10 illustrate example groups in which the polygons partially overlap, a group may include one or more polygons that are completely overlapped by other polygons. For example, FIG. 11 illustrates an example group with two polygons; a larger polygon that completely overlaps or encloses a smaller polygon. Note that, in this example, the smaller polygon has a non-null global vector, while the larger polygon has a null or zero global vector. FIG. 11 may also be used to illustrate the use of water, for example in a watercolor simulation application. The larger polygon in this example may be water, while the smaller, enclosed polygon may be pigment. In at least some embodiments, to designate a polygon as water, the opacity may be set to 0 so that the polygon is fully transparent. A water polygon may, but does not necessarily, grow, but contributes no pigment or shading since it is fully transparent. However, a water polygon may affect other polygons that overlap, or are overlapped by, the polygon. For example, the velocity of the vertices of the smaller, pigment polygon in FIG. 11 may be increased to account for the wetness of the larger, water polygon.

Figure 12:
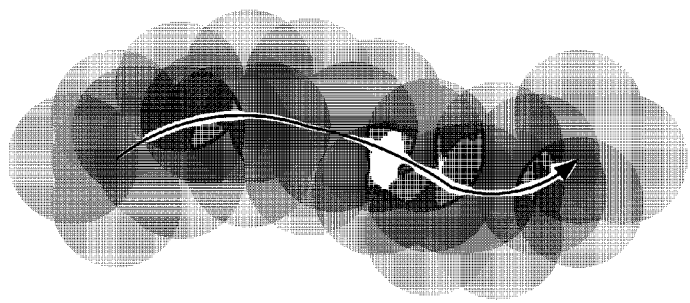
FIG. 12 illustrates the application of eight instances of the example group from FIG. 6 to a canvas, according to at least some embodiments.

One or more groups each including one or more polygons may be applied as units via manual input techniques (e.g., groups may be applied to a canvas using brush strokes) or via automated techniques (e.g., groups may be programmatically applied to borders of an object in an input image). Two or more groups deposited on a canvas via one of these techniques may overlap. The polygons in the groups may generally be, but are not necessarily, semitransparent. The polygons in each group applied by one of these techniques may be, but are not necessarily, of uniform color. FIG. 12 illustrates the application of eight instances of the example group from FIG. 6 to a canvas, according to at least some embodiments. The borders of the polygons are not shown. The black arrow indicates the direction of the stroke that applied the groups. Thus, the leftmost polygon was the first applied, and the rightmost polygon was the last applied. Note that each polygon overlaps, or is overlapped by, at least one other polygon, and that each group overlaps, or is overlapped by, at least one other group.

Vertex, Polygon and Group Attributes

In at least some embodiments, each vertex of a polygon may have a set of one or more attributes, such as local vector, position, and velocity, that may be specifically assigned to that vertex. In addition, each polygon may have a set of one or more attributes, such as a global vector, color, opacity, and velocity, that may be specifically assigned to the polygon. Two polygons in a group may have different values for at least some attributes, such as a global vector, velocity and opacity. In addition, a group may have a set of one or more attributes that may be applied to polygons within the group. For example, a group color attribute and a group lifespan attribute may be applied to, or inherited by, all of the polygons in the group. Other examples include, but are not limited to, opacity, which in some embodiments may be set at the group level and inherited by or applied to polygons within the group.

The following illustrates, at an abstract level, how a data structure for representing a group of one or more polygons may be formed in at least some embodiments, and is not intended to be limiting. Note that, in at least some embodiments, the polygons may be stored in a format, or alternatively converted to a format, that can be processed by a graphics processing unit (GPU):

```
GROUP X
    <group attributes, e.g. lifespan, size, opacity, velocity color, etc.>
    Group Polygon List:
        POLYGON A
            <polygon attributes, e.g. global vector, velocity, etc.>
            Polygon Vertex List:
                VERTEX 1
                    <vertex attributes, e.g. local vector, velocity,
                    position>
                VERTEX 2
                    <vertex attributes, e.g. local vector, velocity,
                    position >
                .
                .
                .
            <end Polygon Vertex List >
        POLYGON B
            <polygon attributes, e.g. global vector, velocity, etc.>
            Polygon Vertex List:
                VERTEX 1
                    <vertex attributes, e.g. local vector, velocity,
                    position >
                VERTEX 2
                    <vertex attributes, e.g. local vector, velocity,
                    position >
                .
                .
                .
            <end Polygon Vertex List >
        .
        .
        .
    <end Group Polygon List>
<end GROUP X>
```

Brushes

In at least some embodiments, various brushes (or more generally applicators) may be defined; a defined brush may then be used to apply particular groups of one or more polygons as units to a digital canvas. Multiple units, generally but not necessarily overlapping, may be applied by a brush in one action, for example via a stroke applied using a cursor control device such as a mouse. For example, a graphical user interface may be provided via which a user may select a brush and apply strokes to a canvas using the selected brush, each stroke applying one or more units to the canvas according to factors including the path, length, and speed of the stroke. As another example, a graphical user interface may be provided via which a user may select a brush that may be used to programmatically apply groups of polygons to borders of an object in an input image. A brush may have various attributes, such as size, opacity, and color, that may be applied to or inherited by the units of the brush. In some embodiments, a brush may be defined with preset attributes, such as size and opacity. In some embodiments, a user may change one or more attributes of a brush, for example the color to be applied by the brush, prior to or between strokes. For example, in some embodiments, a user may set or change the color of a brush before a stroke is applied by selecting a color (or a blending of colors) from a palette user interface. As another example, in a watercolor simulation application or similar application, a user may add water to a brush before a stroke is applied to dilute the color of the brush and also to change the fluid dynamics (e.g., the velocity) of the watercolor paint.

The following illustrates, at an abstract level, how a data structure for representing a brush may be formed in at least some embodiments, and is not intended to be limiting:

```
BRUSH Z
    <brush attributes, e.g. size, opacity, velocity, color, lifespan, etc.>
    GROUP X (inherits one or more attributes from the brush)
<end BRUSH Z>
```

While this example shows a brush Z that includes one group X that may be applied using the brush, in at least some embodiments a brush may include and apply two or more different groups.

Figure 13:
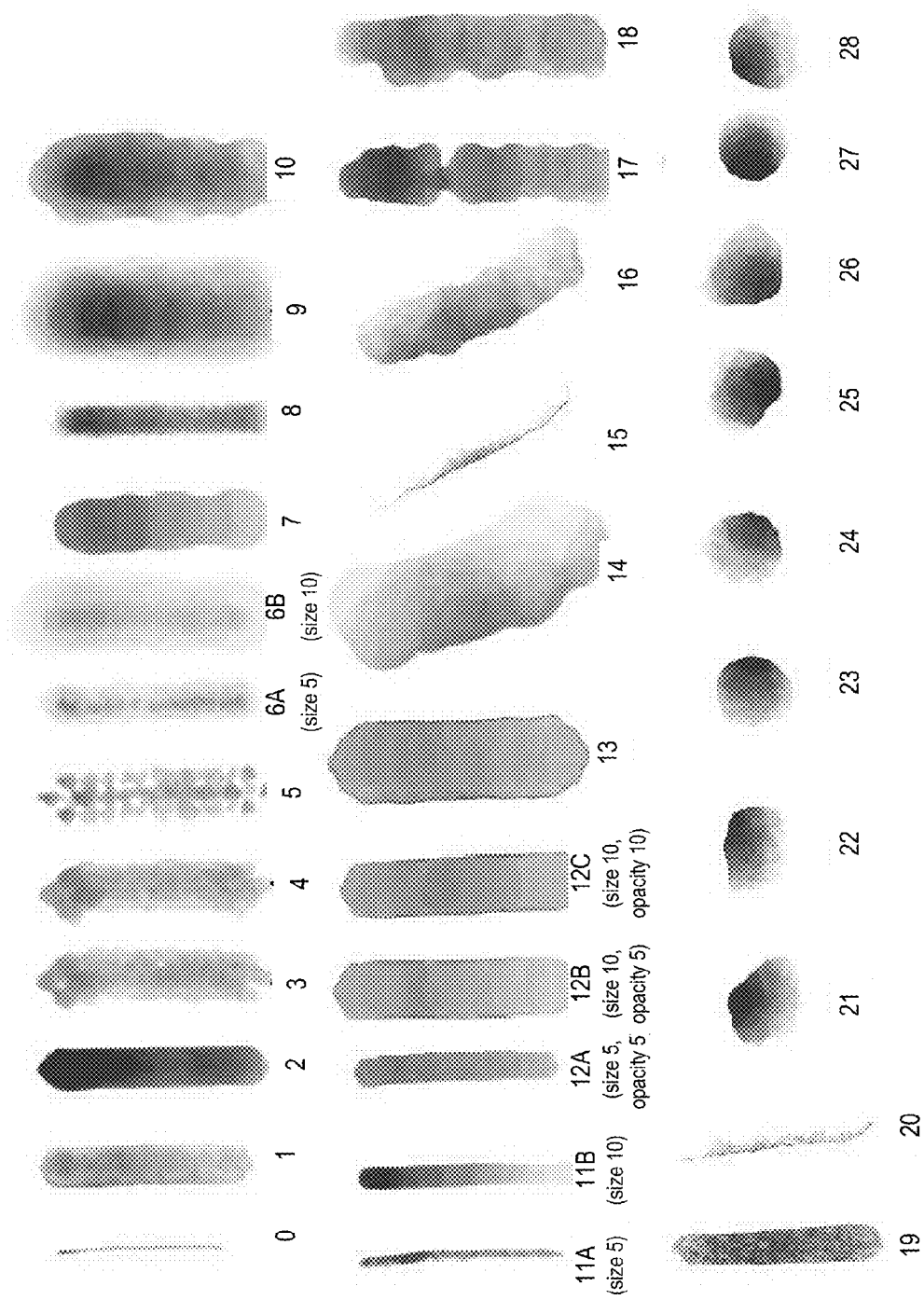
FIG. 13 illustrates a set of example brush strokes made by example brushes that may be defined, for example for a watercolor simulation application, according to at least some embodiments.

FIG. 13 illustrates a set of example brush strokes made by example brushes that may be defined, for example for a watercolor simulation application, according to at least some embodiments. FIG. 13 shows 29 different brushes (brushes 0 through 28), each brush including at least one group that may be applied to a canvas using the respective brush. In addition, some of the brushes (e.g., brushes 6A-B, 11A-B, and 12A-C) have different brush attributes assigned to similar groups, so that there are two number 6, two number 11, and three number 12 brushes. Brush 6, for example, has two versions: brush 6A, size 5, and brush 6B, size 10. As another example, brush 12 has three versions: brush 12A, size 5, opacity 5; brush 12B, size 10, opacity 5; and brush 12C, size 10, opacity 10. Also note that brushes 21 through 28 are similar, but differ primarily in direction or vector.

Figure 14:
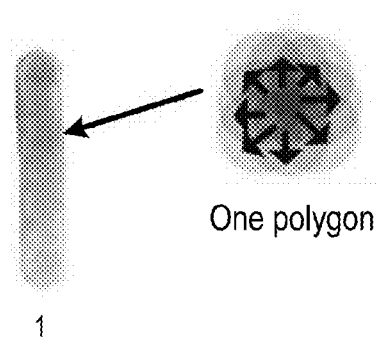
FIG. 14 shows example brush 1 from FIG. 13 as including a group with one substantially circular polygon.
Figure 15:
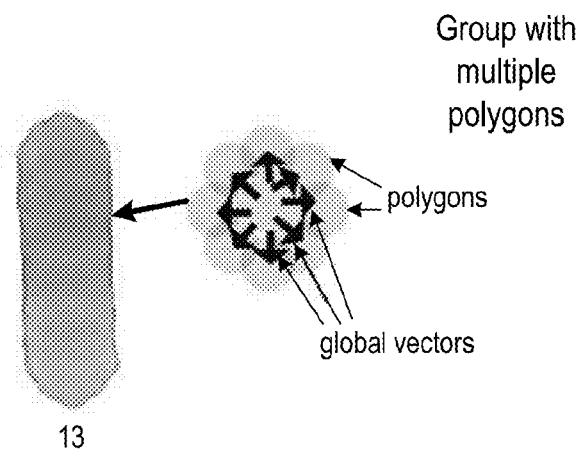
FIG. 15 shows example brush 13 from FIG. 13 as including a group with multiple substantially circular polygons.
Figure 16:
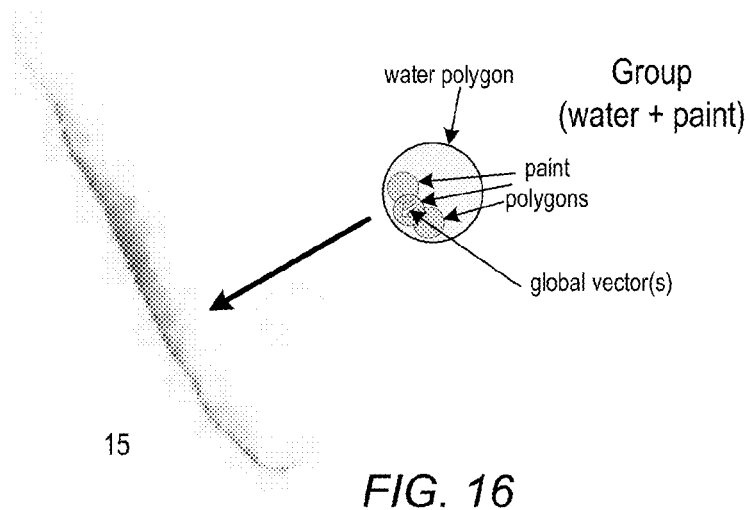
FIG. 16 shows example brush 15 from FIG. 13 as including a group with multiple substantially circular polygons, where one of the polygons is water and the others are pigment.

FIGS. 14 through 16 show some of the example brushes from FIG. 13 in more detail. FIG. 14 shows example brush 1 from FIG. 13 as including a group with one substantially circular polygon. The black arrows show the direction of growth of the vertices of the polygon; the vertices tend to grow outward from the center of the polygon. FIG. 15 shows example brush 13 from FIG. 13 as including a group with multiple substantially circular polygons. Each polygon in the group includes a global vector that defines or influences the growth of the respective polygon.

In at least some embodiments, different polygons in a group may have different attributes that affect the visual results of painting with the brush. For example, in some embodiments, different polygons in a group may represent different substances, such as water and pigment, that may be used to generate various painting effects. As an example, FIG. 16 shows example brush 15 from FIG. 13 as including a group with multiple substantially circular polygons, where one of the polygons is water and the others are pigment (e.g., watercolor pigment). The larger outer polygon contains water, while the three smaller, inner polygons arranged on one side of the larger polygon contain paint or pigment. In at least some embodiments, to designate a polygon as water, the opacity may be set to 0 so that the polygon is fully transparent. The inner, paint polygons have global vectors that tend to spread the paint towards the near edge of the larger, water polygon. The larger polygon has a null or zero global vector, so the water tends to spread outward relatively evenly in all directions according to the local vectors of the vertices. Note that, since the inner, paint polygons are within the outer, water polygon, the wetness of the outer polygon affects the velocity of the vertices of the inner polygons. Applying this group with a brush may have an effect as shown in brush 15, where a "leading edge" of the brush stroke has a higher concentration of pigment, while the trailing edge has less pigment.

Polygon Application, Growth, and Blending

In at least some embodiments, polygons may be applied to a canvas in groups of one or more polygons, as previously described. Polygons may be applied to a canvas via manual input techniques (e.g., one or more polygons may be applied to a canvas using brush strokes) or via automated techniques (e.g., one or more polygons may be programmatically applied, for example to borders of an object in an input image). Thus, polygon application may be event-driven or programmatic. In either case, a fluid motion simulation module may include an applicator submodule that enables and performs the application of the polygons to the canvas.

The growth and blending of the applied polygons may be performed by a process executing in the background. For example, a background process may be scheduled to execute 30 times a second, or 60 times a second, or at some other periodic or aperiodic interval, with a growth and blending step and possibly a rendering of the resulting image performed at each execution. The displayed image may be, but is not necessarily, updated at each execution of the background process. The background process may execute according to its cycle or schedule even if there are no user interface events (e.g., mouse-down events) or programmatic events between executions. Each polygon may include a lifespan attribute that may be initialized when the polygon is initially deposited on the canvas. At each execution, the background process may grow each polygon that is still alive according to the polygon's lifespan. The lifespan may, for example, be indicated by a counter that is initialized to some value and that is decremented (or, alternatively, incremented) at each execution of the background process; the polygon is alive until the counter reaches a specified threshold, e.g. zero. Alternatively, the lifespan may be time-based; that is, the polygon may be initialized to be alive for two seconds, or some other period. When that time is elapsed, the polygon is no longer alive, and thus is not grown by the background process. Alternatively, the growth and blending of the applied polygons may be performed by a process implemented as a programmatic loop, and thus not as a background process.

In at least some embodiments, at least part of the growth and blending process, for example the rendering of the updated polygons, may be performed on a GPU or GPUs. FIG. 27 shows an example fluid motion simulation module 920 that includes an applicator submodule 926 and a growth and blending submodule 928; the growth and blending submodule represents the background process or programmatic loop that grows, blends and renders the polygons. An example computer system on which embodiments of the fluid motion simulation module 920 may be implemented is illustrated in FIG. 28. FIGS. 21 and 22A-22C illustrate example user interfaces to a fluid motion simulation module that may be used in at least some embodiments.

In at least some embodiments, each deposited polygon is grown by independently moving the vertices of the polygon according to local vectors of the vertices; one or more other attributes of the vertex, polygon, and/or group may affect the movement. In at least some embodiments, each vertex has a position (e.g., an (x,y) coordinate) and a local vector or direction. A velocity, or speed, attribute affects how far a vertex may move at each movement. In at least some embodiments, a randomization technique may be applied to the movement at each vertex to simulate the non-uniform expansion along the edges of a deposited fluid. In at least some embodiments, at an initialization step for a polygon, at each vertex the global vector of the polygon and the initial local vector of the vertex are summed to generate a starting local vector for the vertex. Thus, the global vector of the polygon, if not null or zero, may influence the initial direction of movement at each vertex. In at least some embodiments, after the initialization of the polygon, at each growth step of the polygon (i.e., at each execution of the growth and blending submodule), at each vertex of the polygon, the following equation may be used to compute the new position to which the vertex is to be moved:

$$P_{new} = P_{old} + S*(V+R)$$

where $P_{old}$ designates the current position of the vertex, $P_{new}$ designates the new position for the vertex, V designates the local vector for the vertex, S designates the speed or velocity at the vertex, and R represents randomized values that may be added to the (x,y) coordinates of the vertex; the randomized values may be positive or negative. More specifically, the above equation may be expressed as:

$$P_{new} = P_{old} + S*(aV+bG+R)$$

where G is the global vector and a and b are scale factors to control their relative influences.

In at least some embodiment, S (the speed, or velocity) at each vertex may be obtained from or influenced by the velocity attribute of the respective polygon. That is, a velocity attribute of the polygon may determine or affect the velocity of the vertices. In some embodiments, S may be obtained from or influenced by the velocity attribute of the group to which the polygon belongs. In at least some embodiments, S may be adjusted according to the lifespan attribute of the polygon. For example, the speed of the polygon may be decreased with respect to the age of the polygon, so that the vertices tend to move faster when the polygon is first deposited, and tend to slow down as the polygon ages.

In at least some embodiments, at each vertex of a polygon, before computing $P_{new}$ for the vertex, a check may be performed to determine if the vertex is on a wet polygon that is overlapped by the vertex's polygon. If the vertex is on a wet polygon, then S (the speed, or velocity) at the vertex may be increased to account for the wetness of the overlapped polygon.

In at least some embodiments, to blend a polygon with an object beneath the polygon (e.g., the canvas, or another, overlapped polygon), a blending technique may be applied in which the color of the polygon is multiplied by an alpha value and added to the color of the object underneath the polygon, multiplied by (1−alpha). The blending equation that may be used in at least some embodiments may be expressed as:

Output color=alpha*polygon color+(1−alpha)*color of object to be blended.

The colors may be, but are not necessarily, RGB colors. Alpha may be expressed as a floating-point number, for example in the range [0,1]. In at least some embodiments, alpha may be, or may be derived from, the current opacity level of the polygon. In at least some embodiments, the shading of the polygon tends to get lighter or darker as the polygon grows. In at least some embodiments, to achieve this effect, the opacity of the polygon is decreased (or the transparency is increased) as the polygon increases in area. The color of the polygon remains constant, but the color is blended with the color of the object beneath the polygon, which tends to lighten or darken the shading depending on the respective colors. Note that other techniques for blending may be used in some embodiments.

Figure 17:
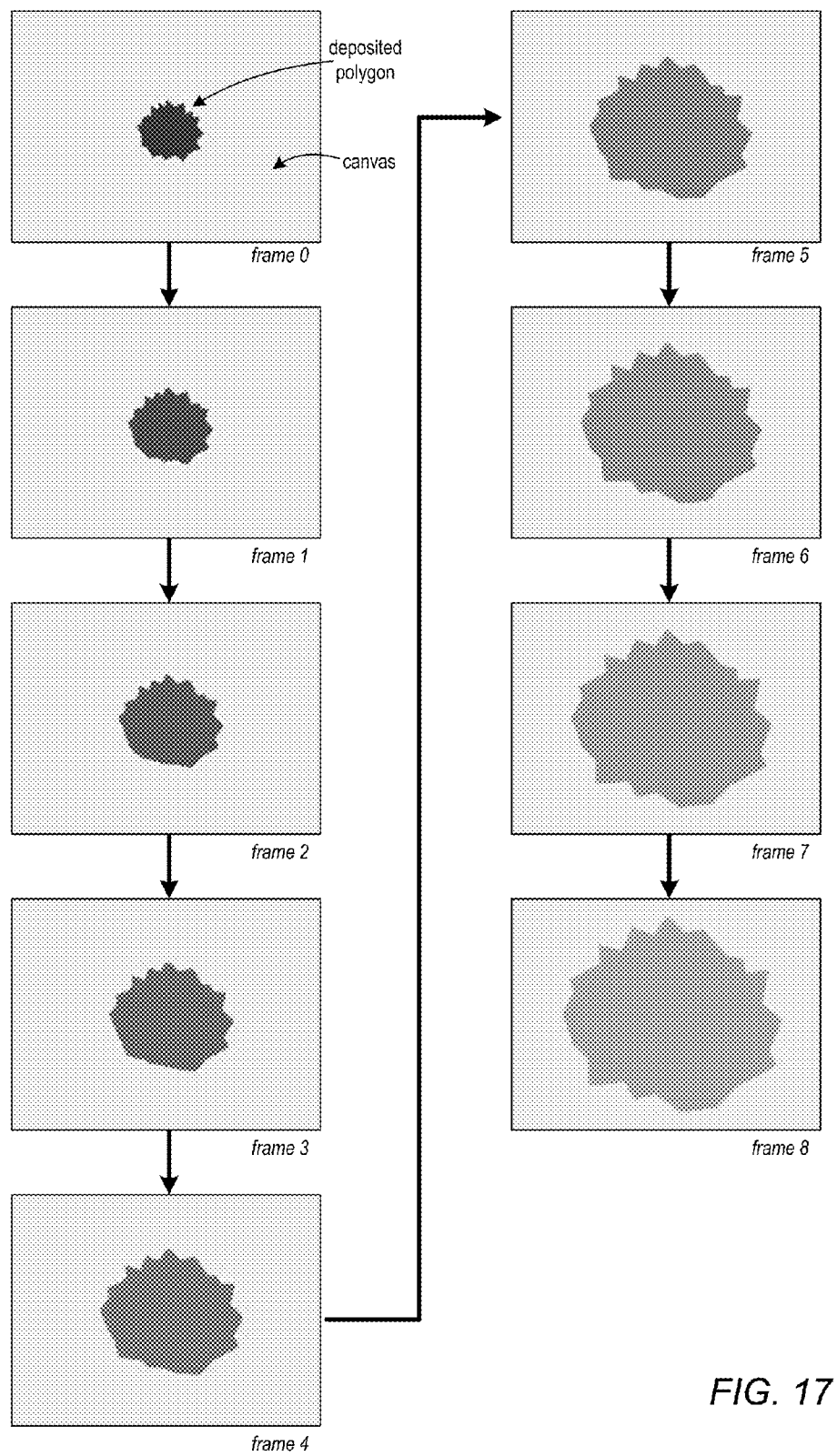
FIG. 17 illustrates the growth and blending of a polygon deposited on a digital canvas, according to at least some embodiments.
Figure 18:
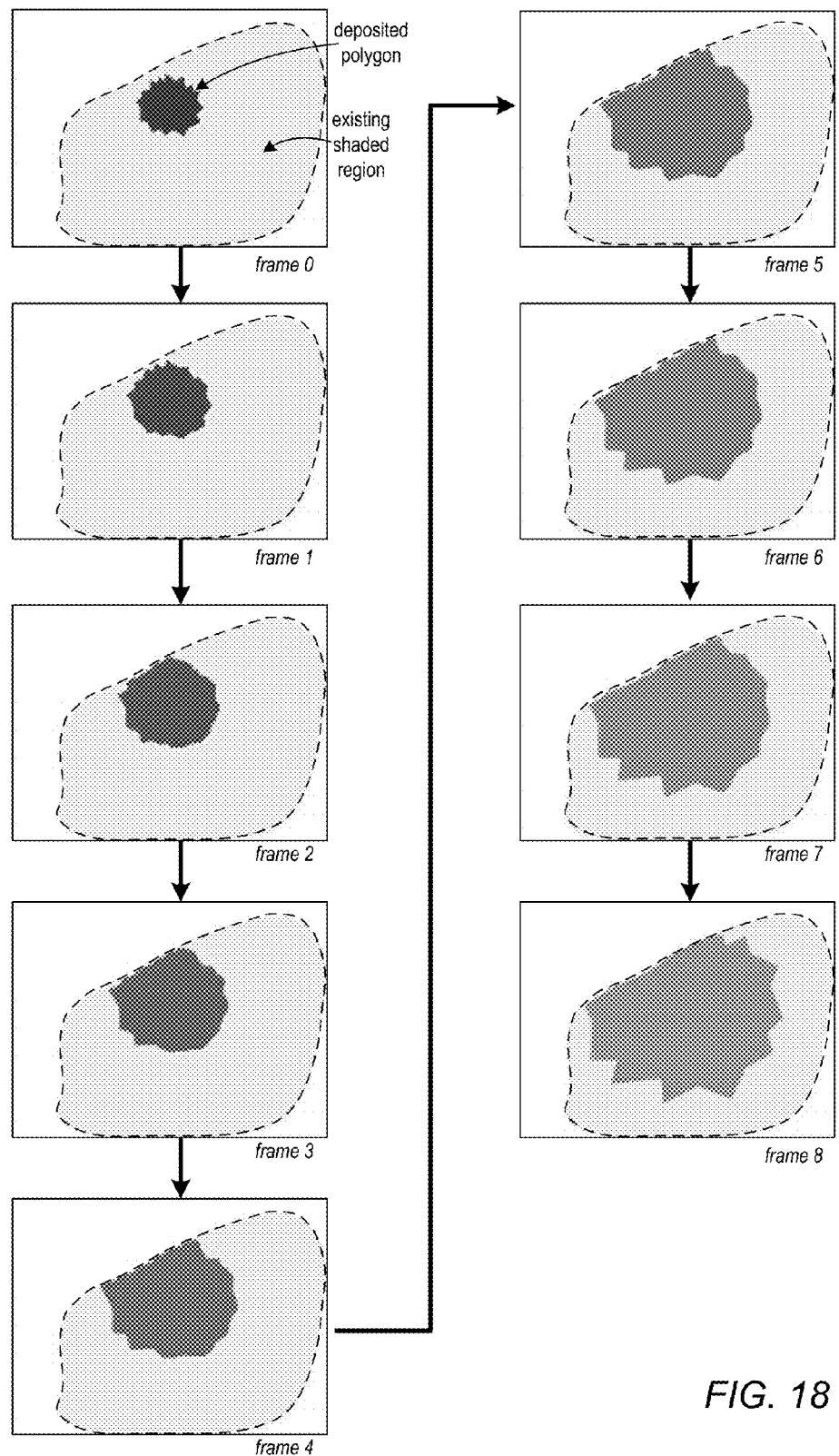
FIG. 18 illustrates the growth and blending of a polygon deposited on an existing painted region, according to at least some embodiments.
Figure 19:
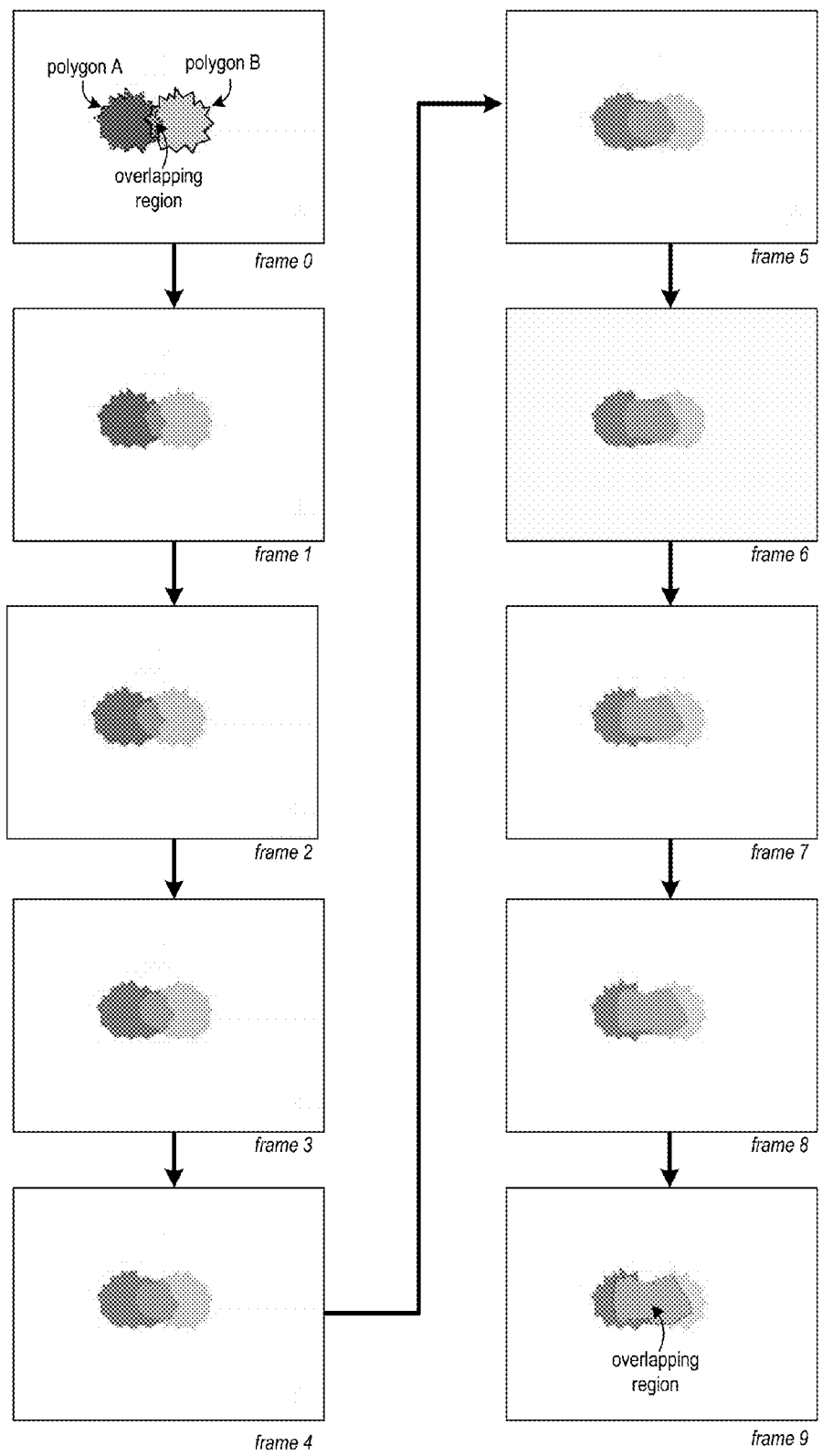
FIG. 19 illustrates the deposition, growth and blending of two partially overlapping polygons, according to at least some embodiments.

FIGS. 17 through 19 illustrate polygon growth and blending, according to at least some embodiments. These Figures are given for illustrative purposes, and are not intended to be limiting. Each frame in these Figures illustrates an example of an image that may displayed. The arrows between the frames represent at least one execution of a background process or programmatic loop that performs growth, blending, and rendering of the polygon(s).

FIG. 17 illustrates the growth and blending of a polygon, similar to the example polygon of FIGS. 1A and 1B, deposited on a digital canvas, according to at least some embodiments. FIG. 17, frame 0 shows the polygon as initially deposited on the canvas. FIG. 17, frames 1 through 8 illustrate the growth of the polygon by independently moving the vertices of the polygon in a background process or programmatic loop, as previously described. Note that, in this example, the shading of the polygon tends to get lighter as the polygon grows. In at least some embodiments, to achieve this effect, the opacity of the polygon is decreased (or the transparency is increased) as the polygon increases in area. The color of the polygon remains constant, but the color is blended with the color of the object(s) beneath the polygon, in this example the color of the canvas. Since, in this example, the canvas is lighter than the color of the polygon, as the opacity decreases, the shading of the polygon thus becomes lighter.

FIG. 18 illustrates the growth and blending of a polygon, similar to the example polygon of FIGS. 1A and 1B, deposited on an existing painted region, for example a region of previously deposited, but still wet paint, or alternatively a region of water that has been deposited on the canvas, according to at least some embodiments. The existing region is represented by the relatively lightly shaded area within the dashed line. FIG. 18, frame 0 shows the polygon as initially deposited on the existing region. FIG. 18, frames 1 through 8 illustrate the growth of the polygon by independently moving the vertices of the polygon in a background process or programmatic loop, as previously described. As previously noted, the wetness of an overlapped polygon may be accounted for by increasing the velocity of the vertices of an overlapping polygon. In this example, this effect causes the deposited polygon to rapidly spread out into the existing wet region. However, when a portion of the border of the polygon reaches the edge of the existing wet region, as can be seen beginning at frame 2, the vertices along this portion of the border of the polygon tend to slow down, as the vertices no longer lie on the wet overlapped polygon.

Since, in this example, the shading of the existing region is lighter than the color of the polygon, as the opacity decreases, the shading of the polygon thus becomes lighter as more of the color of the existing region overlapped by the polygon comes through.

The example shown in FIG. 18 may be used to illustrate a painting effect, for example a watercolor effect, that embodiments may enable. The existing region bounded by the dashed line may represent a shape deposited as a template. The template may be composed of one or more polygons, which may be referred to as template polygons. The attributes of each template polygon may be set so that the polygon is alive and thus wet, but with a velocity of 0, a null global vector, and null local vectors so that the polygon does not grow, but still affects other polygons that overlap the template polygon. A pigmented polygon deposited on the shape formed by the template polygon(s) may tend to grow outward to conform to the shape). Template polygons may be used, for example, to simulate a watercolor effect that is used in real watercolor painting in which a painter deposits paint in water previously deposited on a canvas; the deposited paint then spreads out into the water. To simulate this effect, one or more template polygons may be deposited with an opacity of 0 to represent water, a velocity of 0, and null vectors. The user may then deposit paint polygon(s) in the water; the deposited paint polygon(s) then expand to fill the shape formed by the water template polygon(s).

FIG. 19 illustrates the deposition, growth and blending of two partially overlapping polygons similar to the example polygon of FIGS. 1A and 1B, according to at least some embodiments. FIG. 19, frame 0 shows two polygons A and B as initially deposited on a canvas. The borders of the polygons are shown for illustrative purposes. The overlapping region of the two polygons is indicated. FIG. 19, frames 1 through 9 illustrate the growth of the polygons by independently moving the vertices of both polygons in a background process or programmatic loop, as previously described. As previously noted, the wetness of overlapping polygons may be accounted for by increasing the velocity of the vertices of one or both polygons. In this example, both polygons are wet, so this effect causes portions of each deposited polygon that lie within the other polygon to spread out into the other polygon. However, portions of the borders of the polygons that do not lie within the other polygon tend to grow slower, as the vertices do not lie on the other, wet polygon. Frame 9 shows a border for the overlapping region as a dashed line; note that the overlapping region has expanded into both polygons, and has grown much faster than the non-overlapped portions of the polygons.

Note that the shading of the overlapping region is a blending of the colors of the two polygons. While this image is in grayscale, if the images were color images, the blended colors of the polygon would be appropriately blended as a color mix. For example, if polygon A was blue and polygon B was yellow, the overlapping region would generally exhibit some shade of green, depending on the values of the blue and yellow polygons and on the opacity level. Also note that, as the polygons grow, the opacity of the polygons decreases; as the opacity decreases, the shading of the polygons, including the shading of overlapped regions, may become lighter or more diluted.

Figure 20A:
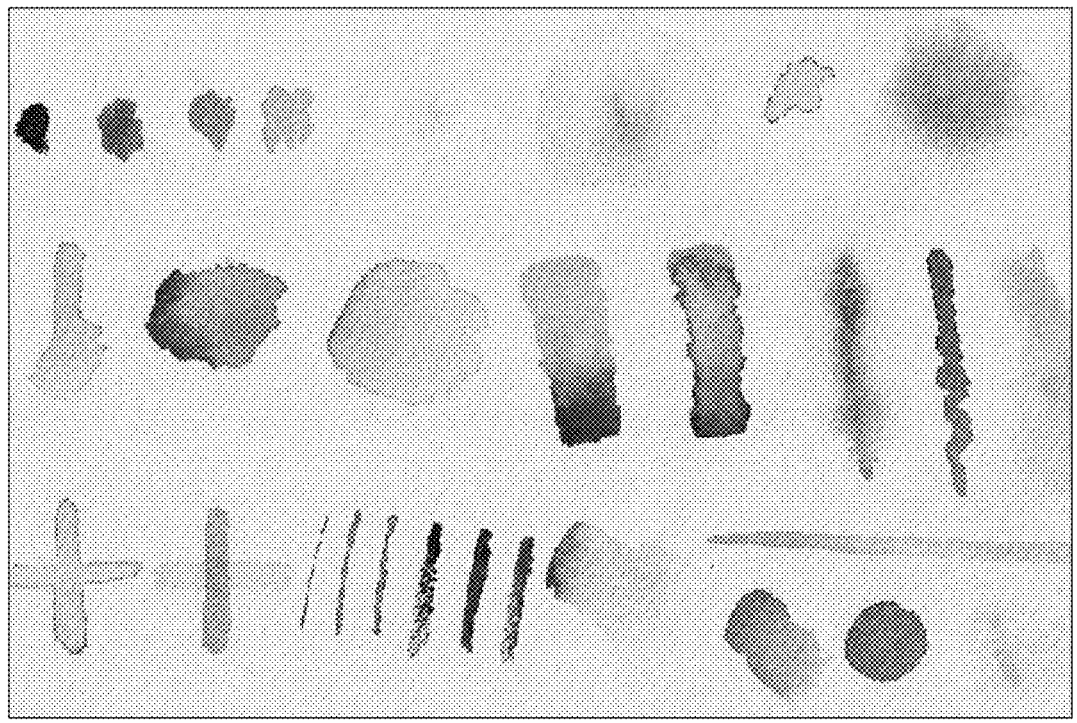
FIG. 20A is an image that shows several example real strokes and effects achieved via natural watercolor painting.
Figure 20B:
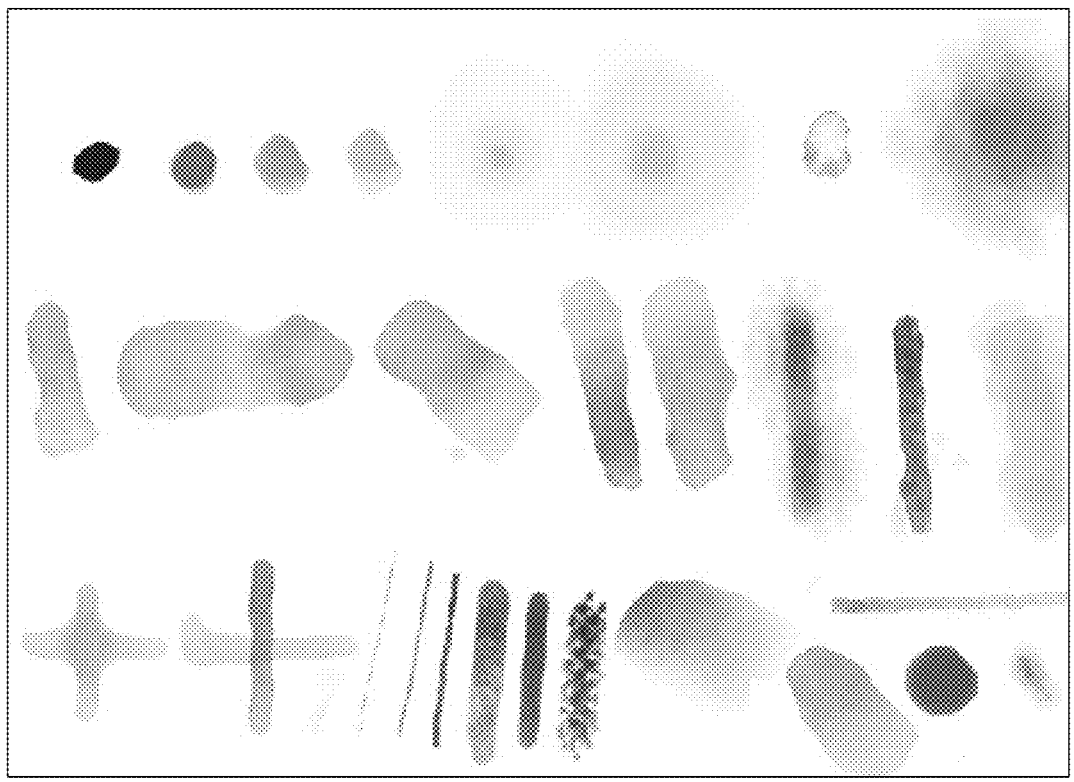
FIG. 20B illustrates each of the example real watercolor strokes in FIG. 20A simulated with an embodiment of the vector-based, fluid motion simulation technique.

While FIG. 19 shows two overlapping polygons, more than two polygons may overlap, as shown in FIGS. 4 and 12. The motion and blending effects may be applied to the overlapping regions, which may include portions of more than two polygons. For example, the velocity of more than one overlapped wet polygon may be used to alter the velocity of at least some of the vertices of an overlapping polygon. As another example, more than two polygons may be blended. In some embodiments, this blending of multiple polygons may be performed by first blending the overlapping portions of the two bottommost polygons, and then blending the results with the next highest polygon, and so on Watercolor Simulation As previously noted, an example application for embodiments of the vector-based, fluid motion simulation technique described herein is in watercolor simulation. For example, embodiments of the polygons, groups, brushes, and polygon growth and blending techniques as described herein may be used in a watercolor simulation application. A user interface may be provided via which a user may apply watercolor paint, water, and mixtures of paint and water to canvas using different brushes to simulate natural watercolor painting. FIG. 20A is an image that shows several example real strokes and effects achieved via natural watercolor painting. FIG. 20B illustrates each of the real examples in FIG. 20A simulated with an embodiment of the vector-based, fluid motion simulation technique as described herein. FIGS. 21 and 22A-22C illustrate example user interfaces that may be used in at least some embodiments of a watercolor simulation application that employs the vector-based, fluid motion simulation technique described herein.

Example User Interface

FIGS. 21 and 22A-22C illustrate example user interfaces that may be used with at least some embodiments of the vector-based, fluid motion simulation technique, for example in watercolor simulation applications. These user interfaces are given by way of example, and are not intended to be limiting.

Figure 21:
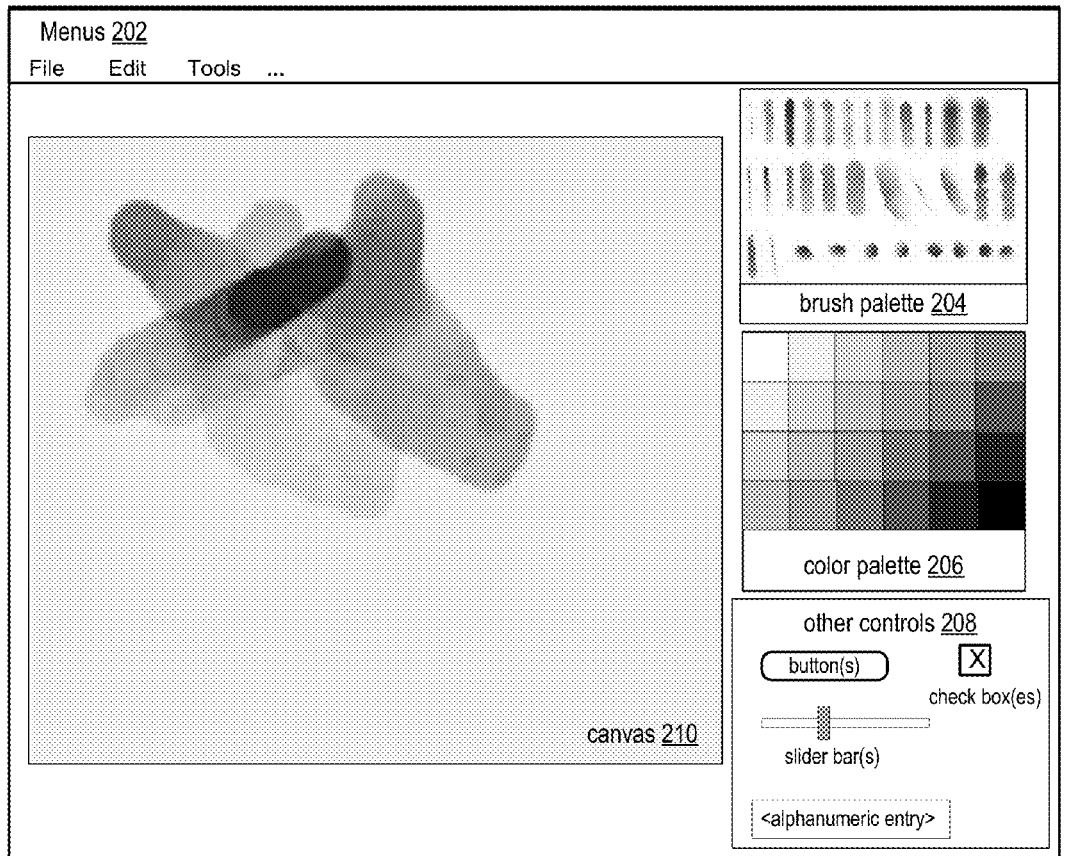
FIG. 21 illustrates a user interface that may be used with at least some embodiments of the vector-based, fluid motion simulation technique, for example in a watercolor simulation application.

FIG. 21 illustrates a user interface that may be used with at least some embodiments of the vector-based, fluid motion simulation technique, for example in a watercolor simulation application. The user interface 200 may provide a canvas 210 area on which painting is performed via one or more user interface elements and techniques. The user interface 200 may provide a menus 202 area that includes one or more menu user interface elements via which a user may select various menu items to perform various functions or select various tools of the application. For example, a menu may include an open option via which a user can open a new canvas 210, a save option via which a user may save a current canvas 210, and a print option via which a user may print a current canvas 210.

The user interface 200 may also provide a brush palette 204 that includes one or more user interface elements via which a user may select brushes for depositing paint on the canvas 210. The user interface 200 may also provide a color palette 206 that includes one or more user interface elements via which a user may select (or blend) pigments for paint to be deposited on the canvas 210 with a brush. While not shown, in some embodiments, the user interface 200 may also provide a user interface element via which a user may select water to be applied by a brush or add water to dilute the pigment(s) on a brush.

The user interface 200 may also include one or more other user interface elements or controls 208, which may include but are not limited to buttons, slider bars, check boxes, radio buttons, text entry boxes, and popup menus, via which a user may, for example, set or modify one or more attributes of the vector-based, fluid motion simulation technique as described herein, for example attributes of a polygon, a group, or a brush. For example, the user interface 200 may provide a control via which a user may set or change the opacity for paint to be applied by a brush. As another example, the user interface 200 may provide a control via which a user may set or change the size or diameter of strokes to be applied by a brush.

Figure 22A:
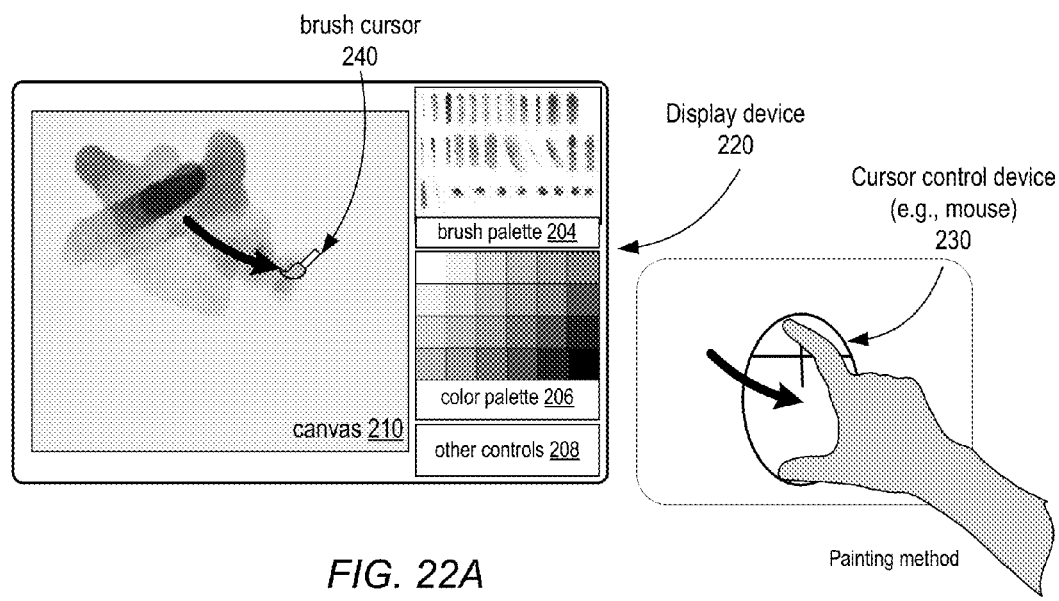
FIGS. 22A through 22C illustrate several methods that may be used to interact with a user interface to the vector-based, fluid motion simulation technique to deposit paint on a canvas and to perform other actions, according to at least some embodiments.
Figure 22B:
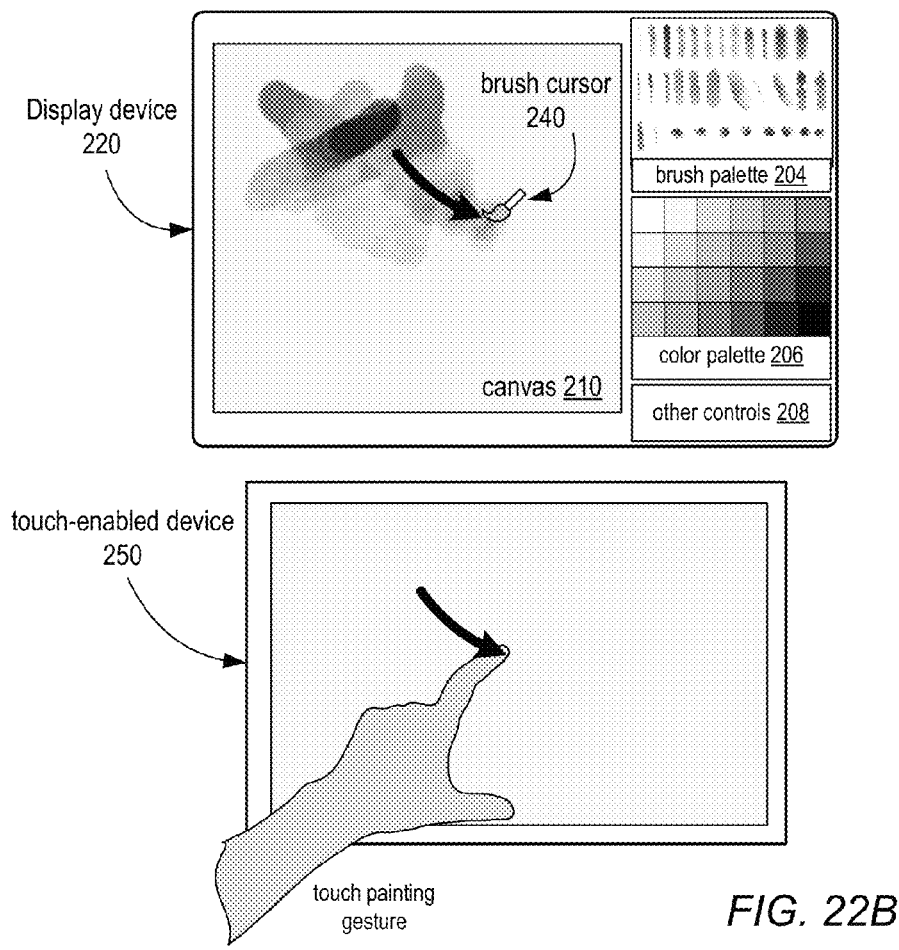
Figure 22C:
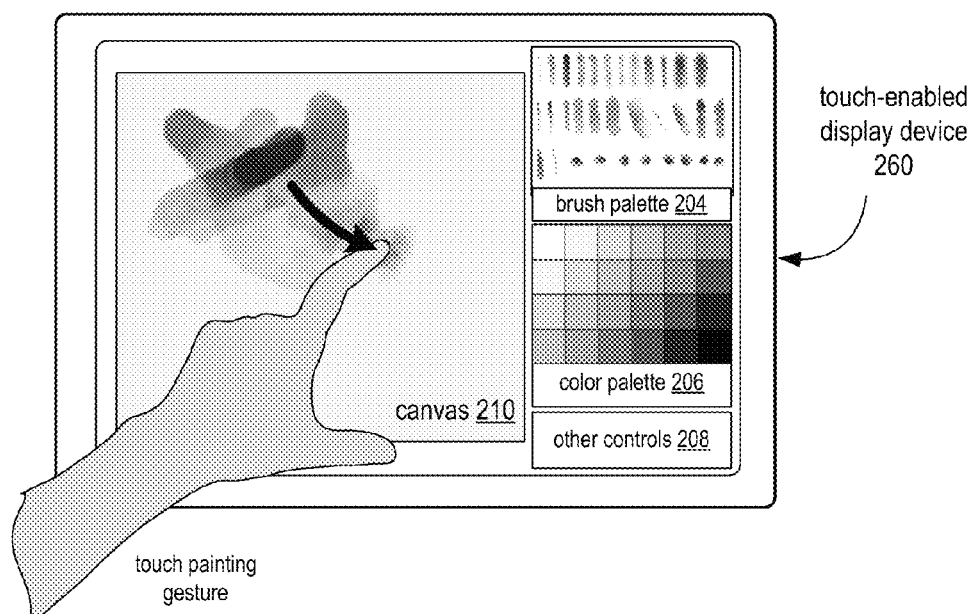

FIGS. 22A through 22C illustrate several methods that may be used to interact with the user interface 200 to deposit paint on the canvas 210 and to perform other actions, according to at least some embodiments of the vector-based, fluid motion simulation technique. FIG. 22A illustrates a method in which the user uses a cursor control device 230, for example a mouse, to control a brush cursor 240 displayed on a display device 220. To apply a stroke, the user may move the cursor control device 230 to cause a corresponding movement of the brush cursor 240 on the user interface 200. The black arrows indicate a brush stroke motion of the cursor control device 230, and a corresponding stroke applied to the canvas 210 with the cursor 240. Note that, in some embodiments, the user may, for example, hold down a mouse button when applying a brush stroke, releasing the mouse button when the stroke is done. The user may use the cursor 240 to perform other functions on the user interface, for example to select from the brush palette 204, color palette 206, and other controls 208.

In at least some embodiments, a touch method, where a user interacts with the user interface 200 via a touch-enabled device using gestures applied with one or more digits and/or a stylus, may be used. The touch-enabled device may be a conventional touch device in which a single digit or stylus is used, or a multi-touch device that accepts and processes substantially simultaneous input from two or more digits. FIG. 22B illustrates a method that employs a touch-enabled device 250, such as a touch-sensitive pad, to apply strokes to a canvas 210 displayed on a display device 220. The black arrows indicate a brush stroke gesture applied via the touch-enabled device 250, and a corresponding stroke applied to the canvas 210. FIG. 22C illustrates a method that employs a touch-enabled display device 260 to apply strokes to a canvas 210 displayed on the display device 260. The black arrow indicates a brush stroke gesture applied via the touch-enabled display device 260.

Some touch-enabled devices may be pressure-sensitive, and thus may support pressure functions. For example, a touch pad as illustrated in FIG. 22B may be pressure-sensitive. With such a device, at least some embodiments may support various functions enabled by pressure applied via a stylus to the touch surface. For example, varying levels of pressure applied by a stylus to the touch surface may be used to define the size of the brush, the opacity of the polygons or groups, the number of vertices in polygons, and so on. In addition, the angle or tilt of the stylus may be used to control the shape of the brush, the type of the brush, the direction (global vector) of the brush, or other brush attributes.

Figure 23:
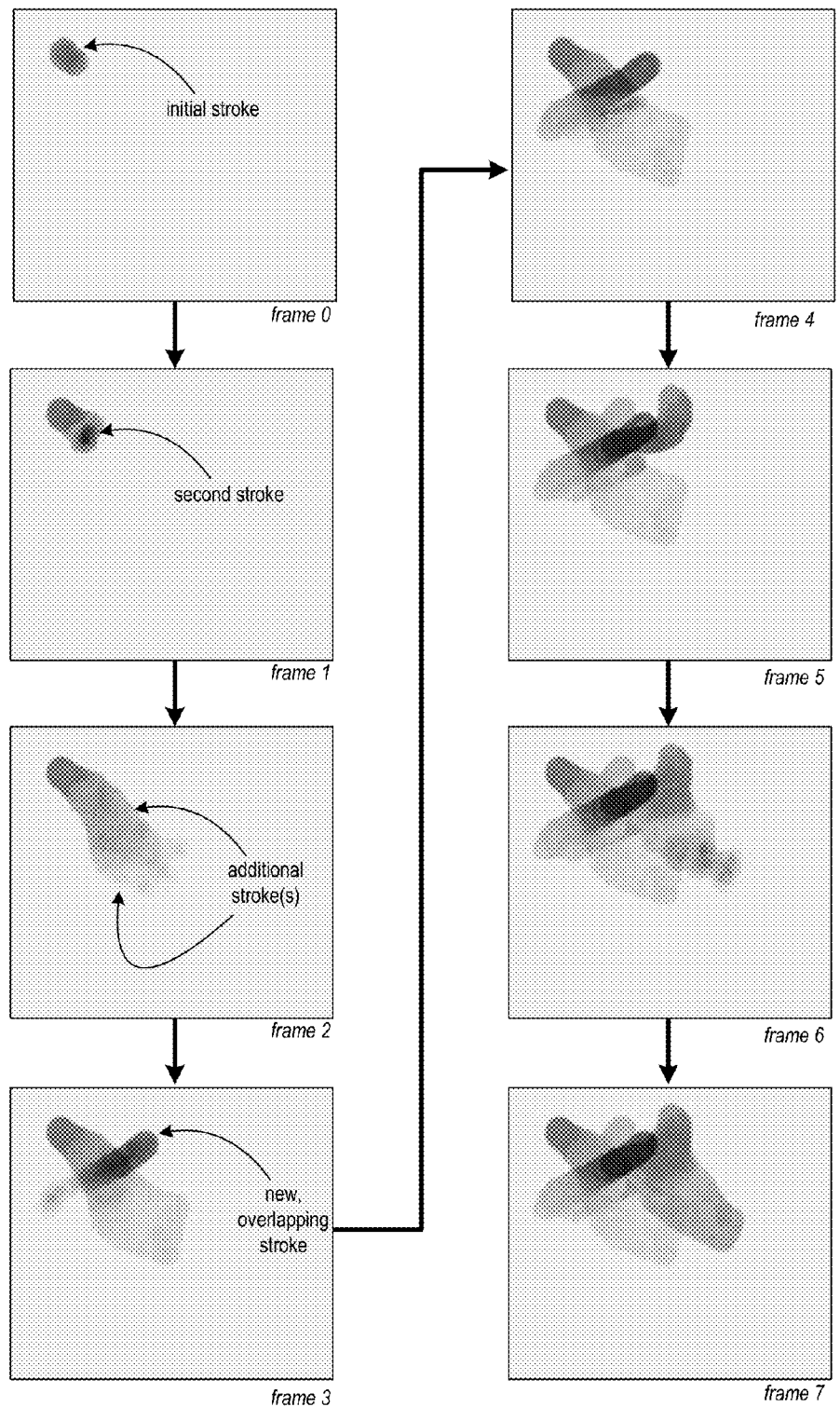
FIG. 23 illustrates an example of watercolor painting using the vector-based, fluid motion simulation technique, according to at least some embodiments.

FIG. 23 illustrates an example of watercolor painting using the vector-based, fluid motion simulation technique, according to at least some embodiments. The watercolor painting illustrated in FIG. 23 may be performed for example, using a user interface as illustrated in FIGS. 21 and 22A-22C. FIG. 23 is given for illustrative purposes, and is not intended to be limiting. Each frame in FIG. 23 illustrates an example of an image that may displayed. The arrows between the frames represent at least one execution of a background process or programmatic loop that performs growth, blending, and rendering of the polygon(s). The arrows that appear on some of the frames point to strokes that have been applied, but do not indicate the stroke motion itself. FIG. 23, frame 0 shows a stroke as initially deposited on the canvas. FIG. 23, frames 1 through 7 illustrate the depositing of additional strokes of various paints using various brushes, and the growth and blending of the deposited paint by independently moving the vertices of the polygons composing the deposited paint and blending of overlapping polygons with overlapped polygons in a background process or programmatic loop, as previously described. FIG. 23, frame 1 points out a second stroke applied to the canvas. FIG. 23, frame 2 points out an area in which one or more additional strokes have been applied. FIG. 23, frame 3 points out a new, overlapping stroke that has been applied. FIG. 23, frames 4, 5, and 6 show several additional strokes and the growth and blending of the applied strokes. FIG. 23, frame 7 shows a resulting image after the strokes applied on the previous frames have spread and blended, and the lifespans of the polygons applied by the strokes on the previous frames has ended (i.e., the paint has "dried.")

Figure 24:
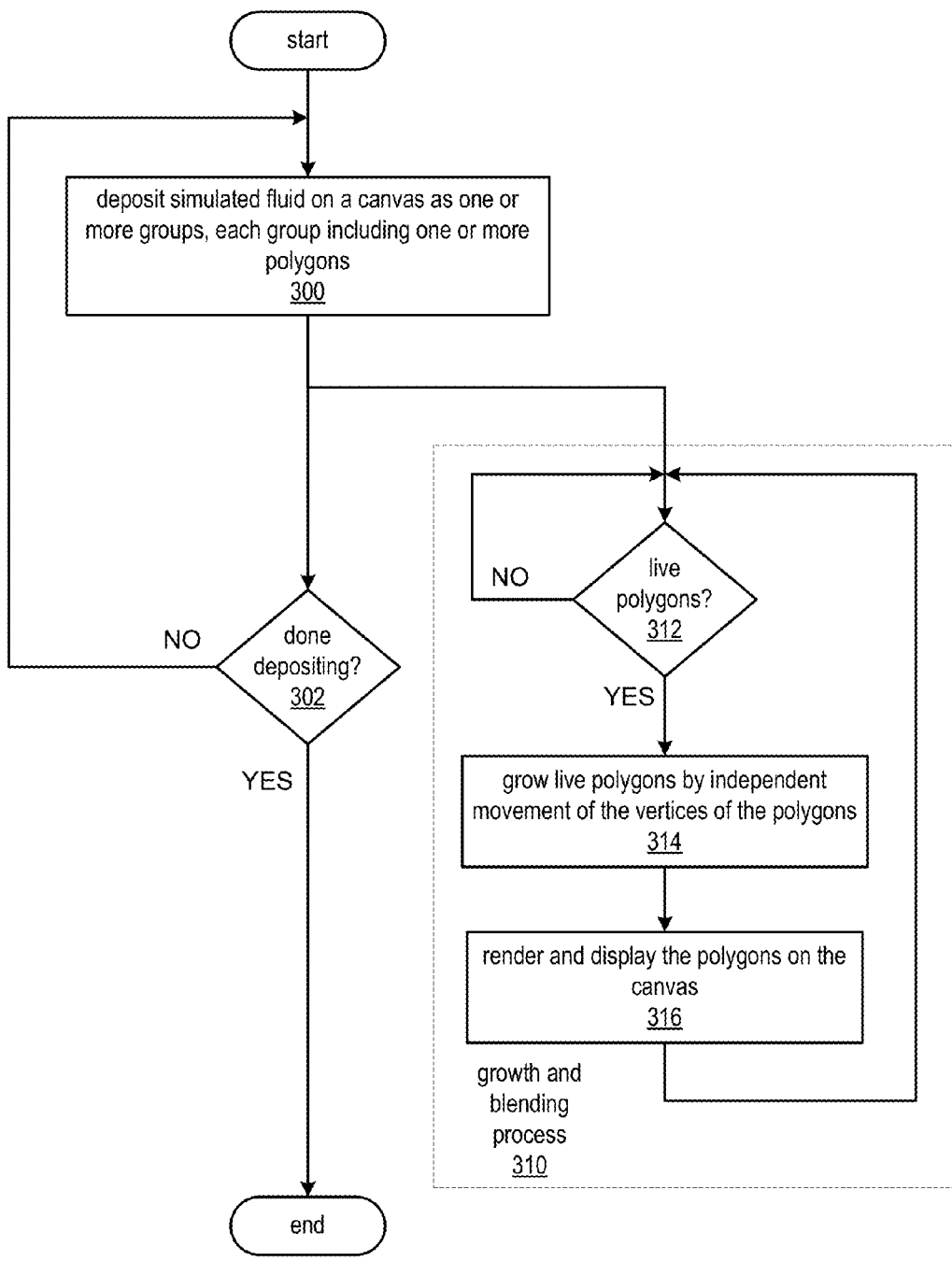
FIG. 24 is a high-level flowchart of a painting method that employs the vector-based, fluid motion simulation technique, according to at least some embodiments.

FIG. 24 is a high-level flowchart of a painting method that employs the vector-based, fluid motion simulation technique, according to at least some embodiments.

As indicated at 300, simulated fluid, for example simulated watercolor paint, may be deposited on a canvas as one or more groups, each group including one or more polygons. The polygons may be, but are not necessarily, semitransparent. For example, paint may be deposited to a canvas by a user using strokes applied using a brush according to a user interface method as illustrated in FIGS. 21, 22A-22C, and 23. As another example, paint may be deposited to a canvas programmatically.

In at least some embodiments, the polygons deposited at 300 may be processed by a method implemented in a growth and blending process 310. For example, growth and blending process 310 may be implemented as a background process that may be scheduled to execute 30 times a second, 60 times a second, or at some other periodic or aperiodic interval. Element 312 may occur at each execution of the background process; elements 314 and 316 may only be performed if there is at least one live polygon.

At 312 of the growth and blending process 310, the method may check to see if there are any live polygons according to the lifespan attribute of the polygons. If there are live polygons at 312, then the method may grow the live polygons by independent movement of the vertices of the polygons, as indicated at 314. In at least some embodiments, a randomization technique may be applied to the movement at each vertex of each polygon. The method may then render and display the polygons on the canvas, as indicated at 316. Rendering and displaying the polygons may include blending overlapping semitransparent polygons with overlapped polygons or other overlapped objects, such as the canvas itself. At 312 of the growth and blending process 310, if there are no live polygons, then the background process may wait for a next execution.

At 302, the method may return to element 300 to deposit additional simulated fluid to the canvas, if not done depositing fluid. For example, a user may choose to add additional paint to a canvas via the user interface. Additional polygons deposited at 300 may be processed by the background process 310. At 302, if done depositing paint, note that the growth and blending process 310 may continue to process the deposited polygons until there are no more live polygons, that is until the paint is "dry."

The above describes the growth and blending process 310 as being implemented as a background process. Alternatively, the growth and blending process may be implemented as a loop in an event-driven program. In this implementation, the event-driven program may check for events that indicate the deposition of group(s) (e.g., mouse events that indicate a stroke applied to the canvas). When a group deposition event is detected, one or more iterations of elements 312 through 316 of the growth and blending process 310 may be performed. When the growth and blending process 310 is done, the program waits for a next event.

Figure 25:
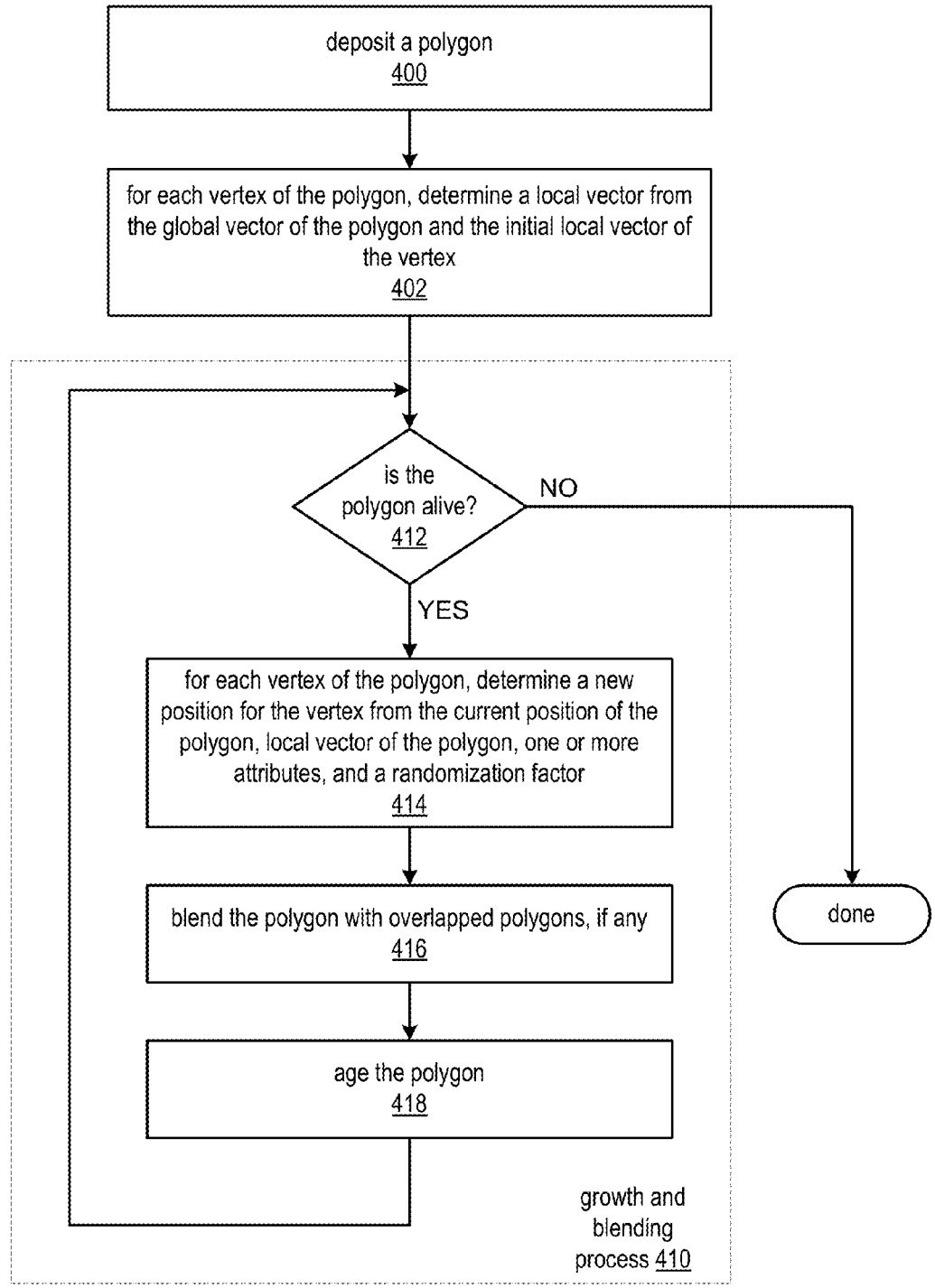
FIG. 25 is a flowchart of a method for processing a deposited polygon, according to at least some embodiments.

FIG. 25 is a flowchart of a method for processing a deposited polygon, according to at least some embodiments of the vector-based, fluid motion simulation technique. As indicated at 400, a polygon may be deposited to a canvas. The deposited polygon may, but does not necessarily, overlap another polygon. As indicated at 402, at an initialization step, for each vertex of the polygon, a local vector may be determined from the global vector of the polygon and the initial local vector of the vertex. In at least some embodiments, the global vector of the polygon and the initial local vector of the vertex are summed to generate the starting local vector for the vertex.

In at least some embodiments, the polygon deposited at 400 may be processed by a method implemented in a growth and blending process 410. For example, growth and blending process 410 may be implemented as a background process 410 that may be scheduled to execute 30 times a second, 60 times a second, or at some other periodic or aperiodic interval. Element 412 may occur at each execution of the background process 410; elements 414 through 418 may only be performed if the polygon is alive.

At 412 of the growth and blending process, the method may check to see if the polygon is alive according to the lifespan attribute of the polygon. If the polygon is alive, then the method may grow the polygon by independent movement of the vertices of the polygon. As indicated at 414, for each vertex of the polygon, a new position for the vertex may be determined from the current position of the polygon, the local vector of the polygon, one or more attributes, and a randomization factor. In at least some embodiments, at each vertex, the following equation may be used to compute the new position to which the vertex is to be moved:

$$P_{new} = P_{old} + S*(V+R)$$

where $P_{old}$ designates the current position of the vertex, $P_{new}$ designates the new position for the vertex, V designates the local vector for the vertex, S designates the speed or velocity at the vertex, and R represents randomized values that may be added to the (x,y) coordinates of the vertex; the randomized values may be positive or negative. In at least some embodiments, at each vertex of a polygon, before computing $P_{new}$ for the vertex, a check may be performed to determine if the vertex is on a wet polygon that is overlapped by the vertex's polygon. If the vertex is on a wet polygon, then S (the speed, or velocity) at the vertex may be increased to account for the wetness of the overlapped polygon.

As indicated at 416, the polygon may be blended with overlapped polygons, if any. In at least some embodiments, to blend a polygon with an overlapped polygon, a blending technique may be applied in which the color of the polygon is multiplied by an alpha value and added to the color of the overlapped polygon, multiplied by (1−alpha). The blending equation that may be used in at least some embodiments may be expressed as:

Output color=alpha*overlapping polygon color+(1−alpha)*overlapped polygon color.

In at least some embodiments, alpha may be a floating-point number, for example in the range [0,1], and may be derived from, the current opacity level of the overlapping polygon.

As indicated at 410, the polygon may be aged. The lifespan of the polygon may, for example, be indicated by a counter that is initialized to some value and that is decremented (or, alternatively, incremented) at each execution of the growth and blending process 410; the polygon is alive until the counter reaches a specified threshold, e.g. zero. Alternatively, the lifespan may be time-based; that is, the polygon may be initialized to be alive for two seconds, or some other period. When that time is elapsed, the polygon is no longer alive, and thus is no longer grown by the background process.

The above describes the growth and blending process 410 as being implemented as a background process. Alternatively, the growth and blending process may be implemented as a loop in an event-driven program. In this implementation, the event-driven program may check for events that indicate the deposition of polygon(s) (e.g., mouse events that indicate a stroke applied to the canvas). When a polygon deposition event is detected, element 402 may be performed, followed by one or more iterations of elements 412 through 418 of the growth and blending process 410. When the growth and blending process 410 is done, the program waits for a next event.

Figure 26:
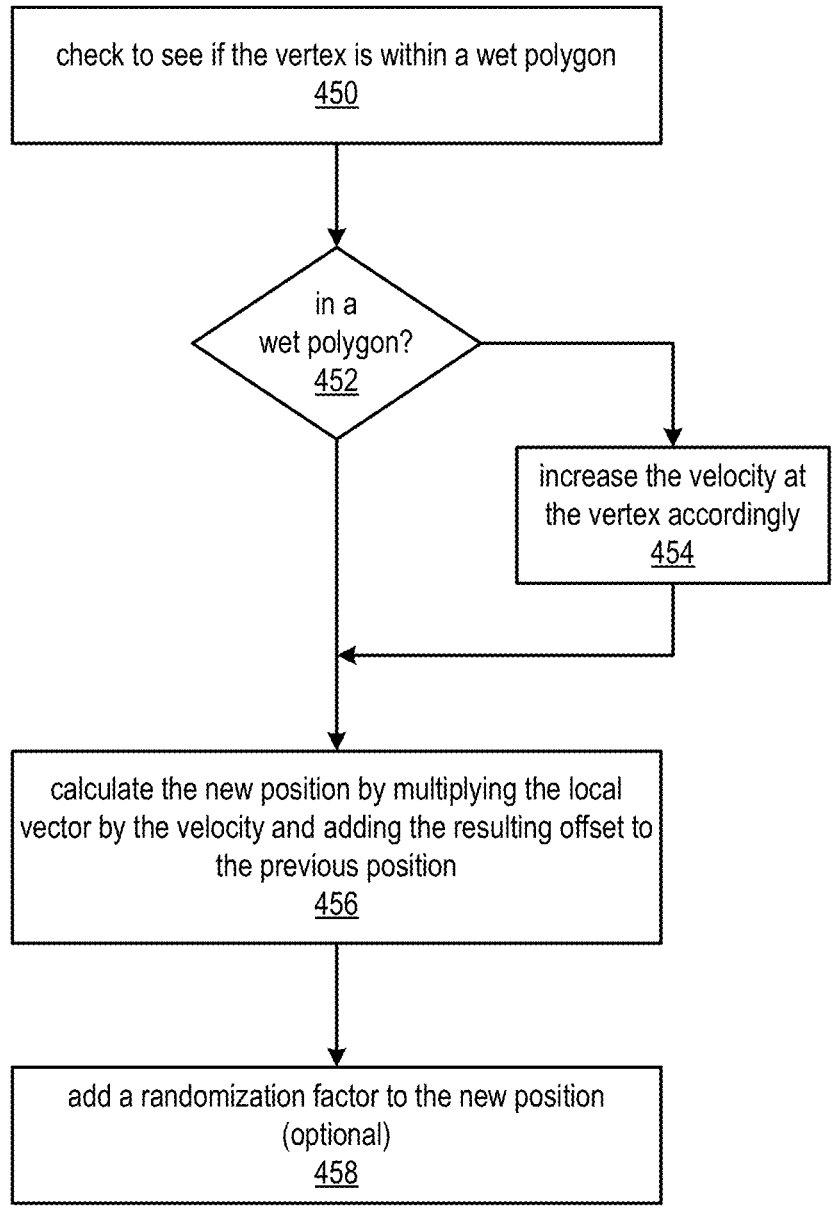
FIG. 26 is a flowchart of a method for moving a vertex of a polygon, according to at least some embodiments.

FIG. 26 is a flowchart of a method for moving a vertex of a polygon, according to at least some embodiments of the vector-based, fluid motion simulation technique. As indicated at 450, a check is made to determine if the vertex is within a wet polygon. At 452, if the vertex is within a wet polygon as determined at 450, the velocity of the vertex may be increased to account for the wetness of the overlapped polygon. Otherwise, the velocity is not increased. At 456, a new position for the vertex may be calculated by multiplying the local vector of the vertex by the velocity at the vertex and adding the resulting offset to the previous position of the vertex. As indicated at 458, in at least some embodiments, a randomization factor may be added to the new position to simulate the random motion of a fluid at the edges.

Techniques for Improving the Performance of Procedural Painting Algorithms

The following describes several techniques that may be implemented, alone or in combination with one or more of the other techniques, in procedural painting algorithms that employ a vector-based, fluid motion simulation technique, for example as described above and in patent application Ser. No. 13/029,036, to help achieve the dynamic and serendipitous behaviors of watercolor painting at good interactive rates even on relatively low-powered devices, while achieving sufficient resolution to be used in a wider range of artistic applications when compared to conventional methods.

Implementing one or more of these techniques in a procedural painting algorithm that employs a vector-based, fluid motion simulation technique as described above and as described in patent application Ser. No. 13/029,036 may allow the algorithm to provide good interactive real-time performance. In conventional painting methods, when simulated paint is put down with a stroke, the method simply shows the end results, and does not show the paint spreading. In contrast, embodiments of a procedural painting algorithm that employs a vector-based, fluid motion simulation technique as described above may simulate the way that the paint moves across the surface before it dries; the user can watch the paint spread and dry. However, achieving this simulated effect may result in interactivity-related issues with the procedural painting algorithm, as previously described. Via implementation of one or more of the techniques described in this section, the procedural painting algorithm may achieve improved real-time performance and improved interactivity when simulating fluid motion using the fluid motion simulation technique. In addition, because the procedural painting algorithm as described herein is vector-based, works created with the algorithm may be rendered at any resolution, whereas conventional raster-based painting techniques limit the resolution at which results may be acceptably rendered.

Separating Water from Pigment

In a procedural painting algorithm that employs a vector-based, fluid motion simulation technique as described above and as described in patent application Ser. No. 13/029,036, volumes of paint may be represented as N-sided polygons that are combinations of pigment and water; the water portion defines the wetness of the polygon. When moving a vertex of a paint polygon, the vertex is tested to determine if it is in an underlying "wet" paint polygon. Instead of polygons that are combinations of pigment and water, a technique may be employed in which the polygons are separated into pigment polygons and water polygons. The water polygons are not rendered; only the pigment polygons are rendered during iterations of the procedural painting algorithm. In addition, when moving the vertices of the pigment polygons, the pigment polygons are not tested when determining wetness at the vertices of a pigment polygon; instead, the wet region defined by the water polygons is tested. Using this technique, portions of the canvas may be wet independent of whether the portions are also colored by pigment.

FIGS. 30A through 30D show examples of polygon groups that include separate water polygons and pigment polygons, according to at least some embodiments. Note that these examples are not intended to be limiting. FIG. 30A illustrates an example polygon group that has a single pigment polygon with a relatively smooth border. The pigment polygon is enclosed by a water polygon, into which the pigment polygon grows via the independent movement of the vertices. FIG. 30B illustrates an example group that includes three partially overlapping, semitransparent pigment polygons that are enclosed by a single water polygon. Note that the global vectors of the pigment polygons (indicated by the white arrows) may be initialized so that the vertices of the three polygons tend to grow outward from the center of the group into the water polygon. FIG. 30C illustrates an example group that includes a pigment polygon similar to the pigment polygon shown in FIG. 30A in the center, surrounded by four pigment polygons of irregular shape. Each of the four irregularly-shaped pigment polygons partially overlaps the center pigment polygon. The four outer pigment polygons all have global vectors with direction and velocity; the center pigment polygon has a null or zero global vector. The five pigment polygons are enclosed by a single water polygon; the four irregularly-shaped pigment polygons tend to grow outward into the water polygon.

While the groups in FIGS. 30B and 30C show each group as a cluster of two or more pigment polygons enclosed by a single water polygon, in at least some embodiments each of two or more pigment polygons in a group may be enclosed by different water polygons in a group. In other words, a group may include more than one water polygon.

In at least some embodiment, in addition to groups including both water and pigment polygons, a group may be defined to include only water polygons or only pigment polygons. For example, the user may apply a stroke with a brush that deposits groups of water polygons, and then paint over the stroke with a brush that deposits groups of pigment polygons onto the water polygons.

FIG. 30D illustrates an example group that includes five overlapping pigment polygons each enclosed by a water polygon. The water polygons are represented by the dashed circles for clarity. A center pigment polygon is represented by the bolded circle; the center pigment polygon is surrounded by four outer, partially overlapping pigment polygons. The four outer pigment polygons each have a global vector with direction and velocity; the center pigment polygon has a null or zero global vector. Each of the five pigment polygons is enclosed by a slightly larger water polygon.

While FIGS. 30A through 3D show water polygons as circles, note that other regular geometric shapes or irregular shapes may be used for water polygons in at least some embodiments.

FIG. 31 illustrates the application of twelve instances of the example group from FIG. 30A to a canvas, according to at least some embodiments. In this example, each group consists of a pigment polygon enclosed by a larger water polygon. The heavy black arrow indicates the direction of the stroke that applied the groups. Thus, the leftmost group was the first applied, and the rightmost group was the last applied. Note that each group overlaps, or is overlapped by, at least one other group.

The following illustrates, at an abstract level, how a data structure for representing a group including one or more water polygons and/or one or more pigment polygons may be formed in at least some embodiments, and is not intended to be limiting. In at least some embodiments, the polygons may be stored in a format, or alternatively converted to a format, that can be processed by a graphics processing unit (GPU). In at least some embodiments, the data structures defining water polygons and pigment polygons may differ, e.g. may include different sets of and/or different values for attributes. In at least some embodiments, groups including only pigment polygons or only water polygons may be defined. In at least some embodiments, some of the group attributes may apply only to the pigment polygons, and/or some of the group attributes may apply only to the water polygons.

```
GROUP Y
    <group attributes, e.g. lifespan, size, opacity, velocity color, etc.>
    Pigment Polygon List:
        PIGMENT POLYGON A
            <pigment polygon attributes, e.g. global vector, velocity,
            lifespan, etc.>
            <Polygon Vertex List>
        PIGMENT POLYGON B
            <pigment polygon attributes, e.g. global vector, velocity,
            lifespan, etc.>
            <Polygon Vertex List>
        .
        .
        .
    <end Pigment Polygon List>
    Water Polygon List:
        WATER POLYGON A
            <water polygon attributes, e.g. lifespan, etc.>
            <Polygon Vertex List>
        WATER POLYGON B
            < water polygon attributes, e.g. lifespan, etc.>
            <Polygon Vertex List>
        .
        .
        .
    <end Water Polygon List>
<end GROUP Y>
```

Rasterizing the Water Polygons

As noted above, the water polygons may be separated from the pigment polygons, and the water polygons are not rendered. When determining wetness at the vertices of a pigment polygon, the wet region defined by the water polygon(s) may be tested. However, vertex-polygon intersection tests are computationally expensive and therefore tend to be slow, and many such tests many need to be computed. To improve the performance of the wetness determination, in at least some embodiments, a technique may be used that first rasterizes all of the water polygons into a buffer, which may be referred to as a wetness layer or wetmap. The wetness at a vertex may then be determined by sampling this buffer or layer at the vertex's position, instead of testing every water polygon. This results in performing only $O(n)$ tests, rather than $O(n^2)$ tests, and in addition each individual test of wetness by sampling the wetness layer may be significantly faster than a polygon intersection test.

Figure 32:
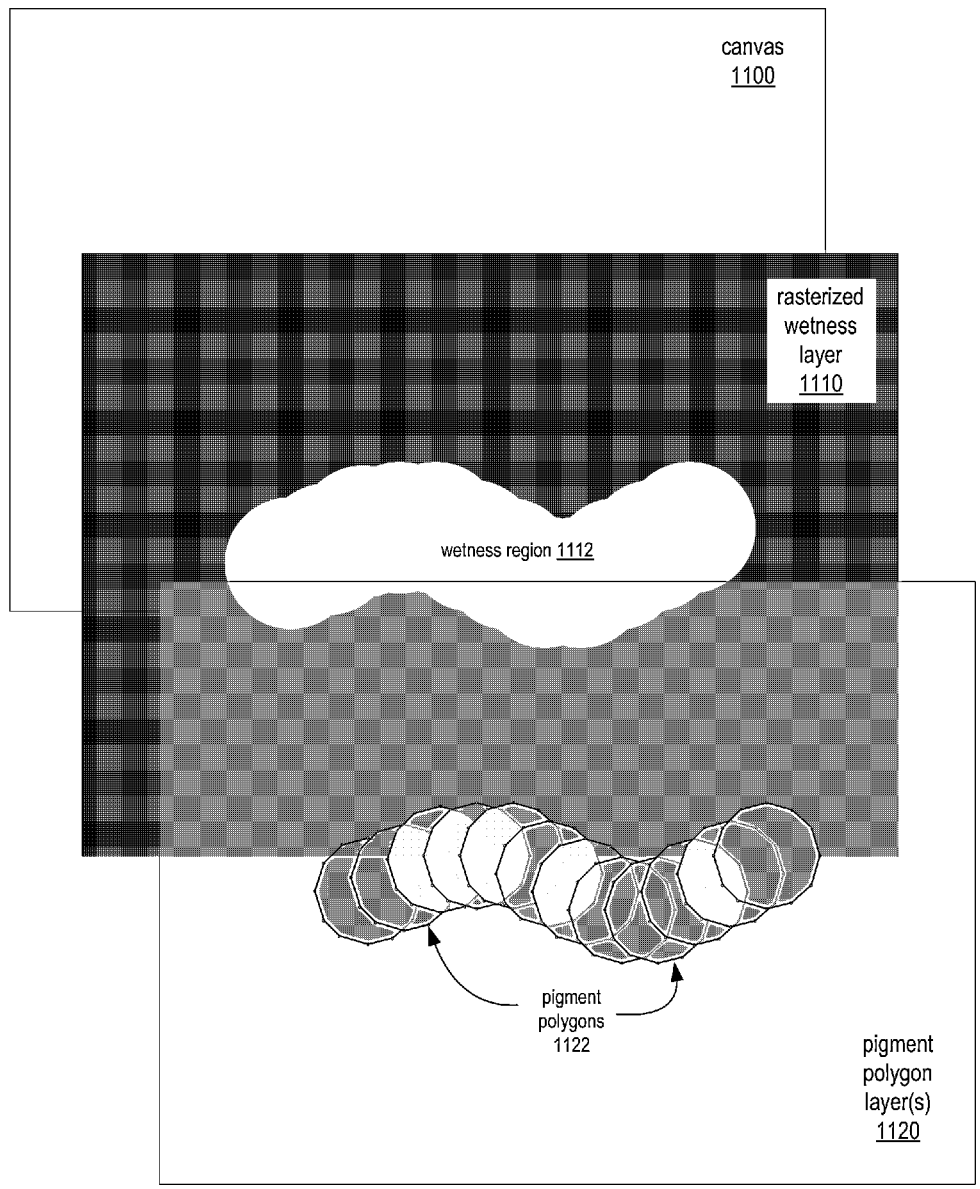
FIG. 32 graphically illustrates the rasterization of water polygons into a wetness layer or wetmap, according to at least some embodiments.

FIG. 32 graphically illustrates the rasterization of water polygons into a wetness layer or wetmap, according to at least some embodiments. FIG. 32 shows the working image as a stack consisting of several layers, and uses the example stroke from FIG. 31 via which several groups are deposited. At the back is the canvas 1100 layer. In the front is a pigment polygon layer 1120 at which the pigment polygons 1122 will be grown. Between the canvas 1100 and the pigment polygon layer 1120 is the rasterized wetness layer 1110 or wetmap. The water polygons from FIG. 31 have been rasterized to form a wetness region 1112 in wetness layer 1110. When growing the pigment polygons 1122, for each vertex of each pigment polygon, instead of doing a polygon test of other pigment polygons or of water polygons, a test is made at a corresponding point in wetness layer 1110 to determine wetness for the vertex.

Using this technique, the method illustrated in FIG. 26 may be modified. Instead of checking to determine if the vertex of a pigment polygon is within a wet polygon as indicated at 450, which may involve checking many polygons, the modified method would check a corresponding point within the wetness layer 1110 to determine wetness at that point. If that point in layer 1110 is wet, then at 454 the velocity at the vertex would be increased according to the value at that point in layer 1110.

At each iteration of the procedural painting algorithm, the values in the wetness layer 1110 may be aged; that is, the values may be decremented. In addition, newly applied water polygons may be rasterized and added to the wetness layer 1110.

Static Wet Areas

Since the pigment polygons grow with respect to the water polygons, having the water polygons move or grow with respect to the pigment polygons may not be necessary. Static wet areas or regions of the canvas may yield similar results as would moving or growing wet areas. Therefore, in at least some embodiments, a technique may be used in which, rather than representing deposited water as a set of dynamic water polygons that need to be grown and rasterized at each iteration of the algorithm, the water polygons are static (do not grow), and water or wetness may be represented as one or more static (non-growing) regions on the canvas. In at least some embodiments, deposited water polygons may be rasterized into the wetness layer only once when the canvas is made wet by application of the water polygons. The wetness layer representing the applied water may thus only need to be modified or updated if and when additional water polygon(s) are applied to the canvas, and to age the wetness values stored in a data structure corresponding to the wetness layer.

Independent Lifespans of Water and Pigment

In a procedural painting algorithm that employs a vector-based, fluid motion simulation technique as described above, volumes of paint may be represented as N-sided polygons that are combinations of pigment and water, and thus the lifespan of the polygon defines both the lifespan of the pigment and the wetness of the polygon. By separating the water polygons from the pigment polygons, water polygons and pigment polygons, even in the same group, may be given different, independent lifespans, which for example allows pigment to move for some period of time while that portion of the canvas stays wet for a longer period.

As the water polygons may be static (not grow) and may be rasterized into a wetness layer once, the values in the wetness layer may be used to indicate the remaining life of the water at each point or pixel. In at least some embodiments, upon deposition and rasterizing of the water polygons, the lifespan indicated by the rasterized water polygons may be added to values at respective points in the wetness layer. At each iteration of the procedural painting algorithm, the values in the wetness layer may be decremented, until reaching a threshold that indicates that the water has dried, e.g. zero. A value of zero at a point in the wetness layer may indicate that the canvas is dry at that point; a value greater than zero at a point in the wetness layer may indicate that the canvas is still wet at that point. In at least some embodiments, a maximum wetness value for the points in the wetness layer may be specified; when adding the lifespans of overlapping water polygons to the wetness layer, the wetness value may not be allowed to exceed the maximum wetness value.

Note that different points in the wetness layer may have different wetness values before or after an iteration of the procedural painting algorithm. In at least some embodiments, when rasterizing the water polygons into the wetness layer, lifespan values of the water polygons are added to values at points in corresponding regions of the wetness layer; the values at the points in the wetness layer indicate wetness at the respective points. Applied water polygons may overlap each other and/or may overlap already-wet regions of the wetness layer. Thus, the lifespans of overlapping regions of water polygons may be cumulatively added to a common region of the wetness layer, and different regions of the wetness layer may have different wetness values.

Figure 33:
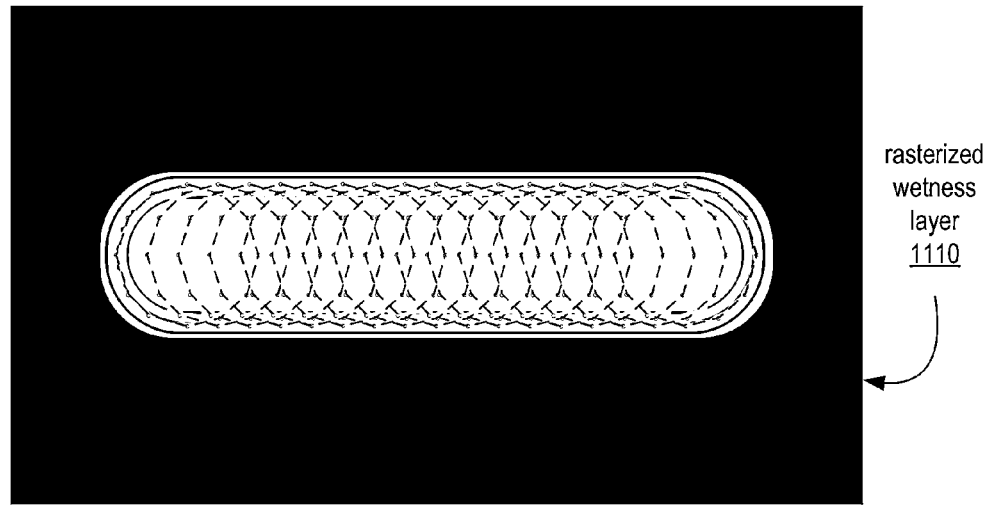
FIG. 33 illustrates the application of several instances of the example group from FIG. 30A to a canvas, according to at least some embodiments.

Since the water polygons may overlap each other or may overlap wet regions of the wetness layer, some areas of a wetness region may be wetter than other areas. FIG. 33 illustrates the application of several instances of the example group from FIG. 30A to a canvas, according to at least some embodiments. Each group consists of a pigment polygon enclosed by a larger water polygon. The water polygons may be rasterized into a wetness layer 1110. The black rectangle in FIG. 33 represents the wetness layer 1110. The white-to-dark-gray region in wetness layer 1110 represents a wetness region formed by rasterizing the water polygons for the stroke. The pigment polygons are shown overlaid on the layer 1110 as the dashed line polygons. Note that the wetness region is white at the center, and shades darker towards the edges. The whiter the area, the more wet the area.

At each iteration of the procedural painting algorithm, the values in the wetness layer may be aged; that is, the values may be decremented. In addition, newly applied water polygons may be rasterized and added to the wetness layer.

In addition, in some embodiments, different points within a water polygon may be initially assigned different lifespans. For example, points nearer the center of a water polygon may be given longer lifespans than points nearer the edge of the water polygon so that the edge of the water polygon tends to dry faster than the center. Alternatively, a water polygon may be initialized with a lifespan, and during rasterization of the water polygon, the lifespan may be adjusted so that the rasterized polygon has a longer lifespan nearer and at the center than at the edges.

Resampling Vertices

At each iteration of a vector-based, fluid motion simulation technique as described above, a polygon's vertices may be moved independently of one another (as long as the polygon is alive). However, this independent movement of the vertices may result in the bunching of two or more vertices of a polygon near one another, and/or in the vertices becoming very spread out along a portion of the polygon. To maintain relative smoothness of a polygon's boundary as the polygon grows, a technique may be used in which the boundary of each polygon is periodically or aperiodically resampled to ensure a more even spacing of the vertices along the boundary, thus providing smoother, more uniform growth of the polygons. A component of the vertex motion is a normal vector from the initial polygon shape to cause expansion, but as the polygon shape changes, these vectors may no longer point in the correct direction, so the vertex normal vectors may also be recomputed, for example by finding the tangent to the polygon at the vertex as the line perpendicular to the chord across adjacent vertices.

The resampling may be performed at every iteration or at every few (e.g., every three or four) iterations of the procedural painting algorithm. In some embodiments, live polygons may be tested to see if the polygons need to be resampled (e.g., by testing the spacing between vertices to determine if the vertices are evenly spaced). However, since the testing may take as long as the actual resampling, in some embodiments the live polygons may be resampled without performing such a test.

In at least some embodiments, resampling of the boundary may be performed by computing the perimeter of a polygon and dividing by the number of vertices to produce an arc length per vertex. Once the arc length per vertex is computed for the polygon, the technique may walk the perimeter, placing the vertices an arc length apart. Other techniques may be used to perform the resampling.

Figure 34:
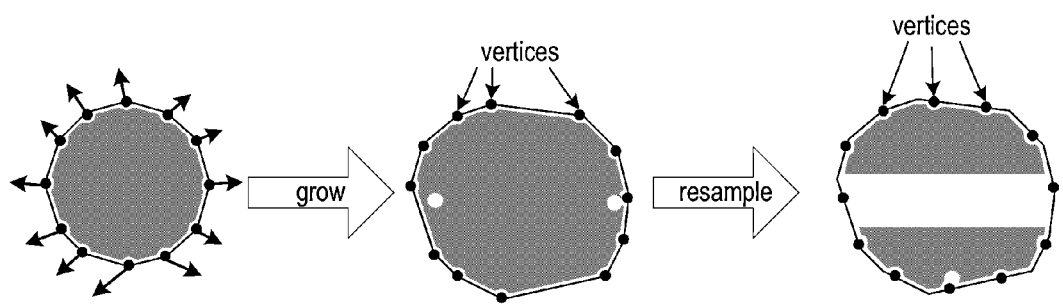
FIG. 34 graphically illustrates resampling the boundary of a polygon after one or more iterations of growth, according to at least most embodiments.

FIG. 34 graphically illustrates resampling the boundary of a polygon after one or more iterations of growth, according to at least most embodiments. The leftmost polygon may represent an initially deposited polygon. The black circles along the boundary represent vertices of the polygon. The arrows from the vertices may represent growth vectors determined by the procedural painting algorithm. The center polygon represents the polygon after one or more growth iterations. Note that, in the center polygon, the spacing between vertices is irregular; some vertices are bunched, while there are large gaps between other vertices. To maintain a relatively smooth growth of the polygon, the boundary of the polygon may be resampled after one or more growth iterations. The leftmost polygon represents the polygon after resampling. Note that the vertices are much more evenly spaced than those of the center polygon. The resampling of the boundary may be performed in an iteration of the algorithm prior to moving the vertices or after moving the vertices.

Note that this technique for resampling the vertices of polygons may be applied to polygons that are combinations of pigment and water as described in patent application Ser. No. 13/029,036, or only to the pigment polygons in embodiments in which the water and pigment are separated into water polygons and pigment polygons, and in which the water polygons are static and thus do not grow. The technique for resampling the vertices of polygons may also be applied in embodiments in which both types of polygons (water polygons and pigment polygons) grow after application. More generally, the technique for resampling the vertices of polygons may be applied in any application that uses polygons that are grown by a method that may result in poor distribution of the vertices along the border of the polygons.

Rasterizing "Dead" Pigment Polygons

As painting progresses in a procedural painting algorithm that employs a vector-based, fluid motion simulation technique as described above, more polygons may be added to the canvas, and all polygons are rendered each time the screen is updated (i.e., at each iteration of the procedural painting algorithm). This means that the more complex the painting is, the longer it takes to render at each iteration, which may limit the complexity of a painting that can be created while still maintaining reasonable performance. In at least some embodiments, to address this, a technique may be used that rasterizes polygons that are no longer "alive" (i.e., polygons for which the lifespan has expired) into a dry paint layer or texture. In this technique, once a polygon is dead (i.e., once the pigment is dried), it is removed from the list of polygons that need updating or is otherwise inactivated so that it is no longer rendered, and the dead polygon is rasterized into a texture or layer that represents all paint that has dried. During rendering, live polygons are blending with the dried paint layer. Since the polygons are static once they are dead, rasterizing the dried pigment polygons into a texture layer and blending live pigment polygons with the texture layer when rendering the live polygons maintains the same painted image. In addition, not rendering the dried or dead pigment polygons helps to keep the runtime painting cost manageable, as only the live pigment polygons need to be rendered at each iteration.

If a large number of polygons become dry at a given iteration of the algorithm, rasterizing all of the dead polygons at that iteration may cause a performance lag. Therefore, in at least some embodiments, a limit on how many dead polygons can be rasterized into the texture layer at a given iteration may be enforced. The limit may be based on a specified threshold, or alternatively may be an adaptive limit based on performance at previous iterations.

Figure 35:
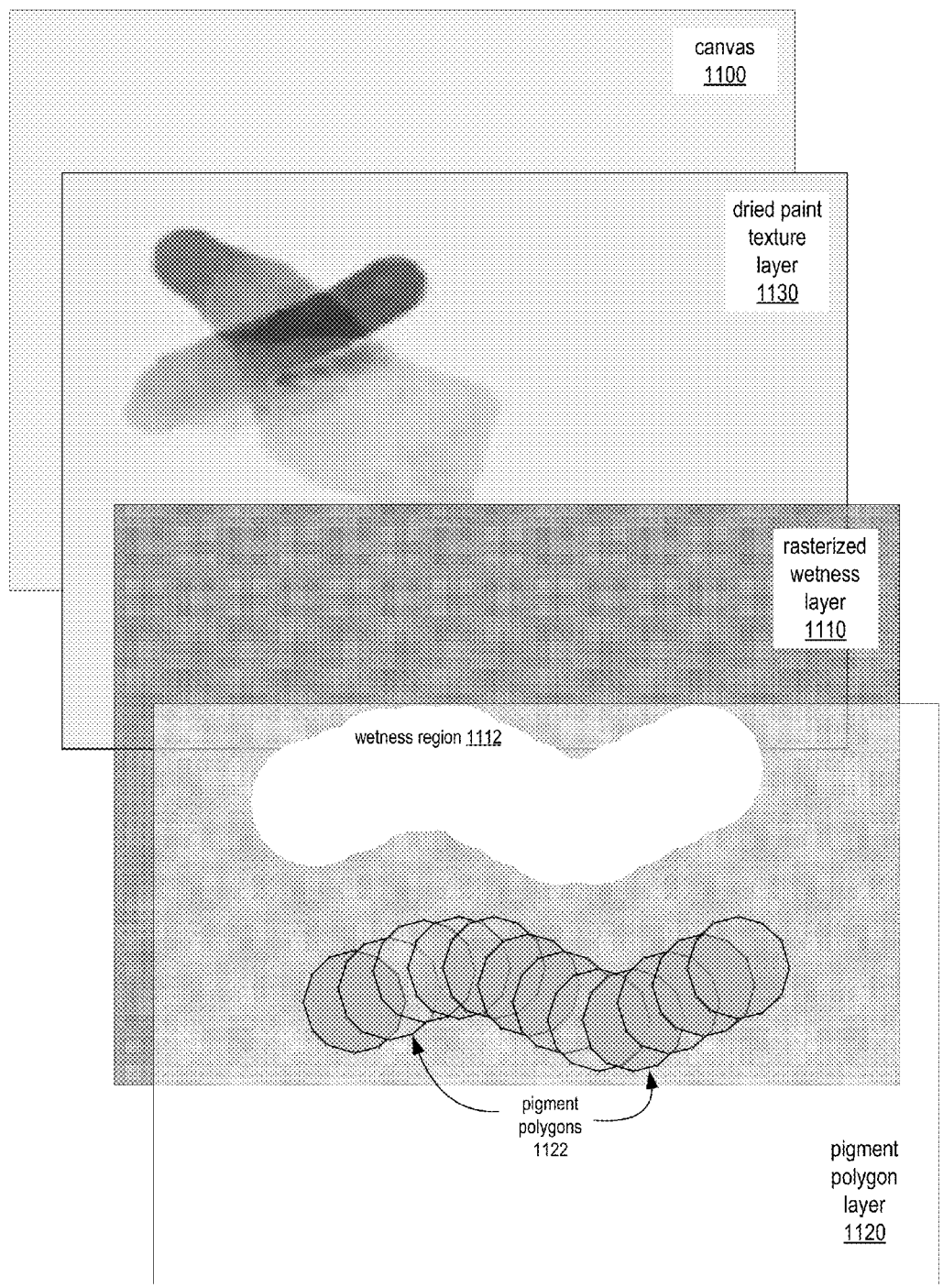
FIG. 35 graphically illustrates the rasterization of dried pigment polygons into a texture layer, according to at least some embodiments.

FIG. 35 graphically illustrates the rasterization of dried pigment polygons into a texture layer, according to at least some embodiments. FIG. 35 shows the working image as a stack consisting of several layers, and uses the example stroke from FIG. 31 that deposits several groups. At the back of the stack in FIG. 35 is the canvas 1100 layer. In the front is a pigment polygon layer 1120 at which the pigment polygons 1122 will be grown. While FIG. 35 illustrates pigment polygon layer 1120 as one layer, each pigment polygon may be viewed as a separate layer. Between the canvas 1100 and the pigment polygon layer 1120 is the rasterized wetness layer 1110. Between the canvas 1100 and the wetness layer is a dried paint texture layer 1130 into which previously applied and dried polygons have been rasterized. The live pigment polygons 1122 are grown and rendered at each iteration. During rendering, the live pigment polygons 1122 are blended with the dried paint texture layer 1130. For example, the dried paint texture layer 1130 may be drawn to the canvas, and then the live pigment polygons 1122 may be rendered on top of the canvas. In some embodiments, a wetness layer as previously described may be used to determine wetness at vertices of the live pigment polygons 1122 when growing the polygons.

Note that this technique for rasterizing dried polygons may be applied to polygons that are combinations of pigment and water as described in patent application Ser. No. 13/029,036, or only to the pigment polygons in embodiments in which the water and pigment are separated into water polygons and pigment polygons, and in which the water polygons are static and thus do not grow. More generally, the technique may be applied in any application that uses polygons that are applied and iteratively rendered and that are grown up to a threshold before becoming "dead".

Rendering Subsets of Polygons

In a procedural painting algorithm that employs a vector-based, fluid motion simulation technique as described above, complex (concave, self-intersecting) polygon rendering tends to be relatively slow, while updating a polygon's shape by growing its vertices tends to be relatively fast. The number of polygons deposited by a stroke (the polygon density) is related to the fidelity of the stroke. In general, the more polygons deposited, the higher the fidelity of the results of the stroke. Thus, in general, it may be desirable to deposit a higher number of polygons; however, the algorithm needs to render the polygons fast enough for interactive use. Therefore, in at least some embodiments, the runtime performance may be improved while maintaining a higher fidelity by updating each live polygon's shape at each iteration of the algorithm while rendering only a subset of the live polygons at each iteration. For example, only one out of three live polygons, or one out of four, may be rendered at a given iteration of the algorithm. Once a polygon is no longer alive, the dead polygon may be rasterized into the dried paint texture layer as previously described, which may result in a higher fidelity dry stroke.

Thus, to improve interactive performance, especially when the paint is applied using faster strokes, this technique may be used to deposit more polygons than are rendered at each iteration; once the polygons dry, all of the polygons are rendered. Thus, paint is deposited and rendered initially at a lower but still visually acceptable quality, and as the simulated paint dries, the quality improves.

In some embodiments, the number of polygons in the subset to be rendered at each iteration may be determined by a specified factor; for example, one in three or one in four polygons may be rendered at each iteration. Alternatively, an adaptive method may be used to determine how many polygons to render at a given iteration. For example, the amount of time it takes to render a frame of polygons at an iteration may be measured and recorded. If the frame rendering time is below a specified threshold, more polygons may be rendered at the next iteration; if above the threshold, fewer polygons may be rendered at the next iteration.

Note that this technique for rendering subsets of polygons may be applied to polygons that are combinations of pigment and water as described in patent application Ser. No. 13/029,036, or only to the pigment polygons in embodiments in which the water and pigment are separated into water polygons and pigment polygons, and in which the water polygons are static and thus do not grow. More generally, the technique may be applied in any application that uses polygons that are applied and iteratively rendered.

Creating a Painting at Lower Resolution, and Re-Creating the Painting at Higher Resolution Paintings may be created using the methods and apparatus described herein on relatively low-powered devices such as an Apple® iPad® or similar devices. In at least some embodiments, the paintings may be created on these devices at a lower resolution and possibly with lower quality than could be achieved on higher-end devices. While creating the painting, information such as stroke information and various settings and parameters that the user selected may be stored. The information indicating the strokes and various parameters or settings used to create the painting may then be transferred to a higher-end device, e.g. a desktop computer, laptop computer, or some other higher-end computing system running a graphics processing technology, such as Adobe® Photoshop® technology, that is operable to re-create paintings according to the information transferred from the lower-end device. The painting itself need not be transferred to the higher-end device. The same painting may then be re-created at a higher resolution and with better quality on the higher-end device by automatically re-performing the strokes and other actions that were originally used to create the lower-fidelity painting on the lower-powered device, but at higher fidelity. The higher fidelity may be achieved by, for example, by rendering to a higher resolution canvas. As another example, the number (and thus density) of the polygons deposited during each stroke may be increased. As another example, the number of vertices on the boundary of deposited polygons may be increased. As another example, features of a more powerful GPU than on the lower-end device may be used to increase fidelity and/or quality of results.

In addition, motion graphics may be generated from captured information indicating the strokes and various parameters or settings used to create a painting on a lower-end device or on a higher-end device. The motion graphics may, for example, allow a video to be played that demonstrates step-by-step the painting process used by the artist to create the painting. Note that the video may be played either on a higher-end device or on a lower-end device. Other techniques may be leveraged from this stored information; for example, an artist may create and store a particular stroke or combination of strokes that the artist likes, and later may replay the stroke as part of a new painting.

Embodiments of the vector-based procedural painting algorithm as described herein may thus be applied in techniques that, for example, re-create a painting at a higher resolution on a higher-end device than an original painting created on a lower-end device. Other than being at different resolutions, however, the two versions of the painting may be essentially identical. In contrast, attempting something similar using a raster-based painting technique, would result in the two paintings being substantially different due to the nature of raster-based techniques.

Figure 36:
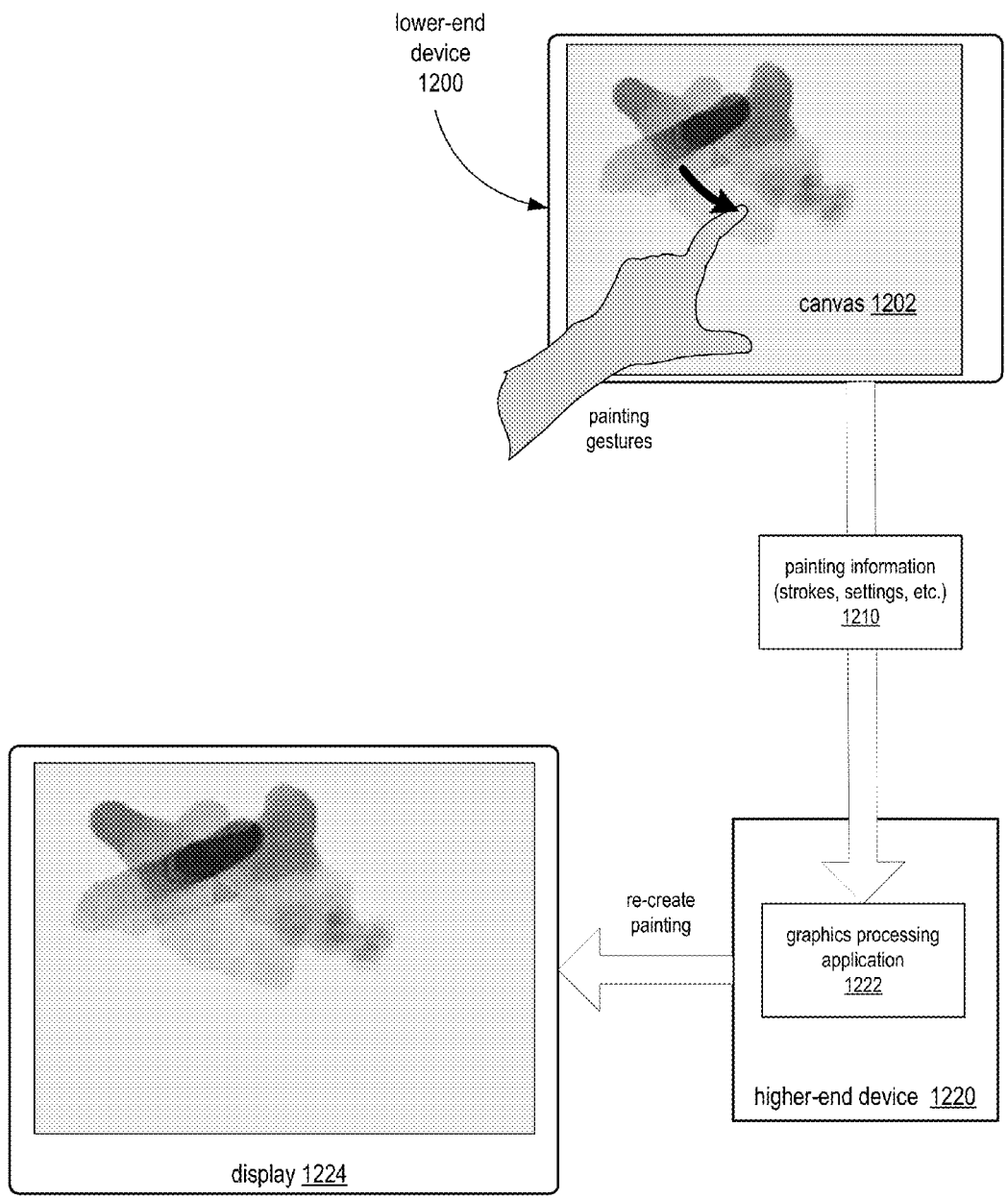
FIG. 36 graphically illustrates creating a painting at a lower fidelity on a lower-end device, and re-creating the painting on a higher-end device, according to at least some embodiments.

FIG. 36 graphically illustrates creating a painting at a lower fidelity on a lower-end device, and re-creating the painting on a higher-end device, according to at least some embodiments. A user may use various painting gestures to apply strokes to a canvas 1202 on a lower-end device 1200 implementing the procedural painting algorithm as described herein. Once done with the painting, the user may later transfer painting information 1210 (stroke information, settings, etc.) to a higher-end device 1220 implementing a graphics processing application 1222. In at least some embodiments, the stroke information may include Bezier curves that represent the strokes, and may also include other information such as mouse events related to the strokes. However, other techniques may be used to indicate stroke information. The graphics processing application 1222 may then re-create the painting originally created on the lower-end device 1200 from the received information at a higher fidelity than the original painting. The re-created, higher-fidelity painting may be, but is not necessarily, displayed to a display device 1224, and may be stored to a memory device or otherwise processed.

Integrating the Techniques into a Vector-Based, Fluid Motion Simulation Technique FIGS. 37 through 40 are flowcharts that illustrate integration of the above-described techniques into a vector-based, fluid motion simulation technique as described above and as described in U.S. patent application Ser. No. 13/029,036, according to at least some embodiments.

Figure 37:
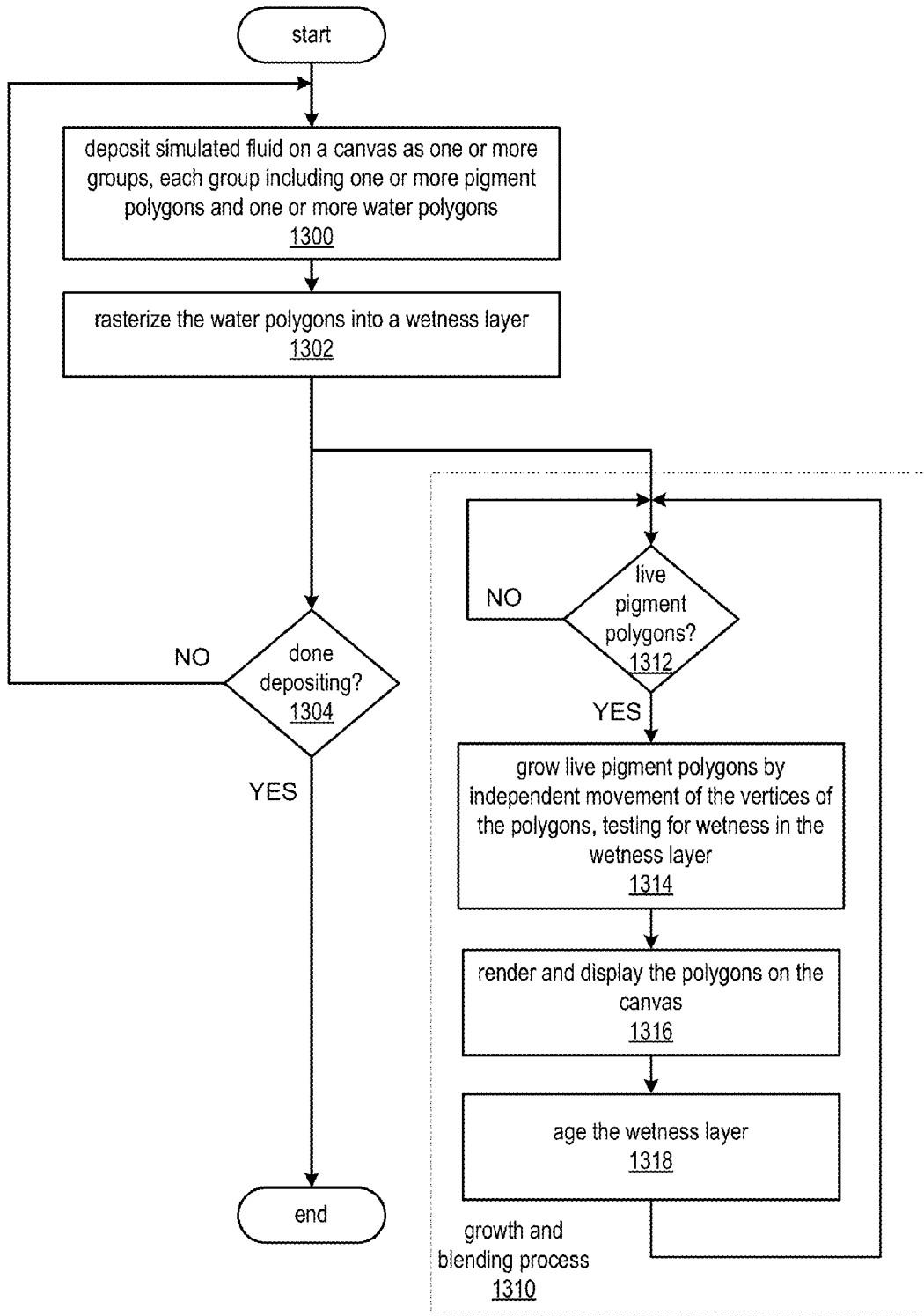
FIG. 37 is a high-level flowchart of a painting method that employs a vector-based, fluid motion simulation technique that deposits water and pigment separately as water polygons and pigment polygons, and that rasterizes the water polygons, according to at least some embodiments.

FIG. 37 is a high-level flowchart of a painting method that employs a vector-based, fluid motion simulation technique that deposits water and pigment separately as water polygons and pigment polygons, and that rasterizes the water polygons, according to at least some embodiments. As indicated at 1300, simulated fluid, for example simulated watercolor paint or pigment, may be deposited on a canvas as one or more groups, each group including one or more water polygons and one or more pigment polygons. The pigment polygons may be, but are not necessarily, semitransparent. For example, paint may be deposited to a canvas by a user using strokes applied using a brush according to a user interface method as illustrated in FIGS. 21, 22A-22C, and 23. As another example, paint may be deposited to a canvas programmatically. The water polygons may be static; that is, the water polygons do not grow. In addition, since the water polygons are separate from the pigment polygons, the water polygons may have different (e.g., longer) lifespans than the pigment polygons. In addition, in some embodiments, different points within a water polygon may be initially assigned different lifespans. For example, points nearer the center of a water polygon may be given longer lifespan than points nearer the edge of the water polygon, so that the edge of the water polygon tends to dry faster than the center. Alternatively, a water polygon may be initialized with a lifespan, and during rasterization of the water polygon, the lifespan may be adjusted so that the rasterized polygon has a longer lifespan nearer and at the center than at the edges.

As indicated at 1302, the deposited water polygons may be rasterized into a wetness layer, for example as illustrated in FIG. 32. In at least some embodiments, each point in the wetness layer may store a value that indicates the remaining lifespan for wetness at that location. For example, a value of 0 may indicate that the point is dry, and a value higher than 0 may indicate that the point is wet. The points in a wet region in the wetness layer may have varying lifespans, for example as illustrated in FIG. 33. Rasterizing the water polygons may thus involve adding the lifespan value indicated at points within the water polygons to the value indicating lifespan at corresponding points within the wetness buffer.

In at least some embodiments, the pigment polygons deposited at 1300 may be processed by a method implemented in a growth and blending process 1310. For example, growth and blending process 1310 may be implemented as a background process that may be scheduled to execute 30 times a second, 60 times a second, or at some other periodic or aperiodic interval. Element 1312 may occur at each execution of the background process; elements 1314 and 1316 may only be performed if there is at least one live pigment polygon.

At 1312 of the growth and blending process 1310, the process may check to see if there are any live pigment polygons according to the lifespan attribute of the pigment polygons. If there are live pigment polygons at 1312, then the method may grow the live polygons by independent movement of the vertices of the pigment polygons, as indicated at 1314. In at least some embodiments, a randomization technique may be applied to the movement at each vertex of each pigment polygon. The velocity of the movement of a given vertex may be adjusted according to the wetness at the vertex; the wetness at a vertex may be determined by sampling the wetness layer at the vertex's position. The method may then render and display the pigment polygons on the canvas, as indicated at 1316. Rendering and displaying the pigment polygons may include blending overlapping semitransparent pigment polygons with overlapped pigment polygons or other overlapped objects or layers, such as the canvas itself.

At 1318, the wetness layer may be aged. In at least some embodiments, when rasterizing the water polygons, values at respective points in the wetness layer may be initialized to the initial lifespan indicated by the rasterized water polygons. At each iteration of the procedural painting algorithm, the values in the wetness layer may be decremented, until reaching a threshold, e.g. zero. For example, a value of zero at a point in the wetness layer may indicate that the canvas is dry at that point; a value greater than zero at a point in the wetness layer may indicate that the canvas is still wet at that point, and also indicates the remaining lifetime of wetness at the point.

At 1312 of the growth and blending process 1310, if there are no live pigment polygons, then the background process may wait for a next execution.

At 1304, the method may return to element 1300 to deposit additional simulated fluid to the canvas, if not done depositing fluid. For example, a user may choose to add additional paint to a canvas via the user interface. Additional water polygons deposited at 1300 may be rasterized into the wetness layer at 1302, while additional pigment polygons deposited at 1300 may be processed by the background process 1310. At 1304, if done depositing paint, note that the growth and blending process 1310 may continue to process the deposited pigment polygons until there are no more live pigment polygons, that is until the paint is "dry."

The above describes the growth and blending process 1310 as being implemented as a background process. Alternatively, the growth and blending process may be implemented as a loop in an event-driven program. In this implementation, the event-driven program may check for events that indicate the deposition of group(s) (e.g., mouse events that indicate a stroke applied to the canvas). When a group deposition event is detected, additional water polygons may be rasterized into the wetness layer at 1302, and one or more iterations of elements 1312 through 1316 of the growth and blending process 1310 may be performed. When the growth and blending process 1310 is done, the program waits for a next event.

Figure 38:
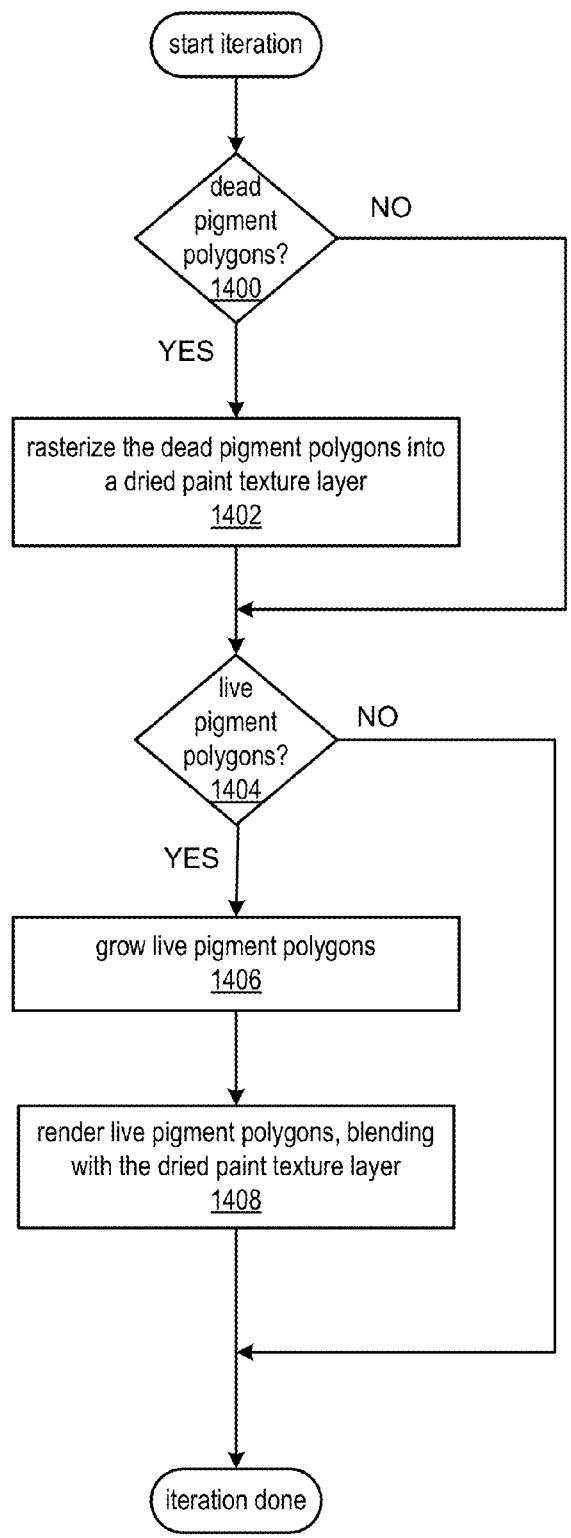
FIG. 38 is a flowchart illustrating an iteration of a growth and blending process in which dead polygons are rasterized into a dried paint texture layer, according to at least some embodiments.

FIG. 38 is a flowchart illustrating an iteration of a growth and blending process in which dry ("dead") pigment polygons are rasterized into a dried paint texture layer, according to at least some embodiments. At 1400, if there are dead pigment polygons, then at 1402, at least a portion of the dead pigment polygons may be rasterized into a dried paint texture layer, and the method proceeds to 1404. At 1400, if there are no dead pigment polygons, then the method proceeds to 1404. At 1404, if there are live pigment polygons, then at 1406, the live pigment polygons are grown, and at 1408 the grown live pigment polygons are rendered. During rendering, the live pigment polygons are blended with the dried paint texture layer. After rendering at 1408, the iteration is done. At 1404, if there are no live pigment polygons, then the iteration is done.

Figure 39:
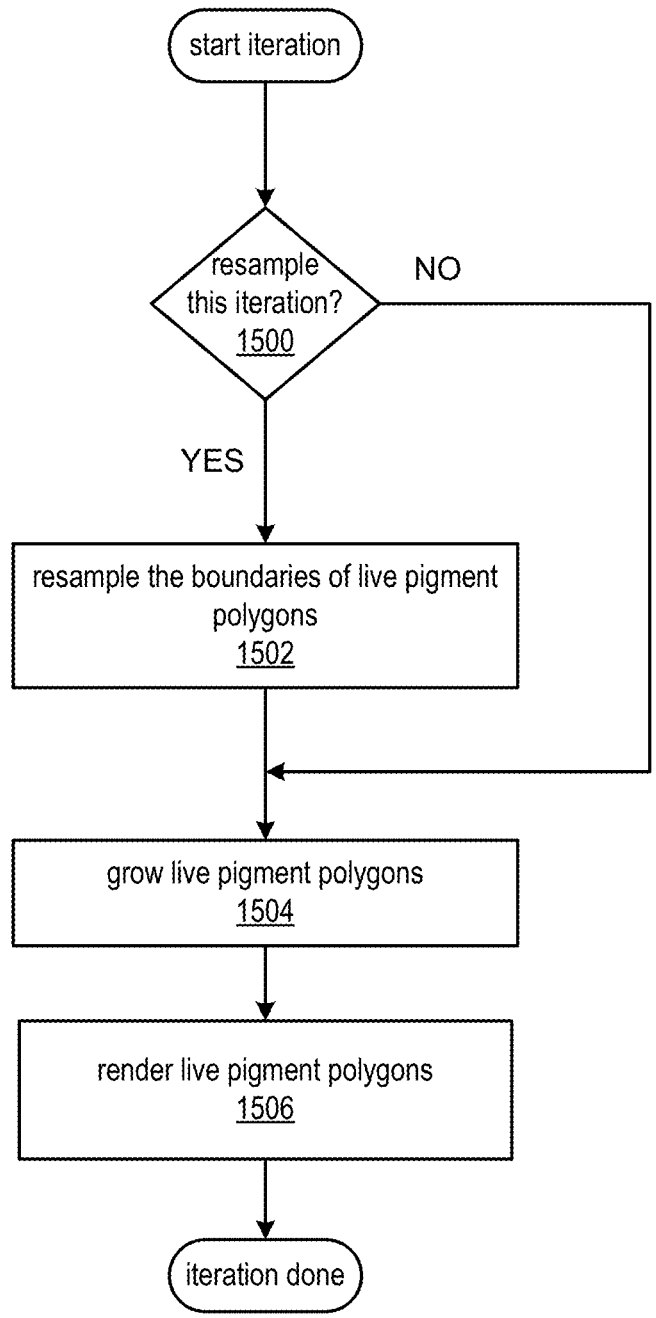
FIG. 39 is a flowchart illustrating an iteration of a growth and blending process in which the boundaries of live polygons are resampled, according to at least some embodiments.

FIG. 39 is a flowchart illustrating an iteration of a growth and blending process in which the boundaries of live polygons are resampled, according to at least some embodiments. To maintain relative smoothness of a polygon's boundary as the polygon grows, a technique may be used in which the boundary of each polygon is periodically or aperiodically resampled to ensure a more even spacing of the vertices along the boundary, thus providing smoother, more uniform growth of the polygons. The resampling may be performed at every iteration or at every few (e.g., every three or four) iterations of the procedural painting algorithm.

At 1500 of FIG. 39, if resampling is to be performed at this iteration, then the boundaries of at least a portion of the live pigment polygons may be resampled to ensure that the boundaries are smooth, as indicated at 1502, and the method proceeds to 1504. FIG. 34 graphically illustrates resampling the boundary of a polygon. At 1500, if resampling is not to be performed at this iteration, then the method proceeds directly to 1504 without performing resampling. At 1504, the live pigment polygons are grown, and at 1506, the grown live pigment polygons are rendered.

Alternatively, elements 1500 and 1502 of FIG. 39 may be performed after element 1504 or after element 1506.

Figure 40:
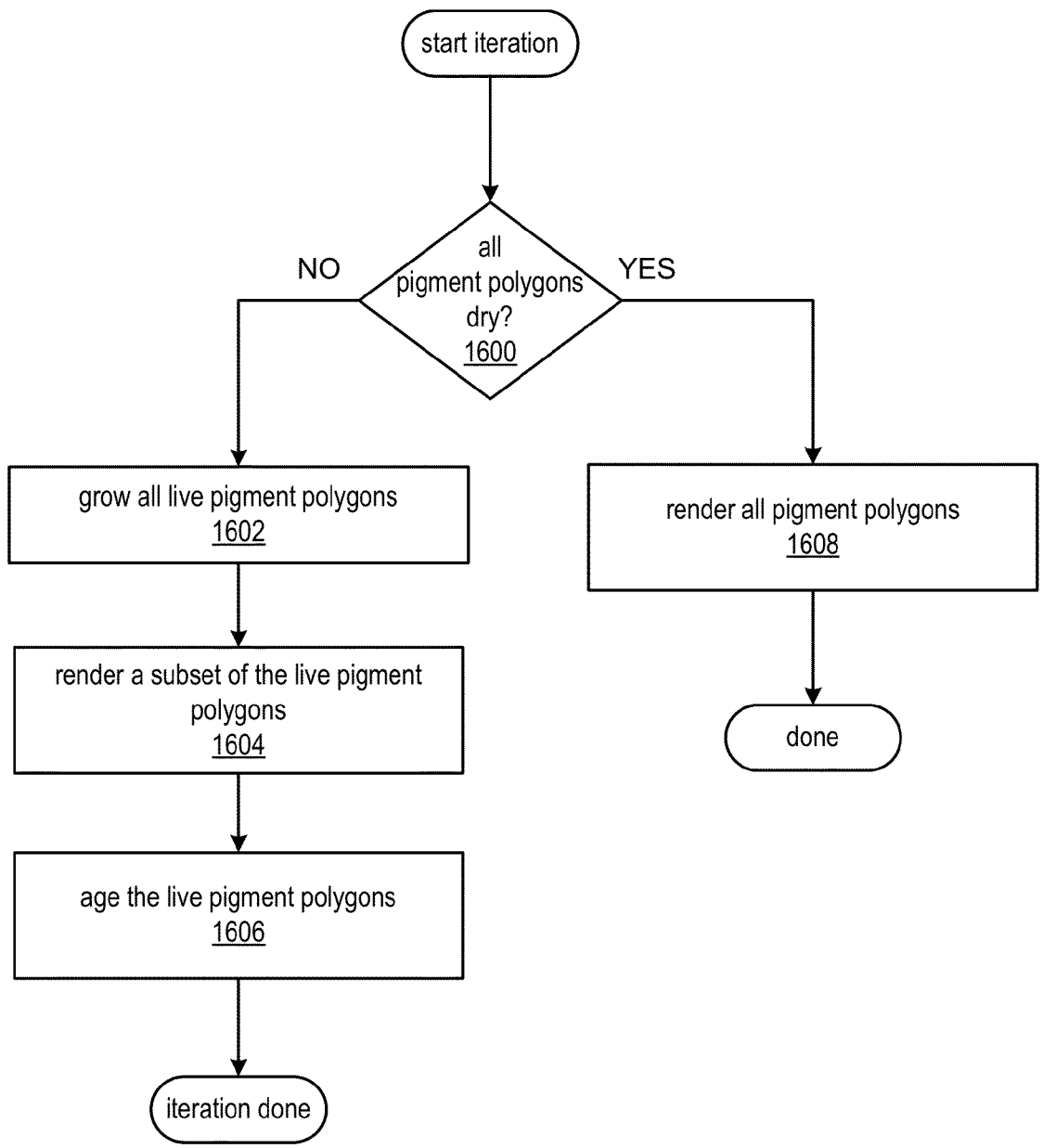
FIG. 40 is a flowchart illustrating an iteration of a growth and blending process in which only a subset of the live polygons are rendered, according to at least some embodiments.

FIG. 40 is a flowchart illustrating an iteration of a growth and blending process in which only a subset of the live polygons are rendered, according to at least some embodiments. At 1600, if not all of the pigment polygons are dry, then at 1602, all of the live (wet) pigment polygons are grown. At 1604, however, only a subset of the live pigment polygons are rendered. At 1606, all of the live polygons are aged. After 1606, this iteration is done. At 1600, if all of the pigment polygons are dry, then all of the pigment polygons are rendered, as indicated at 1608. The growth and blending process is done, unless more groups of polygons are deposited.

Each of the methods illustrated in FIGS. 37 through 40 may be integrated into the vector-based, fluid motion simulation technique on its own, or two or more of the methods may be combined or integrated into the vector-based, fluid motion simulation technique. For example, one or more of the methods illustrated in FIGS. 38 through 40 may be integrated into the growth and blending process 1310 of FIG. 37. As another example, any of the methods illustrated in FIGS. 38 through 40 may integrate the separate water polygons and pigment polygons, and the rasterization of the water polygons into a wetness layer, as illustrated in FIG. 37.

Example Implementations

Some embodiments may include a means for performing the vector-based, fluid motion simulation technique. For example, a fluid motion simulation module may receive input specifying at least a portion of a digital canvas on which one or more groups of polygons as described herein have been deposited, and may grow and blend the polygons to simulate the dynamics of a fluid such as paint, as described herein. In at least some embodiments, the groups may include separate water polygons and pigment polygons, as described herein. In some embodiments, the water polygons may be rasterized into a wetness layer, and wetness checks at vertices of the pigment polygons may be performed by testing the wetness layer. The growth and blending process may implement one or more of the techniques for improving the process as described herein, such as resampling the boundaries of pigment polygons, rasterizing dried pigment polygons into a dried paint layer, and rendering only a subset of the pigment polygons at each iteration. Embodiments may also include a means for recording gesture input (e.g., strokes) and other information used to create a work (e.g., a painting) on a device, and a means for transferring the information to another device on which the work may be re-created.

The fluid motion simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying at least a portion of a digital canvas on which one or more polygons as described herein have been deposited, and may grow and blend the polygons to simulate the dynamics of a fluid such as paint, as described herein. Other embodiments of the fluid motion simulation module may be at least partially implemented by hardware circuitry and/or firmware stored, for example, in a non-volatile memory.

FIG. 27 illustrates a fluid motion simulation module that may implement embodiments of the vector-based, fluid motion simulation techniques as illustrated in FIGS. 1 through 26 as well as one or more of the techniques as illustrated in FIGS. 30A through 40. Fluid motion simulation module 920 may include an applicator submodule 926 that provides a painting technique and that employs a user interface 924 similar to the example user interface illustrated in FIGS. 21 and 22A-22C to deposit polygons to a canvas 910. In at least some embodiments, the deposited polygons may include water polygons and pigment polygons, for example as illustrated in FIGS. 31 through 33. Module 920 may also include a growth and blending submodule 928 that implements a fluid motion simulation technique that grows and blends deposited polygons as illustrated in FIGS. 24 through 26 and/or as illustrated in FIGS. 30A through 40. FIG. 28 illustrates an example computer system on which embodiments of module 920 may be implemented. Module 920 may receive as input, or otherwise obtain, a digital canvas 910. While FIG. 27 shows the digital canvas 910 as blank, the canvas 910 may be a digital image or photograph, and may be an image that was previously created with module 920. Applicator submodule 926 may receive user input 912, for example brush strokes, via user interface 924 depositing polygons to working canvas 922. Growth and blending submodule 928, which may but does not necessarily execute as a background process, may grow and blend the deposited polygons, for example as illustrated in FIGS. 24 through 26 and/or as illustrated in FIGS. 30A through 40. Module 920 generates as output an output image 930. Output image 930 may, for example, be stored to a storage medium 940, such as system memory, a disk drive, DVD, CD, etc., displayed to a display device 950, printed on a printer device (not shown), and/or passed to one or more other module(s) 960 for additional processing.

While not shown, in at least some embodiments, fluid motion simulation module 920 may also include one or more components that facilitate recording gesture input (e.g., strokes) and other information used to create a work (e.g., a painting) on a device, and a transferring the information to another device on which the work may be re-created, for example as illustrated in FIG. 36.

In some embodiments, fluid motion simulation module 920 may provide a user interface 924 via which a user may interact with the module 920, for example to specify or select brushes, to select a pigment and/or water for application by a selected brush, to set one or more attributes for polygons or groups to be deposited, and to perform a painting method as described herein. In some embodiments, the user interface may provide user interface elements whereby the user may select attribute values for groups or polygons to be deposited including one or more of, but not limited to, opacity, speed, diameter, lifespan, and wetness.

Example System

Embodiments of a fluid motion simulation module and/or of the various vector-based, fluid motion simulation techniques as described herein may be executed on one or more computer systems, which may interact with various other devices. One such computer system is illustrated by FIG. 28. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010a, 1010b, . . . 1010n coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various vector-based, fluid motion simulation techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a fluid motion simulation module, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 28, memory 1020 may include program instructions 1025, configured to implement embodiments of a fluid motion simulation module as described herein, and data storage 1035, comprising various data accessible by program instructions 1025. In one embodiment, program instructions 1025 may include software elements of embodiments of a fluid motion simulation module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a fluid motion simulation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for simulating painting on a digital canvas, comprising:

depositing, by a computing device, one or more water polygons and one or more pigment polygons on the digital canvas, the one or more water polygons deposited independently of the one or more pigment polygons, the one or more water polygons represent wetness deposited on the canvas, the one or more pigment polygons represent pigment deposited on the canvas, and a border of each deposited pigment polygon is defined by a plurality of vertices, each vertex including a local vector that indicates direction at the vertex;

rasterizing, by the computing device, the one or more water polygons into a wetness layer; and for each deposited pigment polygon, iteratively growing, by the computing device, the border of the respective pigment polygon including at each iteration, independently moving each vertex of the respective pigment polygon according to a local vector at the vertex and a velocity at the vertex such that velocity of at least one vertex of at least one pigment polygon is affected by at least one deposited water polygon.

2. The method as recited in claim 1, wherein each water polygon includes a lifespan attribute that specifies a period for which the respective water polygon is wet after said depositing the respective water polygon.

3. The method as recited in claim 1, wherein said independently moving each vertex of the respective polygon according to a local vector at the vertex and a velocity at the vertex comprises, at each vertex, determining, by the computing device, if the vertex is wet according to a corresponding point in at least one water polygon and, if the corresponding point in the at least one water polygon is wet, increasing, by the computing device, the velocity at the vertex to account for the wetness at the corresponding point.

4. The method as recited in claim 1, wherein each point in the wetness layer includes a wetness value that indicates wetness at the point.

5. The method as recited in claim 4, wherein at least two points in the wetness layer indicate different wetness values.

6. The method as recited in claim 4, wherein said independently moving each vertex of the respective polygon according to a local vector at the vertex and a velocity at the vertex comprises, at each vertex, determining, by the computing device, if the vertex is wet according to the wetness value at a corresponding point in the wetness layer and, if the corresponding point in the wetness layer is wet, increasing, by the computing device, the velocity at the vertex to account for the wetness at the corresponding point.

7. The method as recited in claim 4, further comprising aging, by the computing device, the wetness layer at each iteration.

8. The method as recited in claim 7, wherein said aging the wetness layer comprises decrementing, by the computing device, the wetness value at all points in the wetness layer that are wet, wherein a point in the wetness layer is dry if the wetness value is at a minimum threshold, and wherein a point in the wetness layer is wet if the wetness value is above the minimum threshold.

9. The method as recited in claim 1, wherein said depositing a plurality of polygons comprises depositing, by the computing device, the polygons in a plurality of groups each including one or more pigment polygons and one or more water polygons.

10. The method as recited in claim 1, wherein the water polygons are static and do not grow.

11. The method as recited in claim 1, wherein said depositing one or more water polygons and one or more pigment polygons on the digital canvas comprises receiving, by the computing device, input via a user interface indicating one or more strokes applied to the digital canvas via a brush tool.

12. A system, comprising:
at least one processor; and
a memory comprising program instructions, wherein the program instructions are executable by the at least one processor to:
receive input depositing one or more water polygons and one or more pigment polygons on the digital canvas, the one or more water polygons deposited independently of the one or more pigment polygons, the water polygons represent wetness deposited on the canvas and the pigment polygons represent pigment deposited on the canvas;
rasterize the one or more water polygons into a wetness layer; and
for each deposited pigment polygon, iteratively grow the border of the respective pigment polygon and render the respective pigment polygon to the digital canvas such that growth of at least a portion of the border of at least one deposited pigment polygon is affected by at least one deposited water polygon.

13. The system as recited in claim 12, wherein the water polygons are static and do not grow, and wherein each point in the wetness layer includes a wetness value that indicates wetness at the point.

14. The system as recited in claim 13, wherein a border of each deposited pigment polygon is defined by a plurality of vertices, each vertex including a local vector that indicates direction at the vertex, wherein, to iteratively grow the border of a pigment polygon, the program instructions are executable by the at least one processor to, at each iteration, independently move each vertex of the respective pigment polygon according to a local vector at the vertex and a velocity at the vertex, wherein velocity of at least one vertex of at least one pigment polygon is affected by the wetness layer.

15. The system as recited in claim 14, wherein, to independently move each vertex of the respective polygon according to a local vector at the vertex and a velocity at the vertex, the program instructions are executable by the at least one processor to, at each vertex, determine if the vertex is wet according to the wetness value at a corresponding point in the wetness layer and, if the corresponding point in the wetness layer is wet, increase the velocity at the vertex to account for the wetness at the corresponding point.

16. The system as recited in claim 14, wherein the program instructions are executable by the at least one processor to age the wetness layer at each iteration by decrementing the wetness value at all points in the wetness layer that are wet, wherein a point in the wetness layer is dry if the wetness value is at a minimum threshold, and wherein a point in the wetness layer is wet if the wetness value is above the minimum threshold.

17. A non-transitory computer-readable storage medium comprising program instructions stored thereon, the program instructions are computer-executable to implement a fluid motion simulation module operable to:
receive input depositing one or more water polygons and one or more pigment polygons on the digital canvas, the one or more water polygons deposited independently of the one or more pigment polygons, the water polygons represent wetness deposited on the canvas and the pigment polygons represent pigment deposited on the canvas;
rasterize the one or more water polygons into a wetness layer; and
for each deposited pigment polygon, iteratively grow the border of the respective pigment polygon and render the respective pigment polygon to the digital canvas such that growth of at least a portion of the border of at least one deposited pigment polygon is affected by at least one deposited water polygon.

18. The computer-readable storage medium as recited in claim 17, wherein the water polygons are static and do not grow, and wherein each point in the wetness layer includes a wetness value that indicates wetness at the point.

19. The computer-readable storage medium as recited in claim 18, wherein a border of each deposited pigment polygon is defined by a plurality of vertices, each vertex including a local vector that indicates direction at the vertex, wherein, to iteratively grow the border of a pigment polygon, the fluid motion simulation module is further operable, at each iteration, independently move each vertex of the respective pigment polygon according to a local vector at the vertex and a velocity at the vertex, wherein velocity of at least one vertex of at least one pigment polygon is affected by the wetness layer.

20. The computer-readable storage medium as recited in claim 19, wherein, to independently move each vertex of the respective polygon according to a local vector at the vertex and a velocity at the vertex, the fluid motion simulation module is further operable to, at each vertex, determine if the vertex is wet according to the wetness value at a corresponding point in the wetness layer and, if the corresponding point in the wetness layer is wet, increase the velocity at the vertex to account for the wetness at the corresponding point.

21. The computer-readable storage medium as recited in claim 19, wherein the fluid motion simulation module is further operable to age the wetness layer at each iteration by decrementing the wetness value at all points in the wetness layer that are wet, wherein a point in the wetness layer is dry if the wetness value is at a minimum threshold, and wherein a point in the wetness layer is wet if the wetness value is above the minimum threshold.

* * * * *